(12) United States Patent
Tokiwa et al.

(10) Patent No.: US 10,719,216 B2
(45) Date of Patent: Jul. 21, 2020

(54) CAMERA AND SETTING METHOD FOR CAMERA

(71) Applicant: FUJIFILM Corporation, Tokyo (JP)

(72) Inventors: Kentaro Tokiwa, Saitama (JP); Hirofumi Horii, Saitama (JP); Yuichi Fujimura, Saitama (JP); Takeshi Misawa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/218,031

(22) Filed: Dec. 12, 2018

(65) Prior Publication Data
US 2019/0121525 A1 Apr. 25, 2019

Related U.S. Application Data

(63) Continuation of application No. PCT/JP2017/020379, filed on Jun. 1, 2017.

(30) Foreign Application Priority Data

Jun. 27, 2016 (JP) ................................ 2016-126390

(51) Int. Cl.
*G06F 3/0484* (2013.01)
*G03B 17/18* (2006.01)
(Continued)

(52) U.S. Cl.
CPC ......... *G06F 3/04847* (2013.01); *G03B 17/02* (2013.01); *G03B 17/18* (2013.01);
(Continued)

(58) Field of Classification Search
CPC .. G06F 3/04847; G06F 3/0484; G06F 3/0487; G03B 17/18; H04N 5/232
See application file for complete search history.

(56) References Cited

U.S. PATENT DOCUMENTS 5,649,245 A * 7/1997 Inoue ..................... G03B 17/18
396/291
5,721,989 A * 2/1998 Kitazawa ............... G03B 17/18
396/280
(Continued)

FOREIGN PATENT DOCUMENTS

JP 8-76225 A 3/1996
JP 8-105759 A 4/1996
(Continued)

OTHER PUBLICATIONS

International Preliminary Report on Patentability and Written Opinion of the International Searching Authority(Forms PCT/IB/326, PCT/IB/373 and PCT/ISA/237), dated Jan. 10, 2019, for International Application No. PCT/JP2017/020379, with an English Translation of the Written Opinion.
(Continued)

*Primary Examiner* — Ahmed A Berhan
(74) *Attorney, Agent, or Firm* — Birch, Stewart, Kolasch & Birch, LLP

(57) ABSTRACT

Provided are a camera having a compact configuration and a high operability, and a setting method for the camera. A sub-display is disposed on a top surface of a camera body. An image picture of a first rear command dial which is an operation dial and an image picture of a second rear command dial which is an operation dial are displayed on the sub-display. In a case where the first rear command dial or the second rear command dial is rotationally operated, the image picture of the rotationally operated operation dial is enlarged, and the image picture is rotated in conjunction with the rotational operation.

16 Claims, 48 Drawing Sheets

(51) Int. Cl.
G06F 3/0487 (2013.01)
G03B 17/20 (2006.01)
H04N 5/225 (2006.01)
H04N 5/232 (2006.01)
G03B 17/02 (2006.01)
H04N 5/374 (2011.01)
H04N 5/372 (2011.01)

(52) U.S. Cl.
CPC ............ *G03B 17/20* (2013.01); *G06F 3/0484* (2013.01); *G06F 3/0487* (2013.01); *H04N 5/22525* (2018.08); *H04N 5/232* (2013.01); *H04N 5/372* (2013.01); *H04N 5/374* (2013.01)

(56) References Cited

U.S. PATENT DOCUMENTS 5,745,809 A * 4/1998 Kawahata ............... G03B 17/18 396/287

9,172,881 B2 * 10/2015 Fujita ..................... G03B 17/02

FOREIGN PATENT DOCUMENTS

| JP | 10-148862 A | 6/1998 |
| JP | 11-223866 A | 8/1999 |
| JP | 2002-72316 A | 3/2002 |
| JP | 2003-110882 A | 4/2003 |
| JP | 2006-60313 A | 3/2006 |
| JP | 2008-165118 A | 7/2008 |
| JP | 2010-192223 A | 9/2010 |
| JP | 2015-154323 A | 8/2015 |

OTHER PUBLICATIONS

International Search Report (Form PCT/ISA/210), dated Aug. 29, 2017, for International Application No. PCT/JP2017/020379, with an English translation.

* cited by examiner

FIG. 7

|  | D1<br>FIRST REAR COMMAND DIAL | D2<br>SECOND REAR COMMAND DIAL |
|---|---|---|
| P<br>PROGRAM | EXPOSURE CORRECTION | PROGRAM SHIFT |
| S<br>SHUTTER SPEED PRIORITY | EXPOSURE CORRECTION | SET SHUTTER SPEED |
| A<br>STOP PRIORITY | EXPOSURE CORRECTION | SET F NUMBER |
| M<br>MANUAL | SET SHUTTER SPEED | SET F NUMBER |
| REPRODUCTION MODE | FRAME FEED | REPRODUCTION ZOOM |

CAMERA AND SETTING METHOD FOR CAMERA

CROSS-REFERENCE TO RELATED APPLICATIONS

This application is a Continuation of PCT International Application No. PCT/JP2017/020379 filed on Jun. 1, 2017, which claims priority under 35 U.S.C. § 119(a) to Japanese Patent Application No. 2016-126390 filed on Jun. 27, 2016. Each of the above application(s) is hereby expressly incorporated by reference, in its entirety, into the present application.

BACKGROUND OF THE INVENTION

1. Field of the Invention

The present invention relates to a camera and a setting method for the camera, and particularly to a camera performing various settings by using a rotary operation dial, and a setting method for the camera.

2. Description of the Related Art

There is a camera in which various settings are performed by combining a rotary operation dial and a display device with each other. For example, JP1996-076225A (JP-H08-076225A) has proposed a camera in which an operation dial is disposed on a lower part of a display device, and display contents on the display device are switched to each other in response to a rotational operation on the operation dial such that various settings are performed. The camera disclosed in JP1996-076225A (JP-H08-076225A) has a configuration in which functions allocated to the operation dial are switched to each other, and thus a plurality of functions can be set with a single operation dial.

SUMMARY OF THE INVENTION

However, in a case where a plurality of functions are allocated to a single operation dial, there is a problem in that an operation is complicated. In a case where the number of operation dials is merely increased in order to solve the problem, there is a problem in that the camera becomes large-sized.

The present invention has been made in consideration of the circumstances, and an object thereof is to provide a camera having a compact configuration and a high operability, and a setting method for the camera.

Means for solving the problems are as follows.

(1) A camera comprising:
a display unit that is disposed on a top surface of a camera body;
a plurality of rotary operation dials that are disposed such that parts of outer circumferences of the rotary operation dials are exposed to an outer surface of the camera body; and
a display control unit that controls display on the display unit,
wherein the display control unit displays an image picture of each of the operation dials on the display unit, and changes a display form of an image picture of a rotationally operated operation dial in a case where the operation dial is rotationally operated.

According to this aspect, a plurality of rotary operation dials are provided on the camera body. Each operation dial is disposed such that a part of the outer circumference thereof is exposed from the outer surface of the camera body. Each operation dial is rotationally operated by using the exposed portion. Consequently, a plurality of operation dials can be disposed without requiring much space. According to this aspect, the display unit is provided on the top surface of the camera body. An image picture of each operation dial is displayed on the display unit. The image picture of the operation dial is an image indicating a rotary operation dial. According to this aspect, in a case where an operation dial is rotationally operated, a display form of an image picture of the operated operation dial is changed. Consequently, it is possible to immediately understand an operation dial which is being operated.

(2) The camera according to (1),
wherein, in a case where an operation dial is rotationally operated, the display control unit enlarges an image picture of the rotationally operated operation dial.

According to this aspect, in a case where an operation dial is rotationally operated, an image picture of the operated operation dial is enlarged. Consequently, it is possible to immediately understand an operation dial which is being operated. An image picture is displayed to be enlarged, and thus it is possible to ensure a favorable visibility. A small-sized operation dial can be used as an actual operation dial, and thus a plurality of operation dials can be disposed without requiring much space.

(3) The camera according to (1) or (2),
wherein, in a case where an operation dial is rotationally operated, the display control unit changes brightness or a color of an image picture of the rotationally operated operation dial.

According to this aspect, in a case where an operation dial is rotationally operated, brightness or a color of an image picture of the operated operation dial is changed. Consequently, it is possible to immediately understand an operation dial which is being operated.

(4) The camera according to any one of (1) to (3),
wherein, in a case where an operation dial is rotationally operated, the display control unit rotates an image picture of the rotationally operated operation dial.

According to this aspect, in a case where an operation dial is rotationally operated, an image picture of the operated operation dial is rotated. Consequently, it is possible to immediately understand an operation dial which is being operated.

(5) The camera according to (4),
wherein the display control unit rotates the image picture of the operation dial in the same rotation amount as an operated rotation amount.

According to this aspect, the image picture of the operation dial is rotated in the same rotation amount as an operated rotation amount. Consequently, it is possible to provide a favorable operation feeling.

(6) The camera according to any one of (1) to (5),
wherein the display control unit displays the image picture of each of the operation dials on the display unit in a layout corresponding to a layout of the operation dial for the camera body.

According to this aspect, the image picture of each of the operation dials is displayed on the display unit in a layout corresponding to a layout of the operation dial for the camera body. Consequently, it is possible to intuitively understand a relationship between each operation dial and an image picture thereof displayed on the display unit, and thus to provide a more favorable operability.

(7) The camera according to any one of (1) to (6),
wherein the display control unit displays the image picture of each of the operation dials near the operation dial.

According to this aspect, the image picture of each of the operation dials is displayed near the operation dial. Consequently, it is possible to intuitively understand a relationship between each operation dial and an image picture thereof displayed on the display unit, and thus to provide a more favorable operability.

(8) The camera according to any one of (1) to (6),
wherein, in a case where an operation dial is rotationally operated, the display control unit changes a display form of an image picture displayed nearest the rotationally operated operation dial.

According to this aspect, in a case where an operation dial is operated, a display form of an image picture displayed nearest the operated operation dial is changed. Consequently, it is possible to intuitively understand a relationship between each operation dial and an image picture thereof displayed on the display unit, and thus to provide a more favorable operability.

(9) The camera according to any one of (1) to (8),
wherein the display control unit displays an image having a circular arc outer shape to which a part of the operation dial exposed from the camera body extends on the display unit as the image picture of the operation dial.

According to this aspect, an image picture of each operation dial is configured with an image which complements a hidden portion of the actual operation dial. In other words, the image picture of the operation dial is configured with an image having a circular arc outer shape to which a part of the operation dial exposed from the camera body extends. Consequently, it is possible to further clarify the relevance between each operation dial and an image picture thereof displayed on the display unit, and thus to provide a more favorable operability.

(10) The camera according to any one of (1) to (9),
wherein the display control unit displays the image picture of each of the operation dials, corresponding to a function allocated to the operation dial, on the display unit.

According to this aspect, an image picture of an operation dial is configured with an image corresponding to a function allocated to the operation dial. The function allocated to the operation dial is a content which is set or for which an instruction is given by using the operation dial. This image is configured with an image in which an actual operation dial is viewed from the top. For example, in a case where a shutter speed is set by using an operation dial, a function of setting a shutter speed is allocated to the operation dial, and, in a case where a sensitivity is set, a function of setting a sensitivity is allocated thereto. In a case where zooming is performed by using the operation dial, a function of giving an instruction for zooming is allocated to the operation dial, and, in a case of frame feed, a function of giving an instruction for frame feed is allocated thereto. In a case where the function of setting a shutter speed is allocated to the operation dial, for example, an image in which a shutter speed dial is viewed from the top is used as an image picture of the operation dial. In a case where the function of setting a sensitivity is allocated to the operation dial, for example, an image in which a sensitivity dial is viewed from the top is used as an image picture of the operation dial. Consequently, a function allocated to each operation dial can be visually recognized. An image picture corresponding to an allocated function is displayed, and thus an intuitive operation can be performed.

(11) The camera according to any one of (1) to (10), further comprising:
a function setting unit that sets a function to be allocated to each of the operation dials.

According to this aspect, it is possible to set a function to be allocated to an operation dial.

(12) The camera according to any one of (1) to (11),
wherein the display control unit further displays set contents of the camera on the display unit.

According to this aspect, the set contents of the camera are displayed on the display unit in addition to the image picture of each operation dial. Consequently, it is possible to understand the set contents of the camera on the basis of display on the display unit, and thus to ensure a more favorable operability. The set contents include at least one of a shutter speed, an F number, a sensitivity, or an imaging mode.

(13) The camera according to (12),
wherein the display control unit displays the set contents to be reduced in a case where the image picture is enlarged.

According to this aspect, in a case where the image picture of the operation dial is enlarged, the set contents of the camera are displayed to be reduced not to overlap the image picture. Consequently, even in a case where a size of the display unit is small, an image picture of an operated operation dial can be displayed to be as large as possible, and thus a favorable visibility can be ensured. The set contents of the camera can also be checked while operating the operation dial.

(14) The camera according to (12) or (13),
wherein the display control unit displays the set contents to be deviated to positions not overlapping the image picture in a case where the image picture is enlarged.

According to this aspect, in a case where the image picture of the operation dial is enlarged, display positions of the set contents of the camera are deviated not to overlap the image picture. Consequently, even in a case where a size of the display unit is small, an image picture of an operated operation dial can be displayed to be as large as possible, and thus a favorable visibility can be ensured. The set contents of the camera can also be checked while operating the operation dial.

(15) The camera according to (12),
wherein the display control unit displays the set contents to overlap the image picture in a case where the image picture is enlarged.

According to this aspect, the set contents of the camera are displayed to overlap the image picture in a case where the image picture is enlarged. Consequently, the set contents of the camera can also be checked while operating the operation dial. In this case, the set contents of the camera may be made translucent.

(16) The camera according to any one of (12) to (15),
wherein the display control unit changes display items of the set contents in a case where the image picture is enlarged.

According to this aspect, display items of the set contents of the camera are changed in a case where the image picture is enlarged. For example, the number of displayed items is reduced, and only information regarding a specific item is displayed. Alternatively, display of an item set by using an operation dial is deleted.

(17) A camera comprising:

a display unit that is disposed on a top surface of a camera body;

a plurality of rotary operation dials that are disposed such that parts of outer circumferences of the rotary operation dials are exposed to an outer surface of the camera body;

a contact detection unit that detects contact with each of the operation dials; and a display control unit that controls display on the display unit, wherein the display control unit displays an image picture of each of the operation dials on the display unit, and changes a display form of an image picture of an operation dial with which the contact is detected in a case where the contact with the operation dial is detected.

According to this aspect, a plurality of rotary operation dials are provided on the camera body. Each operation dial is disposed such that a part of the outer circumference thereof is exposed from the outer surface of the camera body. Each operation dial is rotationally operated by using the exposed portion. Consequently, a plurality of operation dials can be disposed without requiring much space. According to this aspect, the display unit is provided on the top surface of the camera body. An image picture of each operation dial is displayed on the display unit. According to this aspect, in a case where the finger comes into contact with an operation dial, a display form of an image picture of the operation dial with which the finger comes into contact is changed. Consequently, it is possible to immediately understand a relationship between an operation dial to be operated and an image picture thereof displayed on the display unit, and thus to provide a favorable operability.

(18) The camera according to (17), wherein, in a case where contact with an operation dial is detected, the display control unit enlarges an image picture of the operation dial with which the contact is detected.

According to this aspect, in a case where the finger comes into contact with an operation dial, an image picture of the operation dial with which the finger comes into contact is enlarged. Consequently, it is possible to immediately understand an operation dial to be operated. An image picture is displayed to be enlarged, and thus it is possible to ensure a favorable visibility. A small-sized operation dial can be used as an actual operation dial, and thus a plurality of operation dials can be disposed without requiring much space.

(19) The camera according to (18), wherein, in a case where the operation dial with which the contact is detected is rotationally operated, the display control unit changes brightness or a color of the image picture of the operation dial with which the contact is detected.

According to this aspect, in a case where the operation dial with which the finger comes into contact is rotationally operated, brightness or a color of the image picture of the operation dial is changed. Consequently, it is possible to immediately understand an operation dial which is being operated.

(20) The camera according to (18) or (19), wherein, in a case where the operation dial with which the contact is detected is rotationally operated, the display control unit rotates the image picture of the operation dial with which the contact is detected.

According to this aspect, in a case where the operation dial with which the finger comes into contact is rotationally operated, the image picture of the operation dial is rotated. Consequently, it is possible to immediately understand an operation dial which is being operated.

(21) The camera according to (20), wherein the display control unit rotates the image picture of the operation dial in the same rotation amount as an operated rotation amount.

According to this aspect, the image picture of the operation dial is rotated in the same rotation amount as an actually operated rotation amount. Consequently, it is possible to provide a favorable operation feeling.

(22) The camera according to (17), wherein, in a case where contact with the operation dial is detected, the display control unit changes brightness or a color of the image picture of the operation dial with which the contact is detected.

According to this aspect, in a case where the finger comes into contact with an operation dial, brightness or a color of an image picture of the operation dial with which the finger comes into contact is changed. Consequently, it is possible to immediately understand an operation dial to be operated.

(23) The camera according to (22), wherein, in a case where the operation dial with which the contact is detected is rotationally operated, the display control unit enlarges the image picture of the operation dial with which the contact is detected.

According to this aspect, in a case where the operation dial with which the finger comes into contact is rotationally operated, the image picture of the operation dial is enlarged. Consequently, it is possible to immediately understand an operation dial which is being operated. An image picture is displayed to be enlarged, and thus it is possible to ensure a favorable visibility. A small-sized operation dial can be used as an actual operation dial, and thus a plurality of operation dials can be disposed without requiring much space.

(24) The camera according to (22) or (23), wherein, in a case where the operation dial with which the contact is detected is rotationally operated, the display control unit rotates the image picture of the operation dial with which the contact is detected.

According to this aspect, in a case where the operation dial with which the finger comes into contact is rotationally operated, the image picture of the operation dial is rotated. Consequently, it is possible to immediately understand an operation dial which is being operated.

(25) The camera according to (24), wherein the display control unit rotates the image picture of the operation dial in the same rotation amount as an operated rotation amount.

According to this aspect, the image picture of the operation dial is rotated in the same rotation amount as an actually operated rotation amount. Consequently, it is possible to provide a favorable operation feeling.

(26) The camera according to any one of (17) to (25), wherein the display control unit displays the image picture of each of the operation dials on the display unit in a layout corresponding to a layout of the operation dial for the camera body.

According to this aspect, the image picture of each of the operation dials is displayed on the display unit in a layout corresponding to a layout of the operation dial for the camera body. Consequently, it is possible to intuitively understand a relationship between each operation dial and an image picture thereof displayed on the display unit, and thus to provide a more favorable operability.

(27) The camera according to any one of (17) to (26), wherein the display control unit displays the image picture of each of the operation dials near the operation dial.

According to this aspect, the image picture of each of the operation dials is displayed near the operation dial. Consequently, it is possible to intuitively understand a relationship between each operation dial and an image picture thereof displayed on the display unit, and thus to provide a more favorable operability.

(28) The camera according to any one of (17) to (26), wherein, in a case where an operation dial is rotationally operated, the display control unit changes a display form of an image picture displayed nearest the rotationally operated operation dial.

According to this aspect, in a case where an operation dial is operated, a display form of an image picture displayed nearest the operated operation dial is changed. Consequently, it is possible to intuitively understand a relationship between each operation dial and an image picture thereof displayed on the display unit, and thus to provide a more favorable operability.

(29) The camera according to any one of (17) to (28), wherein the display control unit displays an image having a circular arc outer shape to which a part of the operation dial exposed from the camera body extends on the display unit as the image picture of the operation dial.

According to this aspect, an image picture of each operation dial is configured with an image which complements a hidden portion of the actual operation dial. Consequently, it is possible to further clarify the relevance between each operation dial and an image picture thereof displayed on the display unit, and thus to provide a more favorable operability.

(30) The camera according to any one of (17) to (29), wherein the display control unit displays the image picture of each of the operation dials, corresponding to a function allocated to the operation dial, on the display unit.

According to this aspect, an image picture of an operation dial is configured with an image corresponding to a function allocated to the operation dial. Consequently, a function allocated to each operation dial can be visually recognized. An image picture corresponding to an allocated function is displayed, and thus an intuitive operation can be performed.

(31) The camera according to any one of (17) to (30), further comprising:
a function setting unit that sets a function to be allocated to each of the operation dials.

According to this aspect, it is possible to set a function to be allocated to an operation dial.

(32) The camera according to any one of (17) to (31), wherein the display control unit further displays set contents of the camera on the display unit.

According to this aspect, the set contents of the camera are displayed on the display unit in addition to the image picture of each operation dial. Consequently, it is possible to understand the set contents of the camera on the basis of display on the display unit, and thus to ensure a more favorable operability. The set contents include at least one of a shutter speed, an F number, a sensitivity, or an imaging mode.

(33) The camera according to (32),
wherein the display control unit displays the set contents to be reduced in a case where the image picture is enlarged.

According to this aspect, in a case where the image picture of the operation dial is enlarged, the set contents of the camera are displayed to be reduced not to overlap the image picture. Consequently, even in a case where a size of the display unit is small, an image picture of an operated operation dial can be displayed to be as large as possible, and thus a favorable visibility can be ensured. The set contents of the camera can also be checked while operating the operation dial.

(34) The camera according to (32) or (33),
wherein the display control unit displays the set contents to be deviated to positions not overlapping the image picture in a case where the image picture is enlarged.

According to this aspect, in a case where the image picture of the operation dial is enlarged, display positions of the set contents of the camera are deviated not to overlap the image picture. Consequently, even in a case where a size of the display unit is small, an image picture of an operated operation dial can be displayed to be as large as possible, and thus a favorable visibility can be ensured. The set contents of the camera can also be checked while operating the operation dial.

(35) The camera according to (32),
wherein the display control unit displays the set contents to overlap the image picture in a case where the image picture is enlarged.

According to this aspect, the set contents of the camera are displayed to overlap the image picture in a case where the image picture is enlarged. Consequently, the set contents of the camera can also be checked while operating the operation dial.

(36) The camera according to any one of (32) to (35),
wherein the display control unit changes display items of the set contents in a case where the image picture is enlarged.

According to this aspect, display items of the set contents of the camera are changed in a case where the image picture is enlarged.

(37) A camera comprising:
a display unit that is disposed on a top surface of a camera body;
a plurality of rotary operation dials that are disposed such that parts of outer circumferences of the rotary operation dials are exposed to an outer surface of the camera body and on which a pushing operation is possible; and
a display control unit that controls display on the display unit,
wherein the display control unit displays an image picture of each of the operation dials on the display unit, and changes a display form of an image picture of an operation dial on which a pushing operation is performed in a case where the pushing operation is performed on the operation dial.

According to this aspect, a plurality of rotary operation dials on which a pushing operation is possible are provided on the camera body. Each operation dial is disposed such that a part of the outer circumference thereof is exposed from the outer surface of the camera body. Each operation dial is rotationally operated by using the exposed portion. Consequently, a plurality of operation dials can be disposed without requiring much space. According to this aspect, the display unit is provided on the top surface of the camera body. An image picture of each operation dial is displayed on the display unit. According to this aspect, in a case where a pushing operation is performed on an operation dial, a display form of an image picture of the operation dial on which the pushing operation is performed is changed. Consequently, it is possible to immediately understand a relationship between an operation dial to be operated and an image picture thereof displayed on the display unit, and thus to provide a favorable operability. Here, the pushing operation is an operation of pushing an operation dial into the camera body. This operation is an operation of pressing the operation dial in a direction orthogonal to a rotation axis.

(38) The camera according to (37), wherein, in a case where a pushing operation is performed on an operation dial, the display control unit enlarges an image picture of the operation dial on which the pushing operation is performed.

According to this aspect, in a case where a pushing operation is performed on an operation dial, an image picture of the operation dial on which the pushing operation is performed is enlarged. Consequently, it is possible to immediately understand an operation dial to be operated. An image picture is displayed to be enlarged, and thus it is possible to ensure a favorable visibility. A small-sized operation dial can be used as an actual operation dial, and thus a plurality of operation dials can be disposed without requiring much space.

(39) The camera according to (38), wherein, in a case where the operation dial on which the pushing operation is performed is rotationally operated, the display control unit changes brightness or a color of the image picture of the operation dial on which the pushing operation is performed.

According to this aspect, in a case where the operation dial on which the pushing operation is performed is rotationally operated, brightness or a color of the image picture of the operation dial is changed. Consequently, it is possible to immediately understand an operation dial which is being operated.

(40) The camera according to (38) or (39), wherein, in a case where the operation dial on which the pushing operation is performed is rotationally operated, the display control unit rotates the image picture of the operation dial on which the pushing operation is performed.

According to this aspect, in a case where the operation dial on which the pushing operation is performed is rotationally operated, the image picture of the operation dial is rotated. Consequently, it is possible to immediately understand an operation dial which is being operated.

(41) The camera according to (40), wherein the display control unit rotates the image picture of the operation dial in the same rotation amount as an operated rotation amount.

According to this aspect, the image picture of the operation dial is rotated in the same rotation amount as an actually operated rotation amount. Consequently, it is possible to provide a favorable operation feeling.

(42) The camera according to (37), wherein, in a case where a pushing operation is performed on an operation dial, the display control unit changes brightness or a color of an image picture of the operation dial on which the pushing operation is performed.

According to this aspect, in a case where a pushing operation is performed on an operation dial, brightness or a color of an image picture of the operation dial on which the pushing operation is performed is changed. Consequently, it is possible to immediately understand an operation dial to be operated.

(43) The camera according to (42), wherein, in a case where the operation dial on which the pushing operation is performed is rotationally operated, the display control unit enlarges the image picture of the operation dial on which the pushing operation is performed.

According to this aspect, in a case where the operation dial on which the pushing operation is performed is rotationally operated, the image picture of the operation dial is enlarged. Consequently, it is possible to immediately understand an operation dial which is being operated. An image picture is displayed to be enlarged, and thus it is possible to ensure a favorable visibility. A small-sized operation dial can be used as an actual operation dial, and thus a plurality of operation dials can be disposed without requiring much space.

(44) The camera according to (42) or (43), wherein, in a case where the operation dial on which the pushing operation is performed is rotationally operated, the display control unit rotates the image picture of the operation dial on which the pushing operation is performed.

According to this aspect, in a case where the operation dial on which the pushing operation is performed is rotationally operated, the image picture of the operation dial is rotated. Consequently, it is possible to immediately understand an operation dial which is being operated.

(45) The camera according to (44), wherein the display control unit rotates the image picture of the operation dial in the same rotation amount as an operated rotation amount.

According to this aspect, the image picture of the operation dial is rotated in the same rotation amount as an actually operated rotation amount. Consequently, it is possible to provide a favorable operation feeling.

(46) The camera according to any one of (37) to (45), wherein the display control unit displays the image picture of each of the operation dials on the display unit in a layout corresponding to a layout of the operation dial for the camera body.

According to this aspect, the image picture of each of the operation dials is displayed on the display unit in a layout corresponding to a layout of the operation dial for the camera body. Consequently, it is possible to intuitively understand a relationship between each operation dial and an image picture thereof displayed on the display unit, and thus to provide a more favorable operability.

(47) The camera according to any one of (37) to (46), wherein the display control unit displays the image picture of each of the operation dials near the operation dial.

According to this aspect, the image picture of each of the operation dials is displayed near the operation dial. Consequently, it is possible to intuitively understand a relationship between each operation dial and an image picture thereof displayed on the display unit, and thus to provide a more favorable operability.

(48) The camera according to any one of (37) to (46), wherein, in a case where an operation dial is rotationally operated, the display control unit changes a display form of an image picture displayed nearest the rotationally operated operation dial.

According to this aspect, in a case where an operation dial is operated, a display form of an image picture displayed nearest the operated operation dial is changed. Consequently, it is possible to intuitively understand a relationship between each operation dial and an image picture thereof displayed on the display unit, and thus to provide a more favorable operability.

(49) The camera according to any one of (37) to (48), wherein the display control unit displays an image having a circular arc outer shape to which a part of the operation dial exposed from the camera body extends on the display unit as the image picture of the operation dial.

According to this aspect, an image picture of each operation dial is configured with an image which complements a hidden portion of the actual operation dial. Consequently, it is possible to further clarify the relevance between each operation dial and an image picture thereof displayed on the display unit, and thus to provide a more favorable operability.

(50) The camera according to any one of (37) to (49),
wherein the display control unit displays the image picture of each of the operation dials, corresponding to a function allocated to the operation dial, on the display unit.

According to this aspect, an image picture of an operation dial is configured with an image corresponding to a function allocated to the operation dial. Consequently, a function allocated to each operation dial can be visually recognized. An image picture corresponding to an allocated function is displayed, and thus an intuitive operation can be performed.

(51) The camera according to any one of (37) to (50), further comprising:
a function setting unit that sets a function to be allocated to each of the operation dials.

According to this aspect, it is possible to set a function to be allocated to an operation dial.

(52) The camera according to any one of (37) to (51),
wherein the display control unit further displays set contents of the camera on the display unit.

According to this aspect, the set contents of the camera are displayed on the display unit in addition to the image picture of each operation dial. Consequently, it is possible to understand the set contents of the camera on the basis of display on the display unit, and thus to ensure a more favorable operability. The set contents include at least one of a shutter speed, an F number, a sensitivity, or an imaging mode.

(53) The camera according to (52),
wherein the display control unit displays the set contents to be reduced in a case where the image picture is enlarged.

According to this aspect, in a case where the image picture of the operation dial is enlarged, the set contents of the camera are displayed to be reduced not to overlap the image picture. Consequently, even in a case where a size of the display unit is small, an image picture of an operated operation dial can be displayed to be as large as possible, and thus a favorable visibility can be ensured. The set contents of the camera can also be checked while operating the operation dial.

(54) The camera according to (52) or (53),
wherein the display control unit displays the set contents to be deviated to positions not overlapping the image picture in a case where the image picture is enlarged.

According to this aspect, in a case where the image picture of the operation dial is enlarged, display positions of the set contents of the camera are deviated not to overlap the image picture. Consequently, even in a case where a size of the display unit is small, an image picture of an operated operation dial can be displayed to be as large as possible, and thus a favorable visibility can be ensured. The set contents of the camera can also be checked while operating the operation dial.

(55) The camera according to (52),
wherein the display control unit displays the set contents to overlap the image picture in a case where the image picture is enlarged.

According to this aspect, the set contents of the camera are displayed to overlap the image picture in a case where the image picture is enlarged. Consequently, the set contents of the camera can also be checked while operating the operation dial.

(56) The camera according to any one of (52) to (55),
wherein the display control unit changes display items of the set contents in a case where the image picture is enlarged.

According to this aspect, display items of the set contents of the camera are changed in a case where the image picture is enlarged.

(57) A setting method for a camera which comprises a plurality of rotary operation dials that are disposed such that parts of outer circumferences of the rotary operation dials are exposed to an outer surface of a camera body and performs various settings by using the operation dials, the setting method comprising:
displaying an image picture of each of the operation dials on a display unit disposed on a top surface of the camera body; and
changing a display form of an image picture of a rotationally operated operation dial in a case where the operation dial is rotationally operated.

According to this aspect, an image picture of each operation dial is displayed on the display unit provided on the top surface of the camera body. In a case where an operation dial is operated, a display form of an image picture of the operated operation dial is changed. Consequently, it is possible to immediately understand an operation dial which is being operated.

(58) A setting method for a camera which comprises a plurality of rotary operation dials that are disposed such that parts of outer circumferences of the rotary operation dials are exposed to an outer surface of a camera body and performs various settings by using the operation dials, the setting method comprising:
displaying an image picture of each of the operation dials on a display unit disposed on a top surface of the camera body;
detecting contact with each of the operation dials; and
changing a display form of an image picture of an operation dial with which the contact is detected in a case where the contact with the operation dial is detected.

According to this aspect, an image picture of each operation dial is displayed on the display unit provided on the top surface of the camera body. In a case where the finger comes into contact with an operation dial, a display form of an image picture of the operation dial with which the finger comes into contact is changed. Consequently, it is possible to immediately understand an operation dial to be operated.

(59) A setting method for a camera which comprises a plurality of rotary operation dials that are disposed such that parts of outer circumferences of the rotary operation dials and on which a pushing operation is possible are exposed to an outer surface of a camera body and performs various settings by using the operation dials, the setting method comprising:
displaying an image picture of each of the operation dials on a display unit disposed on a top surface of the camera body; and
changing a display form of an image picture of an operation dial on which a pushing operation is performed in a case where the pushing operation is performed on the operation dial.

According to this aspect, an image picture of each operation dial is displayed on the display unit provided on the top surface of the camera body. In a case where a pushing operation is performed on an operation dial, a display form of an image picture of the operation dial on which the pushing operation is performed is changed. Consequently, it is possible to immediately understand a dial to be operated.

According to the present invention, it is possible to provide a camera having a compact configuration and a high operability.

BRIEF DESCRIPTION OF THE DRAWINGS

FIG. 7 is a list of functions allocated to the first rear command dial and the second rear command dial according to a setting state of the digital camera.

DESCRIPTION OF THE PREFERRED EMBODIMENTS

Hereinafter, preferred embodiments of the present invention will be described in detail with reference to the accompanying drawings.

First Embodiment

[Exterior Configuration]

Figure 1:
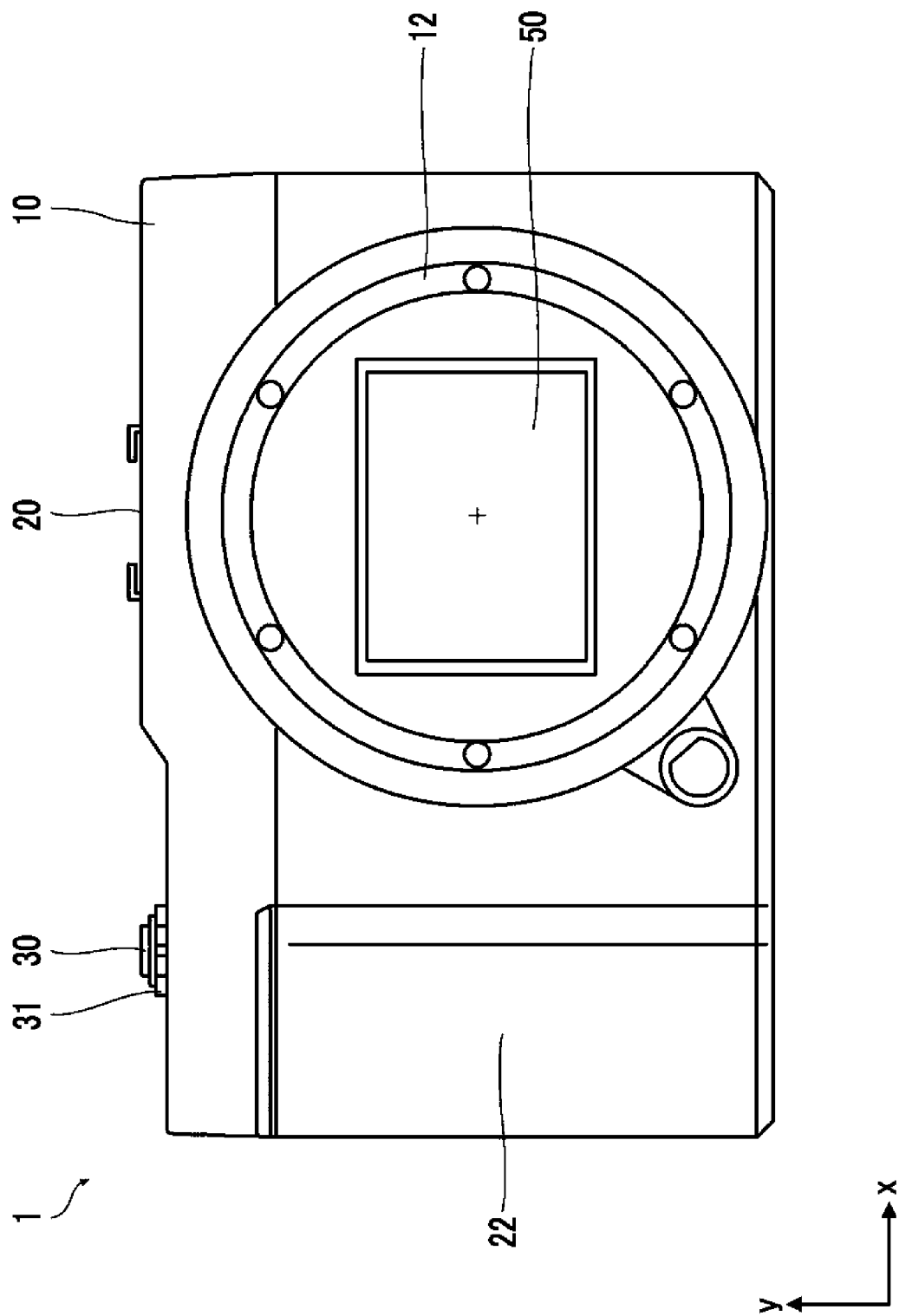
FIG. 1 is a front view illustrating an example of a digital camera to which the present invention is applied.
Figure 2:
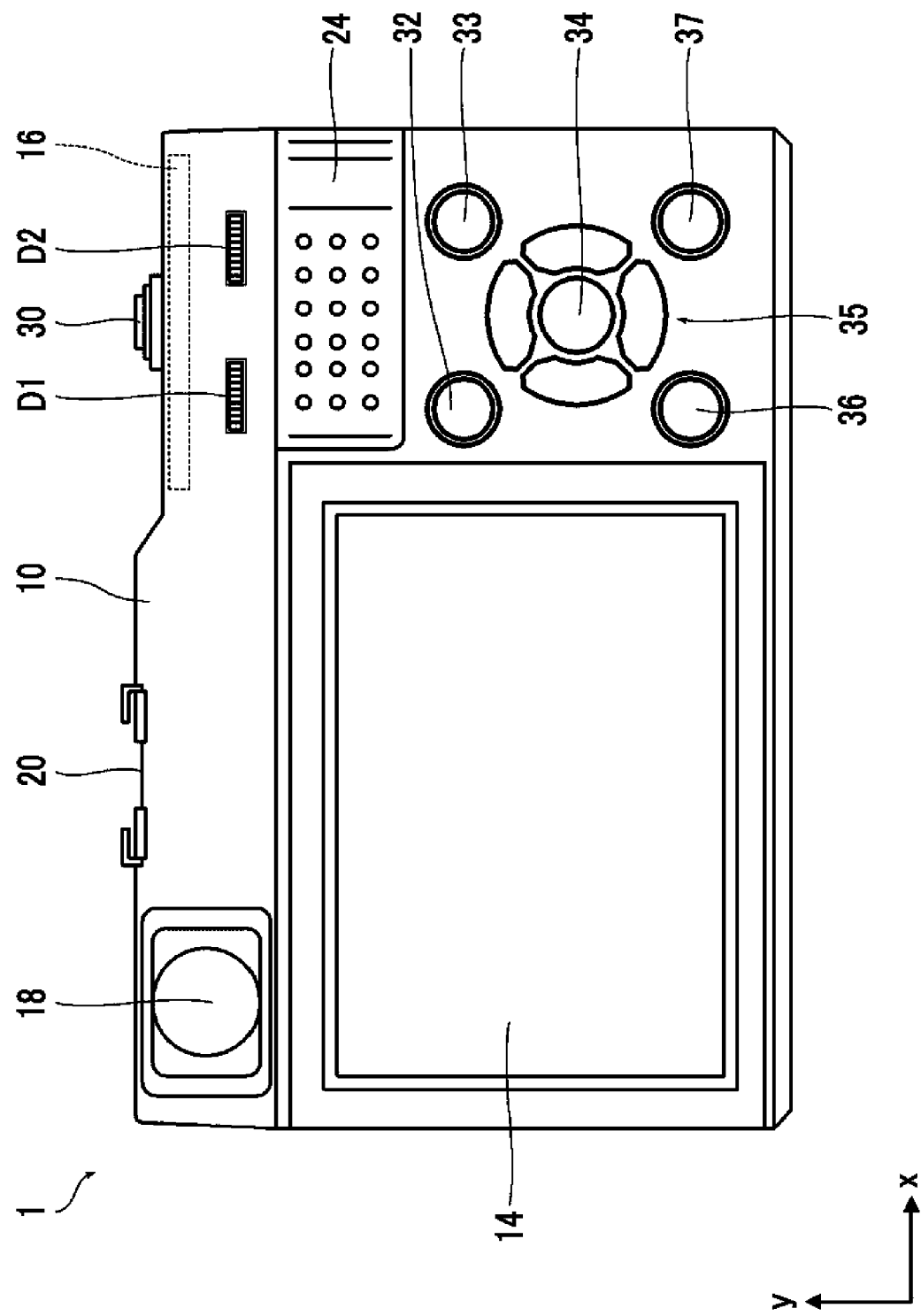
FIG. 2 is a rear view illustrating an example of the digital camera to which the present invention is applied.
Figure 3:
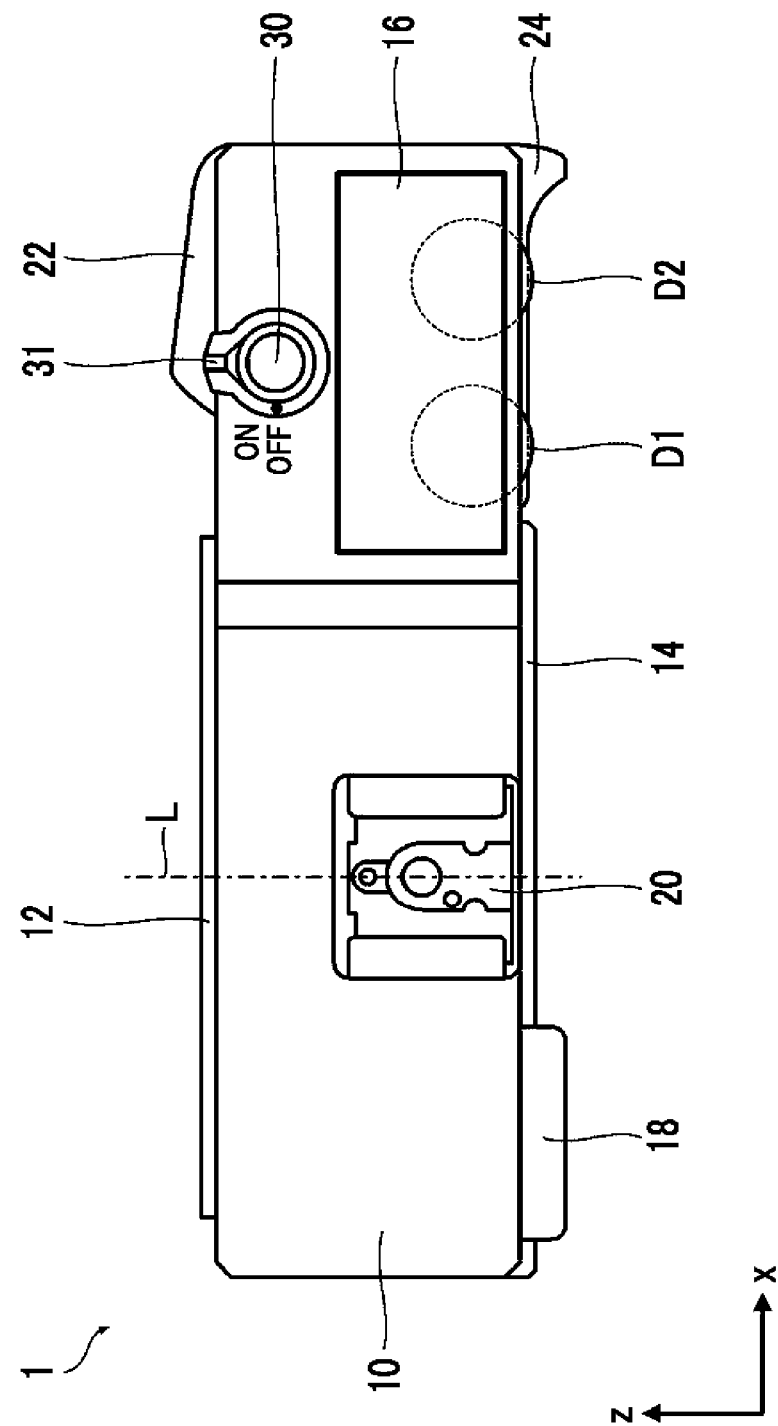
FIG. 3 is a plan view illustrating an example of the digital camera to which the present invention is applied.

FIGS. 1, 2, and 3 are respectively a front view, a rear view, and a plan view illustrating an example of a digital camera to which the present invention is applied.

In the present specification, a direction (a z direction in FIG. 3) parallel to an optical axis L is referred to as a front-and-rear direction, and a subject side is referred to as a front side. On a plane orthogonal to the optical axis L, a direction parallel to a long side of an image sensor 50 (an x direction in FIG. 1) is referred to as a horizontal direction or a leftward-and-rightward direction, and a direction parallel to a short side of the image sensor 50 (a y direction in FIG. 1) is referred to as a vertical direction or an upward-and-downward direction.

A digital camera 1 of the present embodiment is a lens-interchangeable digital camera, and is a non-reflex digital camera. The lens-interchangeable digital camera is a digital camera of which a lens can be interchanged. The non-reflex digital camera is a digital camera not including a reflex mirror for guiding light, which is incident from a lens, to an optical finder, and is also referred to as a mirrorless digital camera.

Figure 4:
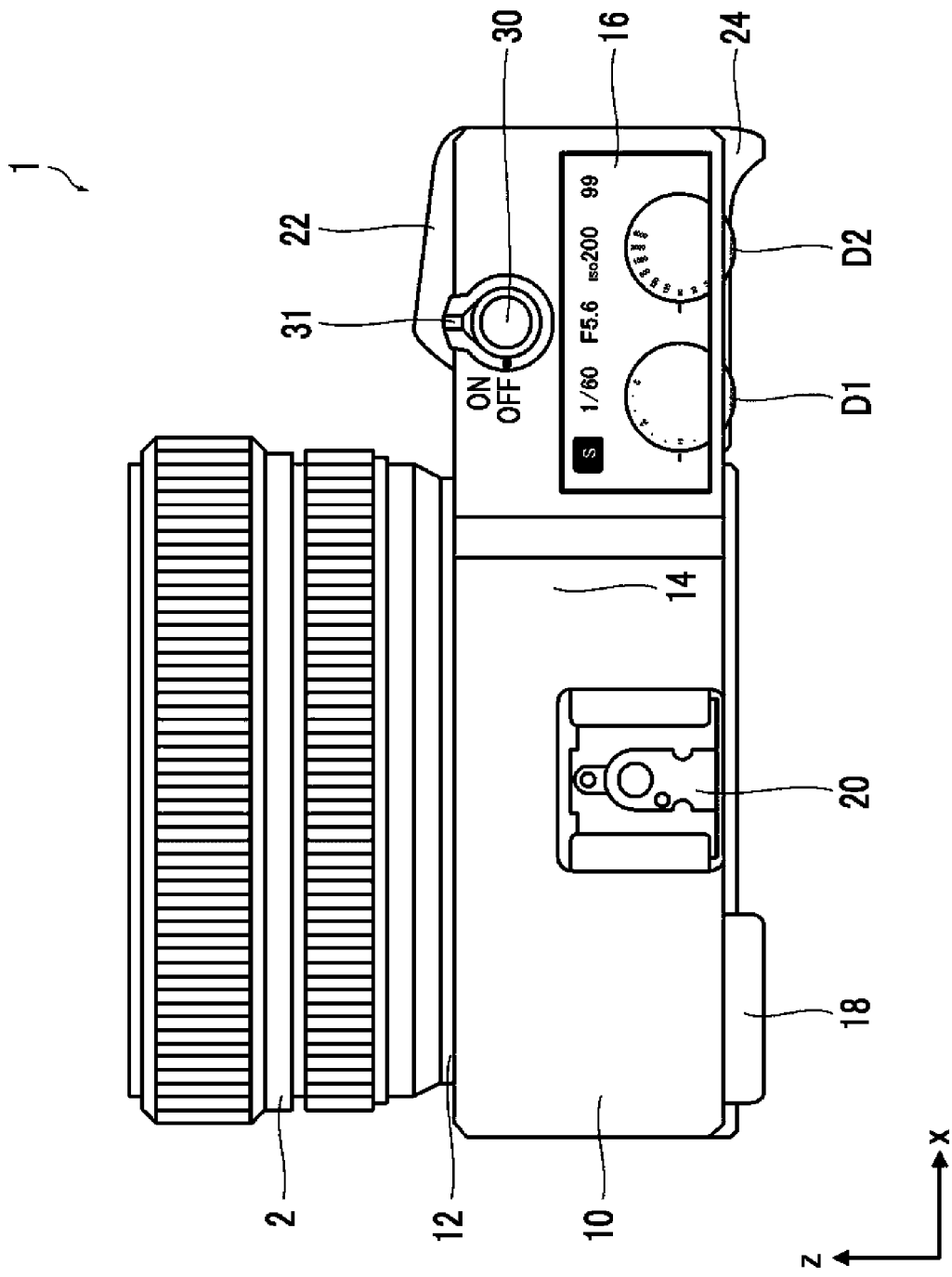
FIG. 4 is a plan view of the digital camera on which a lens is mounted.

FIG. 4 is a plan view of the digital camera on which a lens is mounted. As illustrated in FIG. 4, the digital camera 1 of the present embodiment is used in a state in which a lens 2 is mounted on a camera body 10.

As illustrated in FIGS. 1 to 4, the camera body 10 comprises a lens mount 12, a main display 14, a sub-display 16, an electronic view finder 18, a hot shoe 20, and the like. As operation members, a shutter button 30, a power supply lever 31, a reproduction button 32, an imaging setting button 33, a menu button 34, a selector button 35, a display button 36, an erase button 37, a first rear command dial D1, a second rear command dial D2, and the like may be provided.

<<Camera Body>>

The camera body 10 has the shape of a rectangular box that is thin in the front-and-rear direction. One (left in FIG. 1) end portion of the camera body 10 is configured as a grip portion. A user performs a release operation in a state of holding the grip portion. The grip portion comprises a grip 22 on the front surface side, and a thumb rest 24 on the rear surface side.

<<Lens Mount>>

The lens mount 12 is a mounting portion for the lens 2. As illustrated in FIG. 1, the lens mount 12 is provided on the front surface of the camera body 10. The lens 2 is attachably and detachably mounted on the lens mount 12. The lens mount 12 is configured in a bayonet type.

<<Main Display>>

The main display 14 is generally a display used to display an image. As illustrated in FIG. 2, the main display 14 is provided on the rear surface of the camera body 10. The main display 14 is configured with, for example, a color liquid crystal display (LCD).

As described above, the main display 14 is generally used to display an image. A displayed image includes not only a captured image but also a live view image. A live view is a function of displaying an image recognized by the image sensor in a real time. An angle of view, a focus state, or the like can be checked on the main display by performing the live view.

The main display 14 is also used as a graphical user interface (GUI). In other words, in a case where various settings are performed, a setting screen is displayed on the main display 14, and the various settings are performed on the setting screen.

<<Sub-display>>

The sub-display 16 is an example of a display unit. The sub-display 16 is configured with a small-screen display device compared with the main display 14. As illustrated in FIG. 3, the sub-display 16 is provided on a top surface of the camera body 10. Particularly, in the digital camera 1 of the present embodiment, the sub-display 16 is provided on the top surface of the camera body 10 on the grip portion side. The sub-display 16 is configured with, for example, a reflective LCD comprising an illumination lamp.

Set contents of the digital camera 1, and the like are displayed on the sub-display 16. As will be described later, image pictures of the first rear command dial D1 and the second rear command dial D2 are displayed on the sub-display 16. The image pictures are images corresponding to functions allocated to the dials. A user operates the first rear command dial D1 and the second rear command dial D2 while checking display on the sub-display 16. This will be described later in detail.

<<Electronic View Finder>>

The electronic view finder (EVF) 18 is an electronic finder having an LCD built thereinto. As illustrated in FIG. 2, the electronic view finder 18 is provided on the rear surface of the camera body 10, and is disposed at the upper right corner of the rear surface.

<<Hot Shoe>>

The hot shoe 20 is an attachment portion of an external flash. As illustrated in FIG. 3, the hot shoe 20 is provided on the top surface of the camera body 10.

<<Operation Members>>

The camera body 10 comprises the shutter button 30, the power supply lever 31, the reproduction button 32, the imaging setting button 33, the menu button 34, the selector button 35, the display button 36, the erase button 37, the first rear command dial D1, and the second rear command dial D2 as operation members.

<Shutter Button>

The shutter button 30 is provided on the top surface (upper surface) of the camera body 10 on the grip portion side. The shutter button 30 is configured with a so-called two-stage switch that has a half-pressed stage and a fully-pressed stage. In a case where the shutter button 30 is half pressed, imaging preparation such as the metering of light or the measurement of a distance is performed. In a case where the shutter button 30 is fully pressed, main imaging is performed.

<Power Supply Lever>

The power supply lever 31 is disposed coaxially with the shutter button 30. The power supply lever 31 is configured with a rotary lever. In a case where the power supply lever 31 is rotated to an ON position, a power supply of the digital camera 1 is turned on. In a case where the power supply lever 31 is rotated to an OFF position, the power supply of the digital camera 1 is turned off.

<Reproduction Button>

The reproduction button 32 is a button which is used to switch a mode of the digital camera 1 to a reproduction mode. The reproduction button 32 is provided on the rear surface of the camera body 10. In a case where the reproduction button 32 is pressed in a state in which a mode of the digital camera 1 is set to an imaging mode, the mode of the digital camera 1 is switched to the reproduction mode. In a case where the reproduction mode is set, an image captured last is displayed on the main display 14.

A function of switching the reproduction mode to the imaging mode is allocated to the shutter button 30. In a case where the shutter button 30 is pressed in a state in which the reproduction mode is set, the mode of the digital camera 1 is switched to the imaging mode.

<Imaging Setting Button>

The imaging setting button 33 is a button used to call an imaging condition setting screen on the main display 14. The imaging setting button 33 is provided on the rear surface of the camera body 10. In a case where the imaging setting button 33 is pressed, a screen for setting various imaging conditions such as an imaging mode, a focus mode, a sensitivity, an image size, an image quality mode, and a self timer is displayed on the main display 14. The user performs desired setting by using the selector button 35 or the like according to the display on the main display 14.

<Menu Button>

The menu button 34 is a button used to call a menu screen on the main display 14. The menu button 34 is provided on the rear surface of the camera body 10. In a case where the menu button 34 is pressed in a state in which the imaging mode or the reproduction mode is set, a menu screen is displayed on the main display 14.

The menu button 34 also functions as a button used to determine a selection item, a check item, or the like displayed on the main display 14, that is, an OK button.

<Selector Button>

The selector buttons 35 are configured with four buttons such as upward, downward, rightward, and leftward buttons which are arranged on an identical circle centering on the menu button 34. A function according to a set situation of the digital camera 1 is allocated to each button. For example, in a case where the digital camera 1 is set to the reproduction mode, in FIG. 2, a one-frame feed function is allocated to the rightward button, and a one-frame return function is allocated to the leftward button. A zoom-in function is allocated to the upward button, and a zoom-out function is allocated to the downward button. In a case where the digital camera 1 is set to the imaging mode, in FIG. 2, a function of calling a white balance setting screen is allocated to the rightward button, and a function of calling a self timer setting screen is allocated to the leftward button. A function of calling an automatic focus (AF) mode setting screen is allocated to the upward button, and a function of calling a consecutive shot mode setting screen is allocated to the downward button. In a case where various setting screens are called on the main display 14, the selector button 35 functions as a button for moving a cursor in each direction on the screen.

<Display Button>

The display button 36 is a button used to give an instruction for switching a display form of the main display 14. The display button 36 is provided on the rear surface of the camera body 10. In a case where the display button 36 is pressed in a state in which the reproduction mode or the imaging mode is set, a display form of the main display 14 is switched. For example, in a case where the display button 36 is pressed in a state in which the reproduction mode is set, an imaging condition or a histogram for an image displayed on the main display 14 is displayed to overlap the image. For example, in a case where the display button 36 is pressed in a state in which the imaging mode is set, various pieces of information such as an imaging condition or a histogram are displayed to overlap a live view image.

The display button 36 also functions as a button used to instruct display on the main display 14 to be returned to a previous state, that is, a BACK button. In a case where the display button 36 is pressed in a state in which various setting screens are displayed on the main display 14, display on the main display 14 is returned to a previous state. Consequently, a selection item or a check item may be canceled.

<Erase Button>

The erase button 37 is a button used to instruct a captured image displayed on the main display 14 to be erased. The erase button 37 is provided on the rear surface of the camera body 10. In a case where the erase button 37 is pressed in a state in which a captured image is displayed on the main display 14, a screen for checking erasure is displayed on the main display 14. In a case where erasure is instructed to be performed according to display on the main display 14, a captured image which is being reproduced is erased from a memory card.

<First Rear Command Dial and Second Rear Command Dial>

The first rear command dial D1 and the second rear command dial D2 are examples of a plurality of operation dials provided on the camera body 10. Various functions are allocated to the first rear command dial D1 and the second rear command dial D2 according to setting states of the digital camera 1. As illustrated in FIG. 2, the first rear command dial D1 and the second rear command dial D2 are provided on the rear surface of the camera body 10. Particularly, in the digital camera 1 of the present embodiment, the dials are disposed at the upper left corner of the rear surface, and are disposed in parallel to each other in the horizontal direction.

Both of the first rear command dial D1 and the second rear command dial D2 are disposed at positions where the dials can be operated with the thumb of the hand holding the grip portion. More specifically, the first rear command dial D1 and the second rear command dial D2 are at positions where the dials can be operated through an operation of sliding the thumb of the hand holding the grip portion in the horizontal direction.

The first rear command dial D1 and the second rear command dial D2 are disposed under the sub-display 16 as illustrated in FIG. 3. In other words, the first rear command dial D1 and the second rear command dial D2 are disposed at positions overlapping the sub-display 16 under the sub-display 16. The first rear command dial D1 and the second rear command dial D2 are disposed under the sub-display 16 inside the camera body 10, and parts of outer circumferences thereof are disposed to be exposed to the outer surface of the camera body 10. Consequently, the first rear command dial D1 and the second rear command dial D2 are disposed in the camera body 10 in a state in which parts of top surfaces thereof are covered by the sub-display 16. The user rotationally operates the first rear command dial D1 and the second rear command dial D2 by using the portions exposed from the outer surface of the camera body 10.

Both of the first rear command dial D1 and the second rear command dial D2 are rotatably provided in an endless manner, and are provided to be operable in a normal rotation direction and a reverse rotation direction. Rotation axes of the first rear command dial D1 and the second rear command dial D2 are set to be parallel to the y direction.

Each of the first rear command dial D1 and the second rear command dial D2 has a click mechanism, and is configured to undergo click stop at a predetermined angle interval. The click stop is a function of stopping rotation according to a click feeling. The click mechanism is provided, and thus a click feeling is generated at a predetermined angle interval in a case where each of the first rear command dial D1 and the second rear command dial D2 is rotated. Such a type of click mechanism is a well-known technique, and a description of a detailed configuration thereof will be omitted.

Each of the first rear command dial D1 and the second rear command dial D2 is configured to undergo a pushing operation. The pushing operation is an operation of pushing the first rear command dial D1 and the second rear command dial D2 toward the camera body 10. The pushing direction is a direction orthogonal to the rotation axis. In the digital camera 1 of the present embodiment, the first rear command dial D1 and the second rear command dial D2 are provided such that a pushing operation is possible in the front direction along the optical axis L. Such a type of pushing operation mechanism is a well-known technique, and a description of a detailed configuration thereof will be omitted.

As described above, various functions are allocated to the first rear command dial D1 and the second rear command dial D2 according to a setting state of the digital camera 1. As described above, image pictures of the first rear command dial D1 and the second rear command dial D2 are displayed on the sub-display 16. The image pictures are images corresponding to functions allocated to the first rear command dial D1 and the second rear command dial D2. The functions allocated to the first rear command dial D1 and the second rear command dial D2 and display of the image pictures on the sub-display 16 will be described later in detail.

[Control System]

Figure 5:
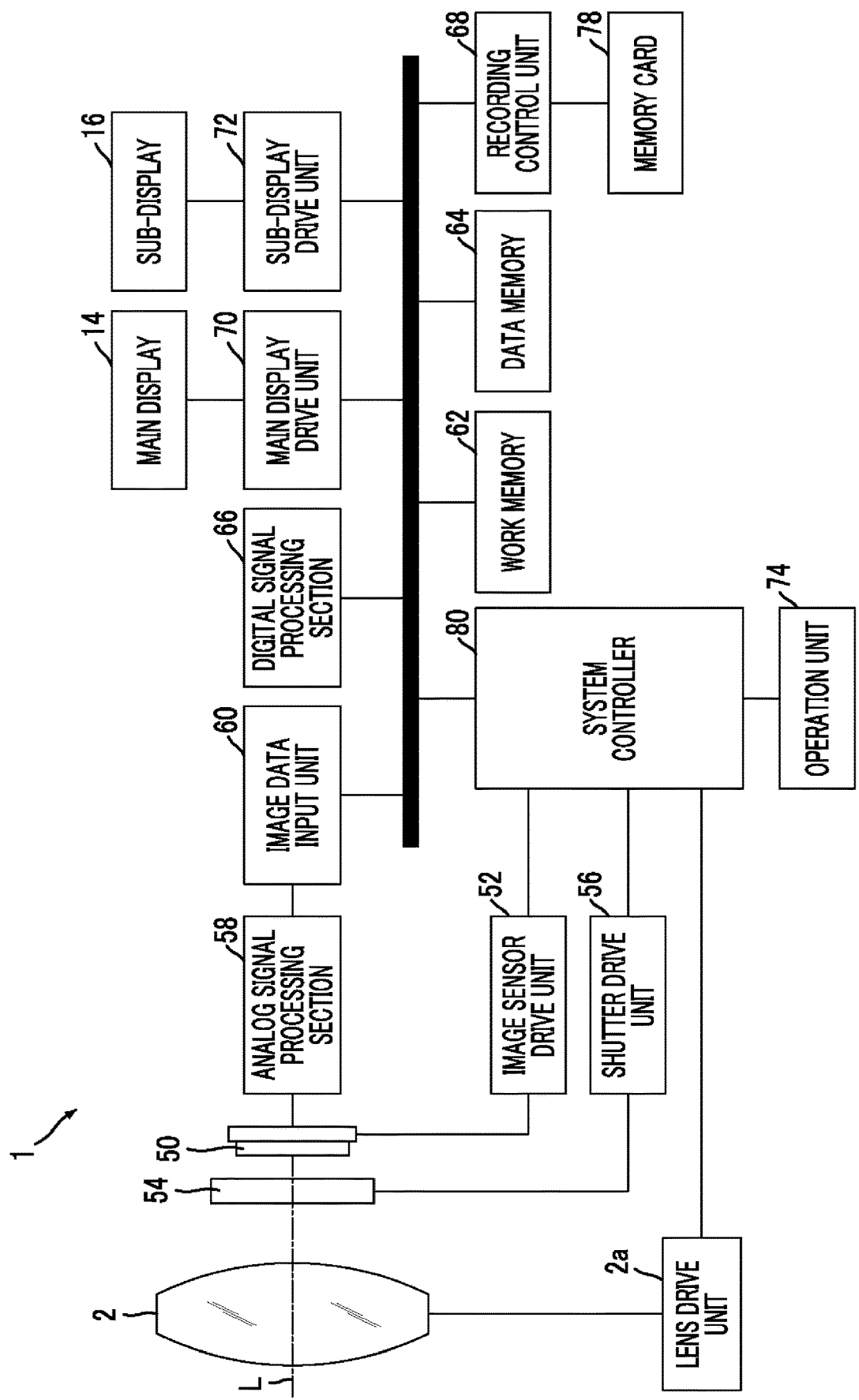
FIG. 5 is a block diagram illustrating the schematic configuration of a control system of the digital camera.

FIG. 5 is a block diagram illustrating the schematic configuration of a control system of the digital camera.

The digital camera 1 includes the image sensor 50, an image sensor drive unit 52, a shutter 54, a shutter drive unit 56, an analog signal processing section 58, an image data input unit 60, a work memory 62, a data memory 64, a digital signal processing section 66, a recording control unit 68, a main display drive unit 70, a sub-display drive unit 72, an operation unit 74, a system controller 80, and the like.

The image sensor 50 converts an optical image of a subject, which is formed through the lens 2, into electrical signals and outputs the electrical signals. A well-known image sensor, such as a charged coupled device (CCD) image sensor or a complementary metal oxide semiconductor (CMOS) image sensor, is used as the image sensor 50.

The image sensor drive unit 52 drives the image sensor 50 according to a command output from the system controller 80.

The shutter 54 is configured with a square type focal-plane shutter, and is disposed directly in front of the image sensor 50. FIG. 1 illustrates a state in which the shutter is fully opened.

The shutter drive unit 56 drives the shutter 54 according to a command output from the system controller 80.

The analog signal processing section 58 receives the signals output from the image sensor 50, and performs required signal processes, such as a correlated double sampling process and an amplification process. The analog signal processing section 58 converts analog image signals, which have been subjected to required signal processes, into digital image signals and outputs the digital image signals.

The image data input unit 60 receives the digital image signals, which are output from the analog signal processing section 58, according to a command output from the system controller 80. Received data regarding one image is stored in the work memory 62.

The work memory 62 is used as a memory for work. The data memory 64 is configured with a non-volatile memory such as an electrically erasable programmable read only memory (EEPROM), and data required for control and the like are stored in the data memory 64.

The digital signal processing section 66 performs required signal processes such as a demosaicing process, white balance correction, gamma correction, and outline correction, on the image data received in the work memory 62, and generates predetermined image data configured with luminance data (Y data) and color difference data (Cr and Cb data).

The recording control unit 68 has access to the memory card 78 and reads and writes data according to a command output from the system controller 80. Image data which is obtained through imaging is recorded in the memory card 78.

The main display drive unit 70 drives the main display 14 according to a command output from the system controller 80.

The sub-display drive unit 72 drives the sub-display 16 according to a command output from the system controller 80.

The operation unit 74 includes the shutter button 30, the power supply lever 31, the reproduction button 32, the imaging setting button 33, the menu button 34, the selector button 35, the display button 36, the erase button 37, alternatively, and outputs a signal corresponding to an operation on each operation member to the system controller 80.

The system controller 80 is a control unit which controls an operation of each unit of the digital camera 1. The system controller 80 is configured with a microcomputer. That is, the microcomputer functions as the system controller 80 by executing a predetermined control program, and functions as a control unit which controls an operation of each unit of the digital camera 1.

The system controller 80 also functions as a control unit for the lens 2. The system controller 80 controls an operation of the lens 2 via a lens drive unit 2a provided for the lens 2.

The lens 2 comprises a stop, a focus lens, and the like. The lens drive unit 2a comprises a stop drive unit which drives the stop, a focus lens drive unit which drives the focus lens, and the like.

[Operation System using First Rear Command Dial and Second Rear Command Dial]

Figure 6:
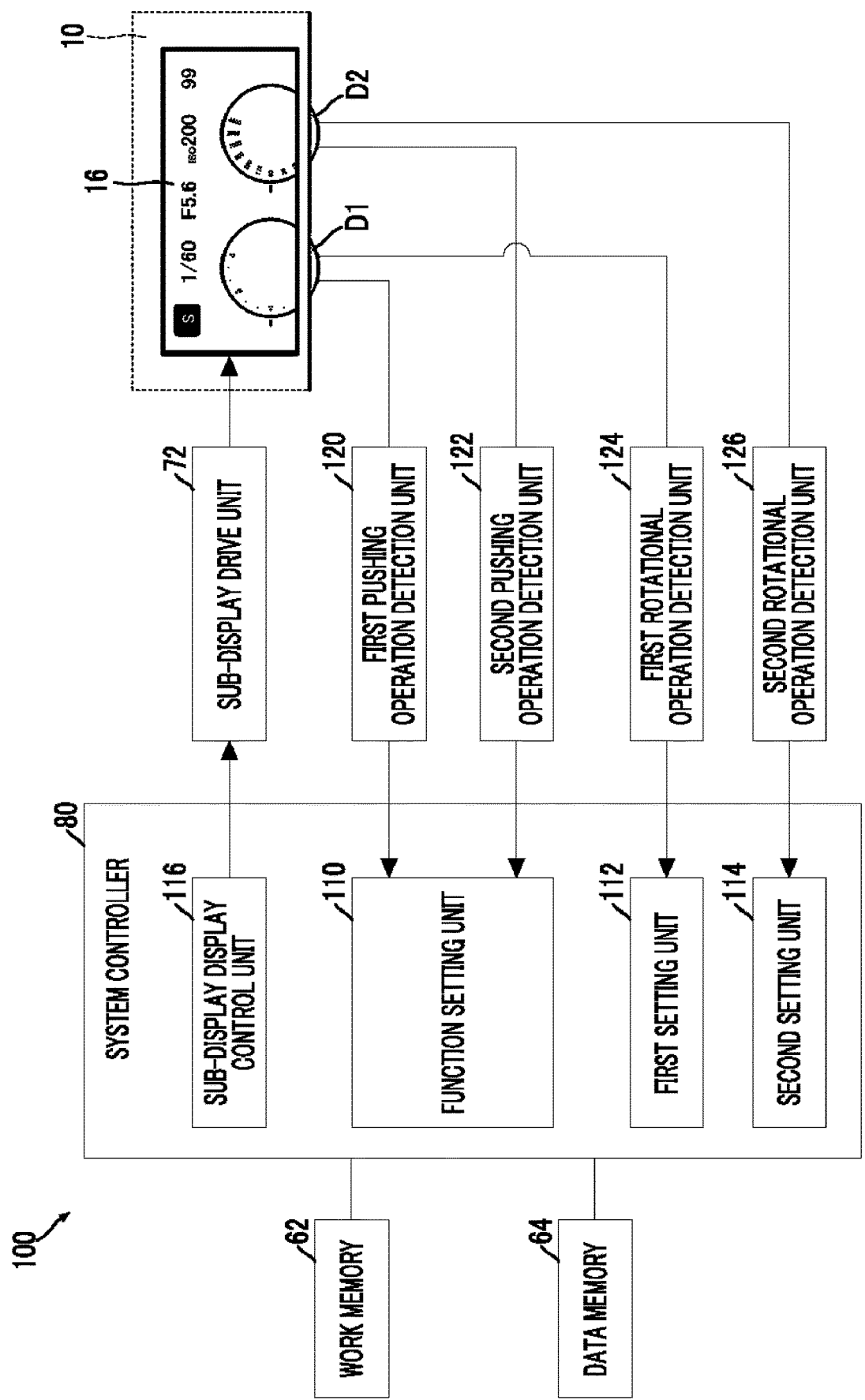
FIG. 6 is a functional block diagram of an operation system using a first rear command dial and a second rear command dial.

FIG. 6 is a functional block diagram of an operation system using the first rear command dial and the second rear command dial.

An operation system 100 using the first rear command dial and the second rear command dial comprises a function setting unit 110 which sets functions to be allocated to the first rear command dial D1 and the second rear command dial D2, a first setting unit 112 which sets a function allocated to the first rear command dial D1 or gives an instruction for the function in response to an operation on the first rear command dial D1, a second setting unit 114 which sets a function allocated to the second rear command dial D2 or gives an instruction for the function in response to an operation on the second rear command dial D2, and a sub-display display control unit 116 which controls display on the sub-display 16.

<<Function Setting Unit>>

The function setting unit 110 sets functions to be allocated to the first rear command dial D1 and the second rear command dial D2. Functions to be allocated to the first rear command dial D1 and the second rear command dial D2 are switched to each other according to a setting state of the digital camera 1. The functions to be allocated to the first rear command dial D1 and the second rear command dial D2 are automatically switched to each other according to a pushing operation on the first rear command dial D1 and the second rear command dial D2.

<Functions to be Allocated According to Setting State of Digital Camera>

FIG. 7 is a list of functions to be allocated to the first rear command dial and the second rear command dial according to a setting state of the digital camera.

Functions to be allocated to the first rear command dial D1 and the second rear command dial D2 are switched to each other in an imaging mode and a reproduction mode. Even in the imaging mode, functions to be allocated are switched to each other according to a set mode. FIG. 7 illustrates an example of a case where a program, shutter speed priority, stop priority, and manual are prepared as selectable imaging modes.

Here, the program is a mode in which the user can change a combination of an F number and a shutter speed in a state in which exposure is constant. The program is an imaging mode in which a so-called program shift is possible.

The shutter speed priority is a mode in which the camera automatically determines an F number causing appropriate exposure for a shutter speed selected by the user.

The stop priority is a mode in which the camera automatically determines a shutter speed causing appropriate exposure for an F number selected by the user.

The manual is a mode in which a shutter speed or an F number is selected by the user.

(1) Program

In a case where an imaging mode is set to the program, a function of setting an exposure correction value is allocated to the first rear command dial D1. In other words, in a case where an imaging mode is set to the program, a function of an exposure correction dial is allocated to the first rear command dial D1. A program shift function is allocated to the second rear command dial D2.

Here, the program shift is a function of changing a combination of an F number and a shutter speed in a state in which exposure is constant. In this example, in a case where the dial is rotated counterclockwise, a shutter speed is increased, and, in a case where the dial is rotated clockwise, a shutter speed is reduced.

(2) Shutter Speed Priority

In a case where an imaging mode is set to the shutter speed priority, a function of setting an exposure correction value is allocated to the first rear command dial D1. In other words, in a case where an imaging mode is set to the shutter speed priority, a function of an exposure correction dial is allocated to the first rear command dial D1. The function of setting a shutter speed is allocated to the second rear command dial D2. In other words, a function of a shutter speed dial is allocated to the second rear command dial D2.

(3) Stop Priority

In a case where an imaging mode is set to the stop priority, a function of setting an exposure correction value is allocated to the first rear command dial D1. In other words, in a case where an imaging mode is set to the stop priority, a function of an exposure correction dial is allocated to the first rear command dial D1. A function of setting an F number is allocated to the second rear command dial D2. In other words, a function of a stop dial is allocated to the second rear command dial D2.

(4) Manual

In a case where an imaging mode is set to the manual, a function of setting a shutter speed is allocated to the first rear command dial D1. In other words, in a case where an imaging mode is set to the manual, a function of a shutter speed dial is allocated to the first rear command dial D1. A function of setting an F number is allocated to the second rear command dial D2. In other words, a function of a stop dial is allocated to the second rear command dial D2.

(5) Reproduction Mode

In a case where the digital camera 1 is set to the reproduction mode, a function of giving an instruction for frame feed is allocated to the first rear command dial D1. In other words, a function of a fame feed dial is allocated to the first rear command dial D1. A function of giving an instruction for reproduction zoom is allocated to the second rear command dial D2. In other words, a function of a reproduction zoom dial is allocated to the second rear command dial D2.

In a case where the reproduction mode is set, and the first rear command dial D1 is rotated counterclockwise, an image is fed by one frame every click. In a case where the first rear command dial D1 is rotated clockwise, an image is reversely fed by one frame every click.

In a case where the reproduction mode is set, and the second rear command dial D2 is rotated counterclockwise, an image which is being reproduced is enlarged with a predetermined magnification every click. In a case where the second rear command dial D2 is rotated clockwise, an image which is being reproduced is reduced with a predetermined magnification every click.

<Function to be Allocated According to Pushing Operation>

In a case where the first rear command dial D1 is subjected to a pushing operation in a state in which the digital camera 1 is set to an imaging mode, a function of selecting an imaging mode is allocated to the first rear command dial D1. In other words, a function of a mode dial is allocated to the first rear command dial D1.

In a case where the second rear command dial D2 is subjected to a pushing operation in a state in which the digital camera 1 is set to an imaging mode, a function of setting a sensitivity is allocated to the second rear command dial D2.

In a case where the function of a mode dial is allocated to the first rear command dial D1, and the first rear command dial D1 is subjected to a pushing operation, functions corresponding to a selected imaging mode are allocated to the first rear command dial D1 and the second rear command dial D2. Similarly, in a case where the function of a mode dial is allocated to the second rear command dial D2, and the second rear command dial D2 is subjected to a pushing operation, functions corresponding to a selected imaging mode are allocated to the first rear command dial D1 and the second rear command dial D2.

The function of the function setting unit 110 is provided as one of the functions of the system controller 80. In other words, in a case where functions to be allocated to the first rear command dial D1 and the second rear command dial D2 are set, the system controller 80 functions as the function setting unit 110.

A pushing operation on the first rear command dial D1 is detected by a first pushing operation detection unit 120 provided in the first rear command dial D1. The first pushing operation detection unit 120 detects that the first rear command dial D1 is pushed by a predetermined amount or more, so as to detect a pushing operation on the first rear command dial D1. A detection result in the first pushing operation detection unit 120 is output the system controller 80.

A pushing operation on the second rear command dial D2 is detected by a second pushing operation detection unit 122 provided in the second rear command dial D2. The second pushing operation detection unit 122 detects that the second rear command dial D2 is pushed by a predetermined amount or more, so as to detect a pushing operation on the second rear command dial D2. A detection result in the second pushing operation detection unit 122 is output the system controller 80.

<<First Setting Unit>>

The first setting unit 112 sets a function allocated to the first rear command dial D1 or gives an instruction for the function in response to a rotational operation on the first rear command dial D1. For example, in a case where the function of setting an exposure correction value is allocated to the first rear command dial D1, the first setting unit 112 sets an exposure correction value in response to a rotational operation on the first rear command dial D1. In a case where the function of giving an instruction for frame feed is allocated to the first rear command dial D1, an instruction for frame feed is given in response to a rotational operation on the first rear command dial D1.

Here, the rotational operation on the first rear command dial D1 is detected by a first rotational operation detection unit 124 provided in the first rear command dial D1. The first rotational operation detection unit 124 detects a rotational operation direction and a rotational operation amount for the first rear command dial D1. The first rotational operation detection unit 124 is configured with, for example, well-known rotation detection means such as a rotary encoder or a rotation brush. A detection result in the first rotational operation detection unit 124 is output to the system controller 80.

<<Second Setting Unit>>

The second setting unit 114 set a function allocated to the second rear command dial D2 or gives an instruction for the function in response to a rotational operation on the second rear command dial D2. For example, in a case where the function of setting a shutter speed is allocated to the second rear command dial D2, the second setting unit 114 sets a shutter speed in response to a rotational operation on the second rear command dial D2. In a case where the function of giving an instruction for reproduction zoom is allocated to the second rear command dial D2, an instruction for zoom-in or zoom-out is given in response to a rotational operation on the second rear command dial D2.

Here, the rotational operation on the second rear command dial D2 is detected by a second rotational operation detection unit 126 provided in the second rear command dial D2. The second rotational operation detection unit 126 detects a rotational operation direction and a rotational operation amount for the second rear command dial D2. The second rotational operation detection unit 126 is configured with, for example, well-known rotation detection means such as a rotary encoder or a rotation brush. A detection result in the second rotational operation detection unit 126 is output to the system controller 80.

<<Sub-display Display Control Unit>>

The sub-display display control unit 116 is an example of a display control unit. The sub-display display control unit 116 controls display on the sub-display 16 which is a display unit. The sub-display display control unit 116 displays set contents of the digital camera 1 on the sub-display 16. The sub-display display control unit 116 displays image pictures of the first rear command dial D1 and the second rear command dial D2 on the sub-display 16.

Here, the image pictures of the first rear command dial D1 and the second rear command dial D2 are images indicating the first rear command dial D1 and the second rear command dial D2 which are rotary operation dials. The images are configured with images corresponding to functions allocated to the first rear command dial D1 and the second rear command dial D2. For example, in a case where the function of setting an exposure correction value is allocated to the first rear command dial D1, an image picture thereof is configured with an image including a dial plate for exposure correction. In a case where the function of setting a shutter speed is allocated to the second rear command dial D2, an image picture thereof is configured with an image including a dial plate for setting a shutter speed.

The sub-display display control unit 116 controls display on the sub-display 16 according to settings of the digital camera 1. The sub-display display control unit 116 controls display on the sub-display 16 according to operations on the first rear command dial D1 and the second rear command dial D2.

Hereinafter, a description will be made of control of display on the sub-display 16 in the sub-display display control unit 116.

[Display on Sub-display]

Figure 8:
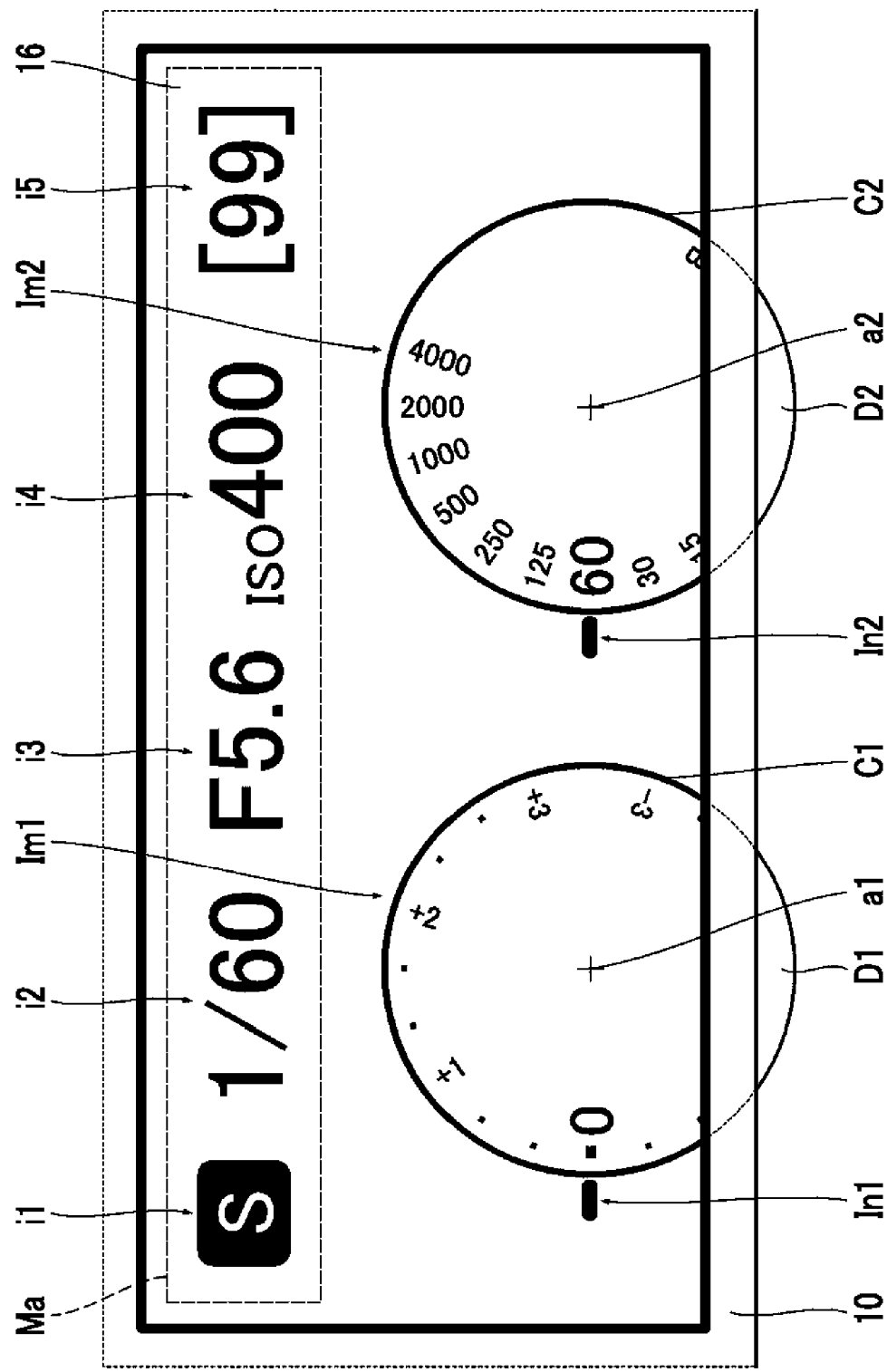
FIG. 8 is a plan view illustrating an example of display on a sub-display.

FIG. 8 is a plan view illustrating an example of display on the sub-display.

As mentioned above, the set contents of the digital camera 1 and the image pictures of the first rear command dial D1 and the second rear command dial D2 are displayed on the sub-display 16.

<<Set Contents of Digital Camera>>

As illustrated in FIG. 8, in the digital camera 1 of the present embodiment, information i1 regarding a currently set imaging mode, information i2 regarding a currently set shutter speed, information i3 regarding a currently set F number, information i4 regarding a currently set sensitivity, and information i5 regarding the number of images which can be captured are displayed on the sub-display 16 as the set contents of the digital camera 1.

The pieces of information i2 to i5 regarding a shutter speed, an F number, a sensitivity (ISO sensitivity (ISO: International Organization for Standardization)), and the number of images which can be captured are displayed by numerical values, and the information i1 regarding an imaging mode is displayed by a symbol. FIG. 8 illustrates an example of a case where an imaging mode is set to the shutter speed priority, a shutter speed is set to 1/60 seconds, an F number is set to F5.6, a sensitivity is set to ISO200, and the number of images which can be captured is 99. In a case where an imaging mode is set to the program, the imaging mode is displayed by a system of the letter "P". In a case where an imaging mode is set to the shutter speed priority, the imaging mode is displayed by a system of the letter "S". In a case where an imaging mode is set to the stop priority, the imaging mode is displayed by a system of the letter "A". In a case where an imaging mode is set to the manual, the imaging mode is displayed by a system of the letter "M".

The sub-display display control unit 116 acquires information regarding the set contents of the digital camera 1, and displays the respective pieces of information i1 to i5 at predetermined positions.

<<Image Pictures of First Rear Command Dial and the Second Rear Command Dial>>

As described above, an image picture Im1 of the first rear command dial D1 and an image picture Im2 of the second rear command dial D2 are configured with images indicating the first rear command dial D1 and second rear command dial D2, and are configured with images including at least dial plates.

The image picture Im1 of the first rear command dial D1 and the image picture Im2 of the second rear command dial D2 are respectively configured with images complementing hidden portions of the first rear command dial D1 and the second rear command dial D2. In other words, the image picture Im1 of the first rear command dial D1 and the image picture Im2 of the second rear command dial D2 are respectively configured with images having circular arc outer shapes to which the outer circumferences of the first rear command dial D1 and the second rear command dial D2 exposed from the camera body 10 extend.

In the digital camera 1 of the present embodiment, each of the image picture Im1 of the first rear command dial D1 and the image picture Im2 of the second rear command dial D2 is configured with an image in which a disc-shaped operation dial comprising a dial plate on its top surface is viewed from the top. Specifically, as illustrated in FIG. 8, the image picture Im1 of the first rear command dial D1 and the image picture Im2 of the second rear command dial D2 have circular arc outer shapes, and images configuring dial plates are displayed inside circular arcs C1 and C2 determining the outer shapes. The circular arcs C1 and C2 determining the outer shapes are respectively extensions of the outer circumferences of the first rear command dial D1 and the second rear command dial D2 exposed from the camera body 10.

<Display Aspect on Sub-display>

In the digital camera 1 of the present embodiment, the image picture Im1 of the first rear command dial D1 and the image picture Im2 of the second rear command dial D2 are displayed on the sub-display 16 with the respectively same sizes (including substantially same sizes) as those of the first rear command dial D1 and the second rear command dial D2. In other words, the image picture Im1 of the first rear command dial D1 is displayed on the sub-display 16 with the same outer diameter as that of the actual first rear command dial D1, and the image picture Im2 of the second rear command dial D2 is displayed on the sub-display 16 with the same outer diameter as that of the actual second rear command dial D2.

The image picture Im1 of the first rear command dial D1 is displayed at the position where the first rear command dial D1 is disposed, and the image picture Im2 of the second rear command dial D2 is displayed at the position where the second rear command dial D2 is disposed. In other words, the image picture Im1 of the first rear command dial D1 is displayed on the same axis as a rotation axis a1 of the actual first rear command dial D1, and the image picture Im2 of the second rear command dial D2 is displayed on the same axis as a rotation axis a2 of the actual second rear command dial D2.

As a result, in the digital camera 1 of the present embodiment, the image picture Im1 of the first rear command dial D1 and the image picture Im2 of the second rear command dial D2 are respectively displayed to overlap the actual first rear command dial D1 and second rear command dial D2. In other words, the image picture Im1 of the first rear command dial D1 and the image picture Im2 of the second rear command dial D2 are displayed such that the hidden portions of the actual first rear command dial D1 and the second rear command dial D2 are complemented by the image pictures. Consequently, the first rear command dial D1 and the second rear command dial D2 appear to be provided on the top surface of the camera body 10.

<Specific Example of Image Picture>

The image picture Im1 of the first rear command dial D1 and the image picture Im2 of the second rear command dial D2 are respectively configured with images corresponding to functions allocated to the first rear command dial D1 and the second rear command dial D2. Specifically, an image configuring a dial plate is configured with an image corresponding to an allocated function.

FIG. 8 illustrates an example of a case where the function of setting an exposure correction value is allocated to the first rear command dial D1, and the function of setting a shutter speed is allocated to the second rear command dial D2. In this case, in the image picture Im1 of the first rear command dial D1, an image of a dial plate thereof is configured with an image for setting an exposure correction value. In the image picture Im2 of the second rear command dial D2, an image of a dial plate thereof is configured with an image for setting a shutter speed.

As described above, in the digital camera 1 of the present embodiment, the function of setting an exposure correction value, the function of setting a shutter speed, the function of setting a sensitivity, the function of setting an F number, the program shift function, the function of setting an imaging mode, the function of giving an instruction for frame feed, the function of giving an instruction for reproduction zoom, and the like may be allocated to the first rear command dial D1 and the second rear command dial D2.

Figure 9:
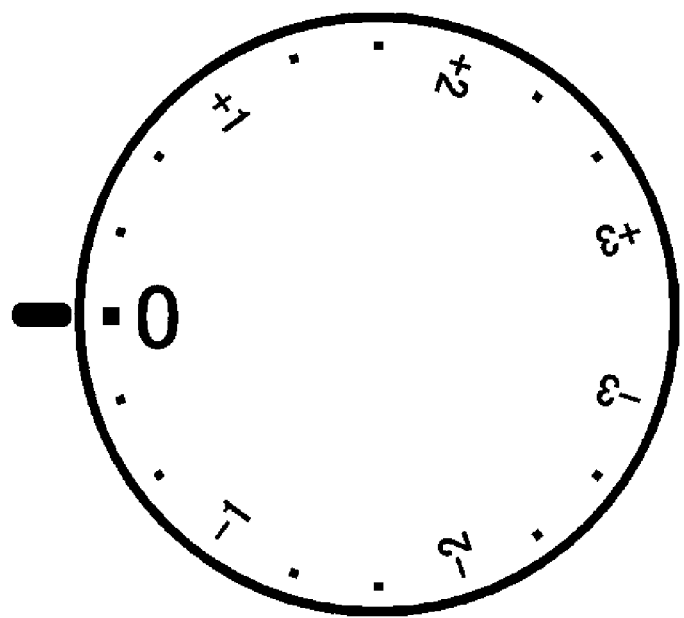
FIG. 9 is a diagram illustrating an example of an image picture of an operation dial in a case where a function of setting an exposure correction value is allocated thereto.

(1) Image Picture in case Where Function of Setting Exposure Correction Value is Allocated FIG. 9 is a diagram illustrating an example of an image picture of an operation dial in a case where the function of setting an exposure correction value is allocated thereto.

In a case where the function of setting an exposure correction value is allocated to an operation dial, the operation dial functions as an exposure correction dial. In an image picture of the exposure correction dial, settable exposure correction values are displayed in a dial plate portion. The respective exposure correction values are displayed at a predetermined pitch on an identical circumference centering on a rotation axis of the dial.

FIG. 9 illustrates an example of an image picture in a case where exposure correction is performed with a step width of ⅓ step between −3 and +3. In this case, intermediate values (between ±0 and +1, between +1 and +2, between +2 and +3, between ±0 and −1, between −1 and −2, between −2 and −3) are displayed with dots (•).

An image picture which is actually displayed on the sub-display 16 is an image of which a part is notched as illustrated in FIG. 8. This is also the same for image pictures for other functions.

(2) Image Picture in Case Where Function of Setting Shutter Speed is Allocated

Figure 10:
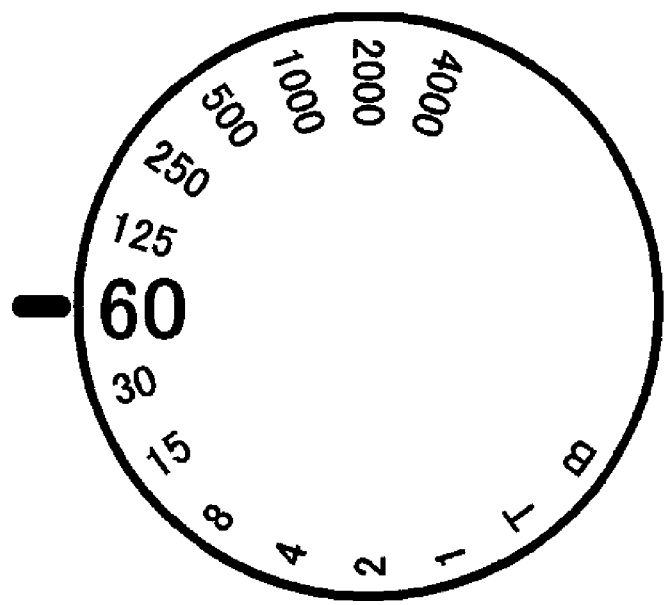
FIG. 10 is a diagram illustrating an example of an image picture of the operation dial in a case where a function of setting a shutter speed is allocated thereto.

FIG. 10 is a diagram illustrating an example of an image picture of an operation dial in a case where the function of setting a shutter speed is allocated.

In a case where the function of setting a shutter speed is allocated to an operation dial, the operation dial functions as a shutter speed dial. In an image picture of the shutter speed dial, settable shutter speeds are displayed in a dial plate portion. The respective shutter speed values are displayed at a predetermined pitch on an identical circumference centering on a rotation axis of the dial.

FIG. 10 illustrates an example of an image picture in a case where a shutter speed is set with a step width of one step between 1 second and ¼000 seconds.

Generally, a shutter speed is displayed in an inverse number. In other words, for example, 1/60 seconds is displayed by "60", and ¼000 seconds is displayed by 4000.

In the example illustrated in FIG. 10, "B" indicates a bulb imaging mode, and "T" indicates a time imaging mode. The bulb imaging mode is a mode in which the shutter is opened while the shutter button 30 is pressed, and the shutter is closed when the shutter button 30 is released. The time imaging mode is a mode in which an exposure time is designated by a user. This mode is generally used for exposure for a long period of time. An exposure time is separately designated.

(3) Image Picture in Case Where Function of Setting Sensitivity is Allocated

Figure 11:
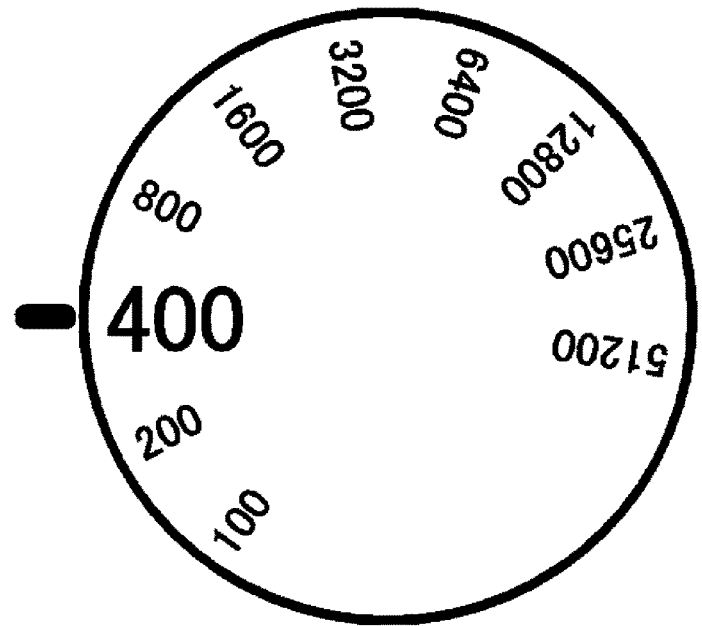
FIG. 11 is a diagram illustrating an example of an image picture of the operation dial in a case where a function of setting a sensitivity is allocated thereto.

FIG. 11 is a diagram illustrating an example of an image picture of an operation dial in a case where the function of setting a sensitivity is allocated.

In a case where the function of setting a sensitivity is allocated to an operation dial, the operation dial functions as a sensitivity dial. In an image picture of the sensitivity dial, settable sensitivities are displayed in a dial plate portion. The respective sensitivity values are displayed at a predetermined pitch on an identical circumference centering on a rotation axis of the dial.

FIG. 11 illustrates an example of an image picture in a case where an ISO sensitivity is set with a step width of one step between ISO100 and ISO51200.

(4) Image Picture in Case Where Function of Setting F Number is Allocated

Figure 12:
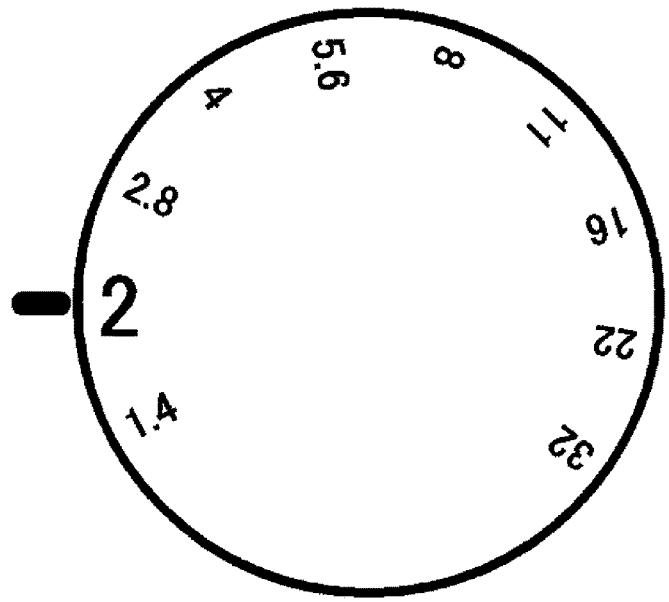
FIG. 12 is a diagram illustrating an example of an image picture of the operation dial in a case where a function of setting an F number is allocated thereto.

FIG. 12 is a diagram illustrating an example of an image picture of an operation dial in a case where the function of setting an F number is allocated.

In a case where the function of setting an F number is allocated to an operation dial, the operation dial functions as a stop dial. In an image picture of the stop dial, settable F numbers are displayed in a dial plate portion. The respective F numbers are displayed at a predetermined pitch on an identical circumference centering on a rotation axis of the dial.

FIG. 12 illustrates an example of an image picture in a case where an F number is set with a step width of one step between F1.4 and F32 seconds. The settable F numbers are uniquely determined according to an imaging lens to be used.

(5) Image Picture in a Case Where Function of Setting Imaging Mode is Allocated

Figure 13:
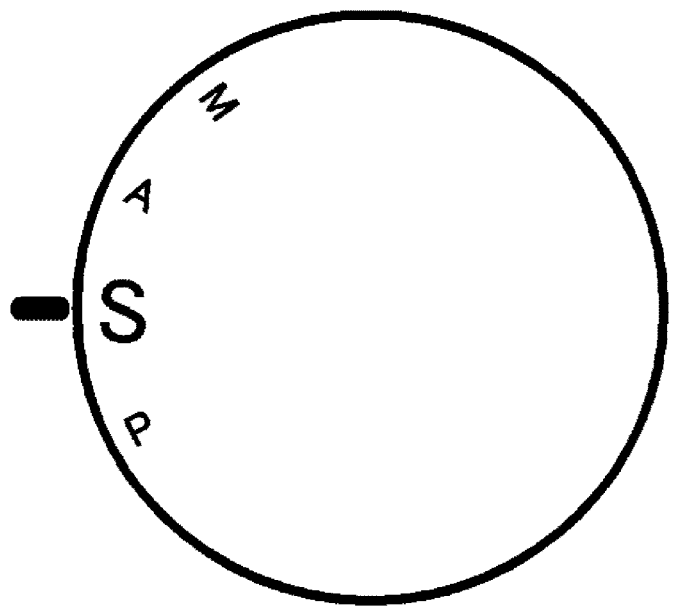
FIG. 13 is a diagram illustrating an example of an image picture of the operation dial in a case where a function of setting an imaging mode is allocated thereto.

FIG. 13 is a diagram illustrating an example of an image picture of an operation dial in a case where the function of setting an imaging mode is allocated.

In a case where the function of setting an imaging mode is allocated to an operation dial, the operation dial functions as a mode dial. In an image picture of the mode dial, settable imaging modes are displayed in a dial plate portion. The settable imaging modes are displayed at a predetermined pitch on an identical circumference centering on a rotation axis of the dial.

FIG. 13 illustrates an example of an image picture in a case where the program, the shutter speed priority, the stop priority, and the manual are selectable as imaging modes. Each mode is displayed by a single alphabet letter. Specifically, the program is displayed by "P", the shutter speed priority is displayed by "S", the stop priority is displayed by "A", and the manual is displayed by "M".

(6) Image Picture in a Case Where Program Shift Function is Allocated

Figure 14:
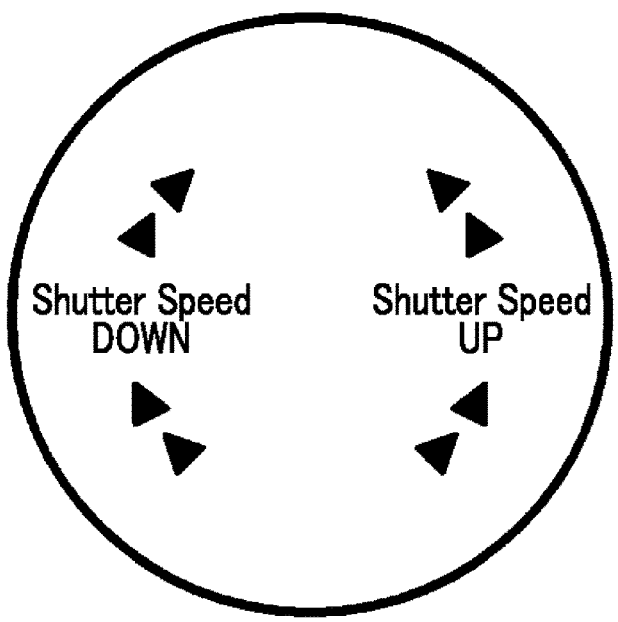
FIG. 14 is a diagram illustrating an example of an image picture of the operation dial in a case where a program shift function is allocated thereto.

FIG. 14 is a diagram illustrating an example of an image picture of an operation dial in a case where the program shift function is allocated.

In a case where the program shift function is allocated to an operation dial, in an image picture of the operation dial, a direction in which a shutter speed is increased is displayed in a dial plate portion.

FIG. 14 illustrates an example of an image picture in a case where a shutter speed is reduced through a clockwise rotational operation, and a shutter speed is increased through a counterclockwise rotational operation.

Figure 15:
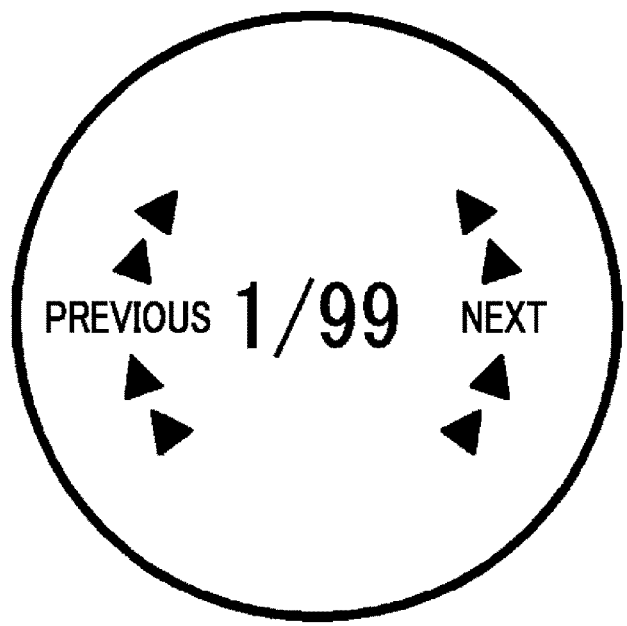
FIG. 15 is a diagram illustrating an example of an image picture of the operation dial in a case where a frame feed function is allocated thereto.

(7) Image Picture in a Case Where Function of Giving Instruction for Frame Feed is Allocated FIG. 15 is a diagram illustrating an example of an image picture of an operation dial in a case where the frame feed function is allocated.

In a case where the frame feed function is allocated to an operation dial, in an image picture of the operation dial, a direction of frame feed is displayed in a dial plate portion. In other words, a rotational operation direction for forward frame feed and a rotational operation for backward frame feed are displayed in the image picture of the operation dial.

FIG. 15 illustrates an example of an image picture in a case where a frame is fed forward through a counterclockwise rotational operation (display is switched to an image of the next frame), and a frame is fed backward through a clockwise rotational operation (display is switched to an image of the previous frame).

In a case where the frame feed function is allocated to an operation dial, in the image picture of the operation dial, information regarding a frame number and a total number of images is displayed at the center of the dial plate portion. FIG. 15 illustrates an example of a case where the information regarding a frame number and a total number of images is displayed in the form of "frame number/total number of images".

Figure 16:
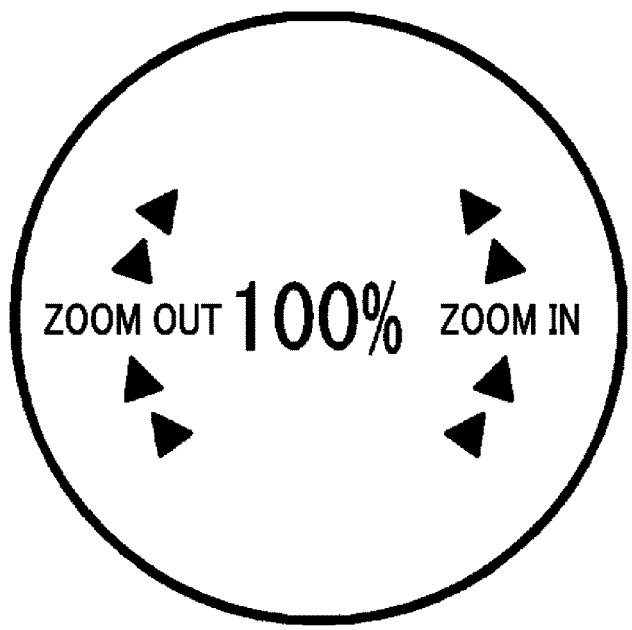
FIG. 16 is a diagram illustrating an example of an image picture of the operation dial in a case where a reproduction zoom function is allocated thereto.

(8) Image Picture in a Case Where Function of Giving Instruction for Reproduction Zoom is Allocated FIG. 16 is a diagram illustrating an example of an image picture of an operation dial in a case where the reproduction zoom function is allocated to an operation dial.

In a case where the reproduction zoom function is allocated to an operation dial, in an image picture of the operation dial, a direction of zoom is displayed in a dial plate portion. In other words, a rotational operation direction for zoom-in and a rotational operation direction for zoom-out are displayed in the image picture of the operation dial.

FIG. 16 illustrates an example of an image picture in a case where zoom-in (enlargement) is performed through a counterclockwise rotational operation, and zoom-out (reduction) is performed through a clockwise rotational operation.

In a case where the reproduction zoom function is allocated to an operation dial, in the image picture of the operation dial, zoom magnification information is displayed at the center of the dial plate portion.

Data regarding the image picture of the operation dial corresponding to each function is recorded in the data memory 64. The sub-display display control unit 116 displays the image picture Im1 of the first rear command dial D1 and the image picture Im2 of the second rear command dial D2 on the sub-display 16 on the basis of the data recorded in the data memory 64.

<<Display Control Performed by Sub-display Display Control Unit>>

As described above, the set contents of the digital camera 1, and the image pictures of the first rear command dial D1 and the second rear command dial D2 are displayed on the sub-display 16.

Display of the set contents of the digital camera 1 is switched according to changes of the set contents. In other words, the display thereof is switched according to a change of an imaging mode, a shutter speed, an F number, a sensitivity, or the number of images which can be captured which is set.

The image picture Im1 of the first rear command dial D1 and the image picture Im2 of the second rear command dial D2 are respectively switched according to changes of functions allocated to the first rear command dial D1 and the second rear command dial D2.

In a case where the first rear command dial D1 and the second rear command dial D2 are rotationally operated, display of the image picture Im1 of the first rear command dial D1 and the image picture Im2 of the second rear command dial D2 is switched according to the operation. Specifically, an image picture of a rotationally operated dial is displayed to be enlarged. Display is rotated in conjunction with a rotational operation. In other words, display of a dial plate is rotated such that the dial appears to be actually rotationally operated. In this case, the display of the dial plate is rotated in the same rotation amount as an actually rotationally operated amount.

Hereinafter, a display form of the sub-display 16 will be described separately in cases of a non-operation and an operation of the first rear command dial D1 and the second rear command dial D2.

<During Non-operation>

First, a description will be made of display on the sub-display 16 in a case where the first rear command dial D1 and the second rear command dial D2 are not operated.

(1) Set Contents of Digital Camera

With respect to the set contents of the digital camera 1, the information i1 regarding a currently set imaging mode, the information i2 regarding a currently set shutter speed, the information i3 regarding a currently set F number, the information i4 regarding a currently set sensitivity, and the information i5 regarding the number of images which can be captured are displayed at predetermined positions. Specifically, as illustrated in FIG. 8, the pieces of the information are displayed to be arranged in a line in a margin region Ma when the image picture Im1 of the first rear command dial D1 and the image picture Im2 of the second rear command dial D2 are displayed. In a case of this example, in FIG. 8, the margin region Ma is formed in an upper region of the image picture Im1 of the first rear command dial D1 and the image picture Im2 of the second rear command dial D2, and thus the set contents of the digital camera 1 are displayed in this region.

Display of the set contents of the digital camera 1 is switched according to changes of the set contents. In other words, the display thereof is switched according to a change of an imaging mode, a shutter speed, an F number, a sensitivity, or the number of images which can be captured which is set.

The sub-display display control unit 116 acquires information regarding the set contents of the digital camera 1, and switches display on the sub-display 16 according to switching thereof.

(2) Image Pictures of First Rear Command Dial and Second Rear Command Dial (A) Basic Display Form As described above, the image picture Im1 of the first rear command dial D1 and the image picture Im2 of the second rear command dial D2 are displayed at the same positions and with the same sizes as those of the actual first rear command dial D1 and second rear command dial D2. In other words, the image picture Im1 of the first rear command dial D1 and the image picture Im2 of the second rear command dial D2 are displayed such that rotation axes thereof are located coaxially with the rotation axis of the actual first rear command dial D1 or second rear command dial D2, and outer diameters thereof are the same as outer diameters of the actual first rear command dial D1 and second rear command dial D2.

Regarding images of dial plate portions, dial plate images of functions allocated to the first rear command dial D1 and the second rear command dial D2 are displayed.

In a case where functions to be allocated to the first rear command dial D1 and the second rear command dial D2 are functions of setting items, image pictures of indicators are also displayed along with image pictures of the dials. For example, in a case where functions to be allocated to the first rear command dial D1 and the second rear command dial D2 are the function of setting an exposure correction value, the function of setting a shutter speed, the function of setting a sensitivity, and the function of setting an F number, image pictures of indicators are also displayed.

The indicator is a mark used to select an item displayed on a dial plate. A first indicator image picture In1 is displayed along with the image picture Im1 of the first rear command dial D1, and a second indicator image picture In2 is displayed along with the image picture Im2 of the second rear command dial D2.

The first indicator image picture In1 is disposed near an outer circumferential portion of the image picture Im1 of the first rear command dial D1. In this example, the first indicator image picture In1 is displayed at the position of nine o'clock with respect to the image picture Im1 of the first rear command dial D1.

In the image picture Im1 of the first rear command dial D1, an image of a dial plate is displayed such that the currently set item is located at the position of the first indicator image picture In1. For example, a case is assumed in which the function of setting an exposure correction value is allocated to the first rear command dial D1, and ±0 is set. In this case, as illustrated in FIG. 8, in the image picture Im1 of the first rear command dial D1, the image of the dial plate is displayed such that "±0" is located at the position of the first indicator image picture In1.

The second indicator image picture In2 is near an outer circumferential portion of the image picture Im2 of the second rear command dial D2. In this example, the second indicator image picture In2 is displayed at the position of nine o'clock with respect to the image picture Im2 of the second rear command dial D2.

In the image picture Im2 of the second rear command dial D2, an image of a dial plate is displayed such that the currently set item is located at the position of the second indicator image picture In2. For example, a case is assumed in which the function of setting a shutter speed is allocated to the second rear command dial D2, and 1/60 seconds is set. In this case, as illustrated in FIG. 8, in the image picture Im2 of the second rear command dial D2, the image of the dial plate is displayed such that "60" is located at the position of the second indicator image picture In2.

In each of the image picture Im1 of the first rear command dial D1 and the image picture Im2 of the second rear command dial D2, the image of the dial plate is displayed such that a size of a set item is larger than sizes of other items. For example, in the example illustrated in FIG. 8, in the image picture Im1 of the first rear command dial D1, "±0" at the position of the first indicator image picture In1 is displayed in a size larger than character sizes of other exposure correction values. In the image picture Im2 of the second rear command dial D2, "60" at the position of the second indicator image picture In2 is displayed in a size larger than character sizes of other shutter speeds.

(B) Individual Display Example (a) Shutter Speed Priority

In a case where an imaging mode is set to the shutter speed priority, the function of setting an exposure correction value is allocated to the first rear command dial D1, and the function of setting a shutter speed is allocated to the second rear command dial D2.

In this case, as illustrated in FIG. 8, an image picture of the exposure correction dial is displayed in the image picture Im1 of the first rear command dial D1, and an image picture of a shutter speed dial is displayed in the second rear command dial D2.

(b) Stop Priority

In a case where an imaging mode is set to the stop priority, the function of setting an exposure correction value is allocated to the first rear command dial D1, and the function of setting an F number is allocated to the second rear command dial D2.

Figure 17:
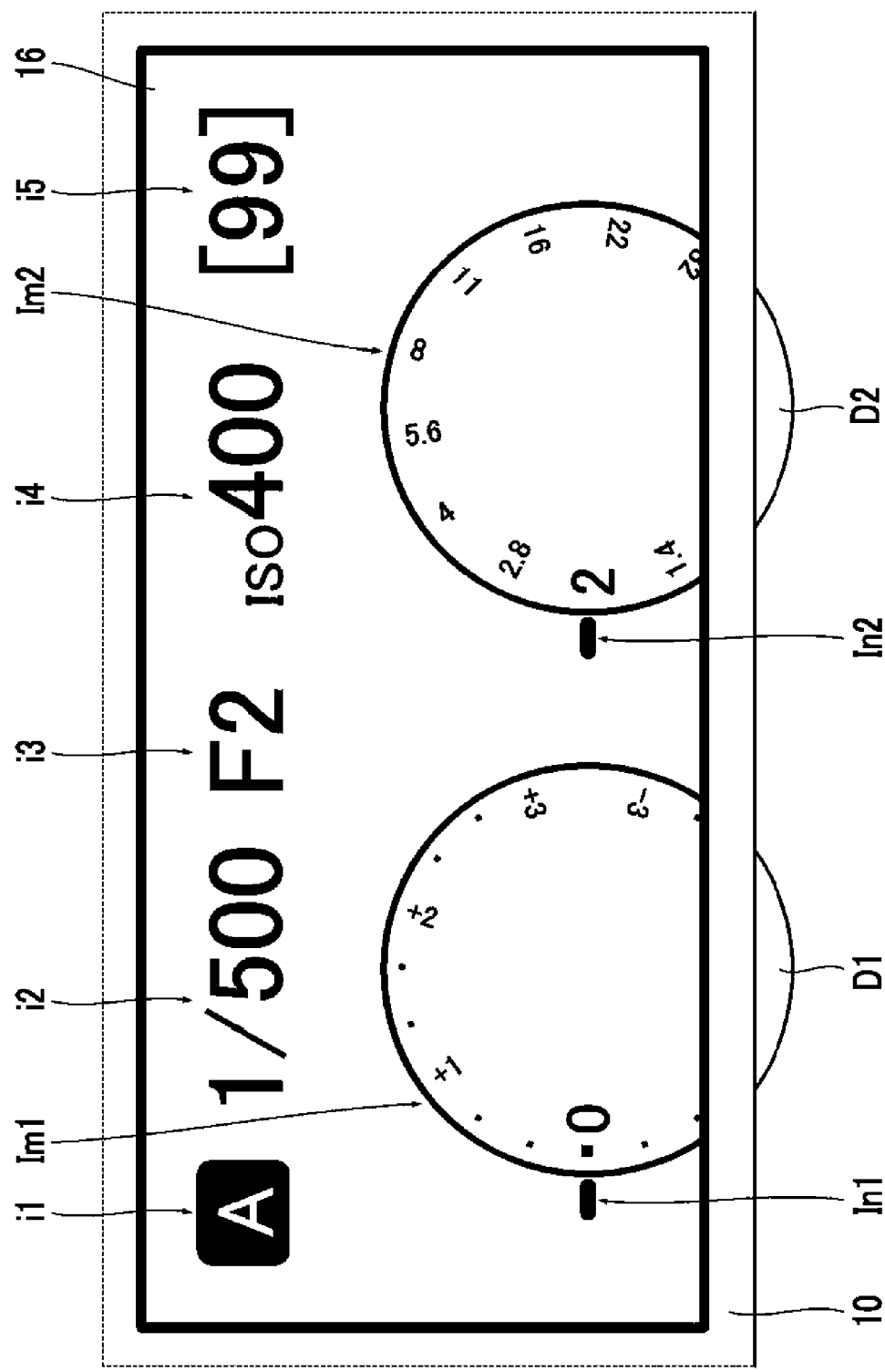
FIG. 17 is a plan view illustrating an example of display on the sub-display in a case where stop priority is set.

FIG. 17 is a plan view illustrating an example of display on the sub-display in a case where the stop priority is set.

As illustrated in FIG. 17, in a case where an imaging mode is set to the stop priority, an image picture of an exposure correction dial is displayed in the image picture Im1 of the first rear command dial D1, and an image picture of a stop dial is displayed in the second rear command dial D2.

(c) Manual

In a case where an imaging mode is set to the manual, the function of setting a shutter speed is allocated to the first rear command dial D1, and the function of setting an F number is allocated to the second rear command dial D2.

Figure 18:
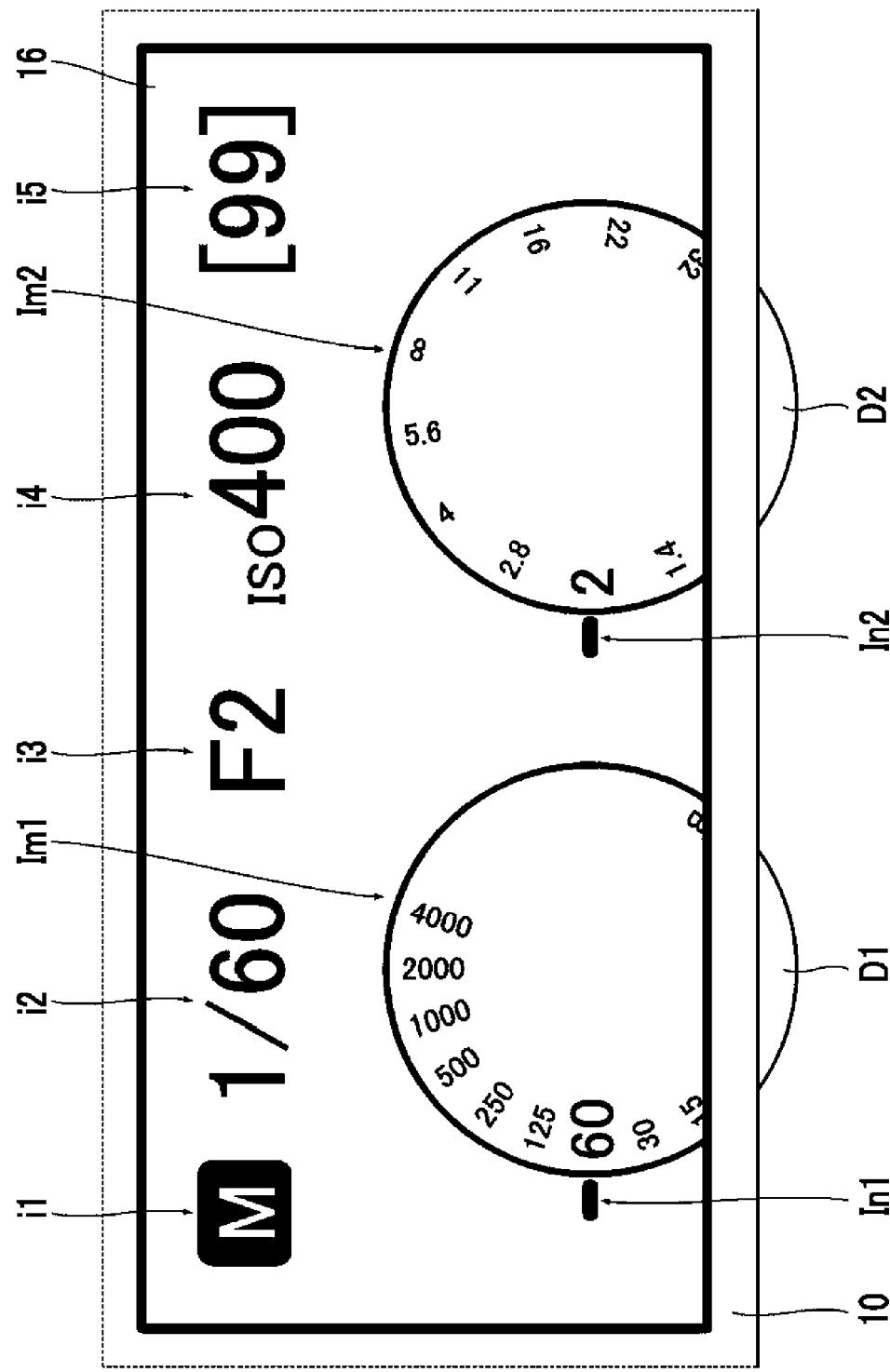
FIG. 18 is a plan view illustrating an example of display on the sub-display in a case where manual is set.

FIG. 18 is a plan view illustrating an example of display on the sub-display in a case where the manual is set.

As illustrated in FIG. 18, in a case where an imaging mode is set to the manual, an image picture of a shutter speed dial is displayed in the image picture Im1 of the first rear command dial D1, and an image picture of a stop dial is displayed in the second rear command dial D2.

(d) Program

In a case where an imaging mode is set to the program, the function of setting an exposure correction value is allocated to the first rear command dial D1, and the program shift function is allocated to the second rear command dial D2.

Figure 19:
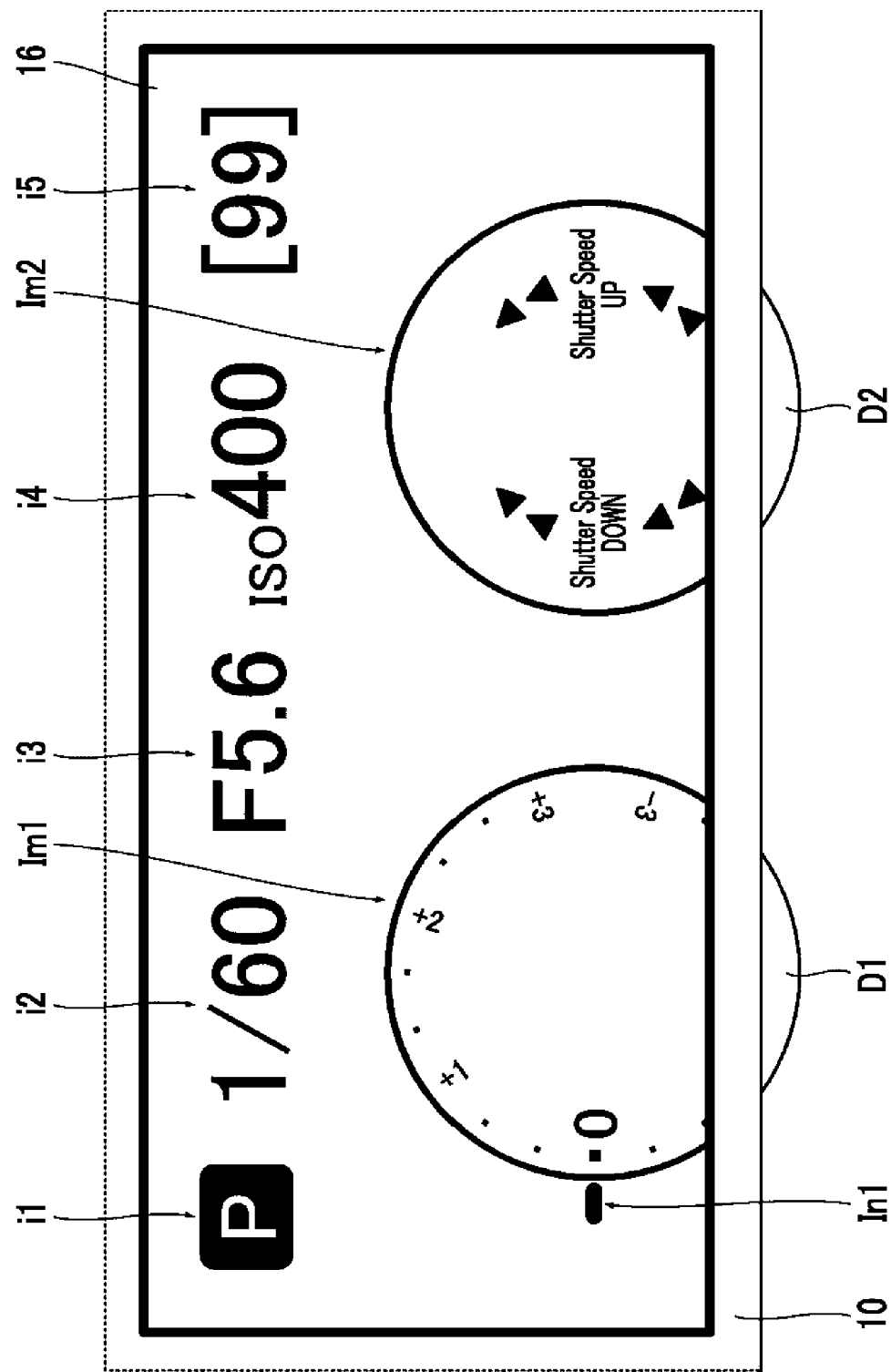
FIG. 19 is a plan view illustrating an example of display on the sub-display in a case where a program is set.

FIG. 19 is a plan view illustrating an example of display on the sub-display in a case where the program is set.

As illustrated in FIG. 19, in a case where an imaging mode is set to the program, an image picture of an exposure correction dial is displayed in the image picture Im1 of the first rear command dial D1, and an image picture for program shift is displayed in the second rear command dial D2.

(d) Setting of sensitivity and mode

In a case where the first rear command dial D1 is subjected to a pushing operation in a state in which the digital camera 1 is set to an imaging mode, a function of selecting an imaging mode is allocated to the first rear command dial D1. In a case where the second rear command dial D2 is subjected to a pushing operation in a state in which the digital camera 1 is set to an imaging mode, the function of setting a sensitivity is allocated to the second rear command dial D2.

Figure 20:
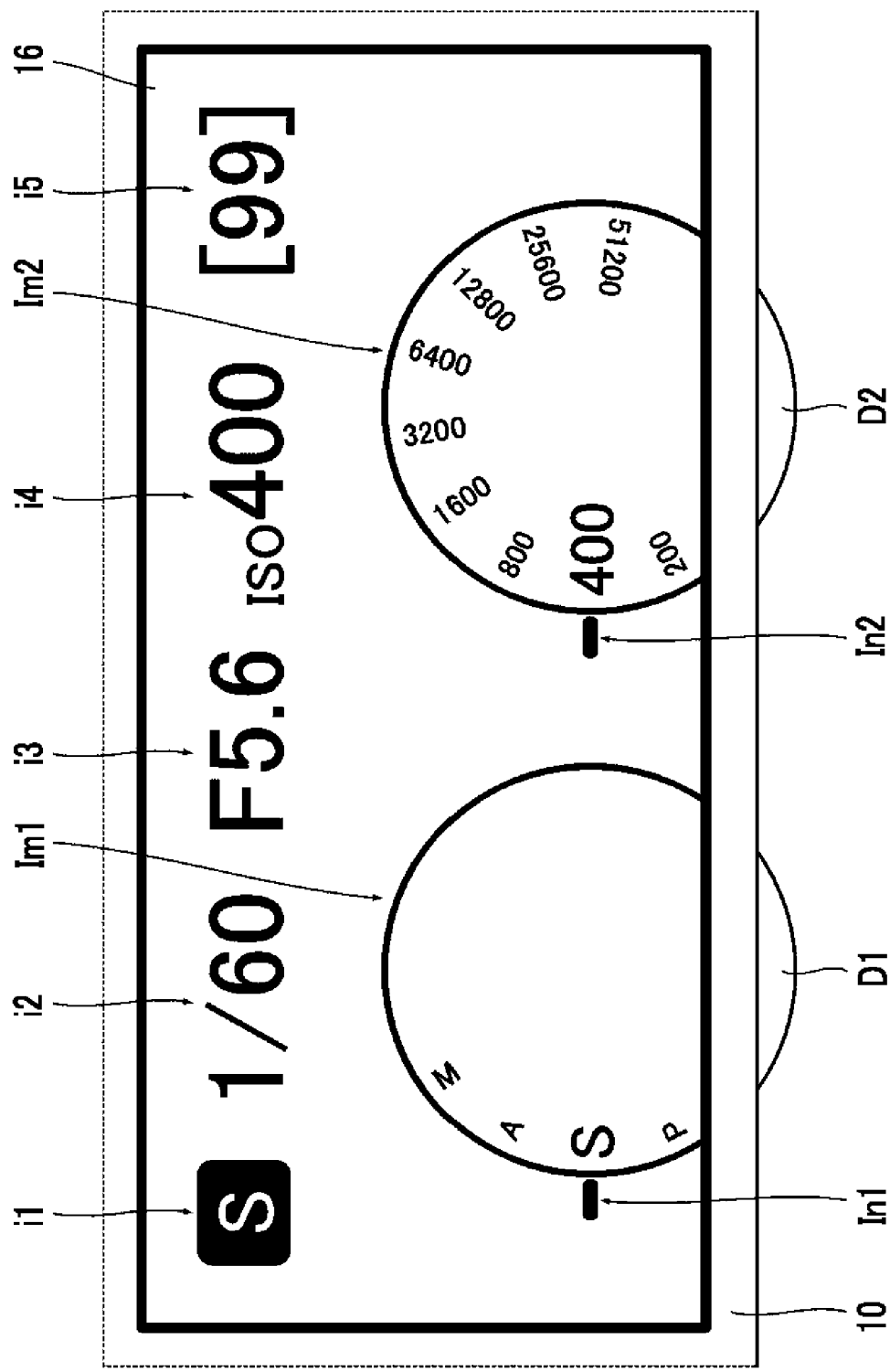
FIG. 20 is a plan view illustrating an example of display on the sub-display in a case where the first rear command dial and the second rear command dial are subjected to a pushing operation in a state in which shutter speed priority is set.

FIG. 20 is a plan view illustrating an example of display on the sub-display in a case where the first rear command dial and the second rear command dial are subjected to a pushing operation in a state in which the shutter speed priority is set.

In a case where the function of selecting an imaging mode is allocated to the first rear command dial D1, an image picture of a mode dial is displayed in the image picture Im1 of the first rear command dial D1. In a case where the function of setting a sensitivity is allocated to the second rear command dial D2, an image picture of a sensitivity dial is displayed in the image picture Im2 of the second rear command dial D2.

(e) Reproduction Mode

In a case where a mode of the digital camera 1 is set to a reproduction mode, a function of giving an instruction for frame feed is allocated to the first rear command dial D1, and a function of giving an instruction for reproduction zoom is allocated to the second rear command dial D2.

Figure 21:
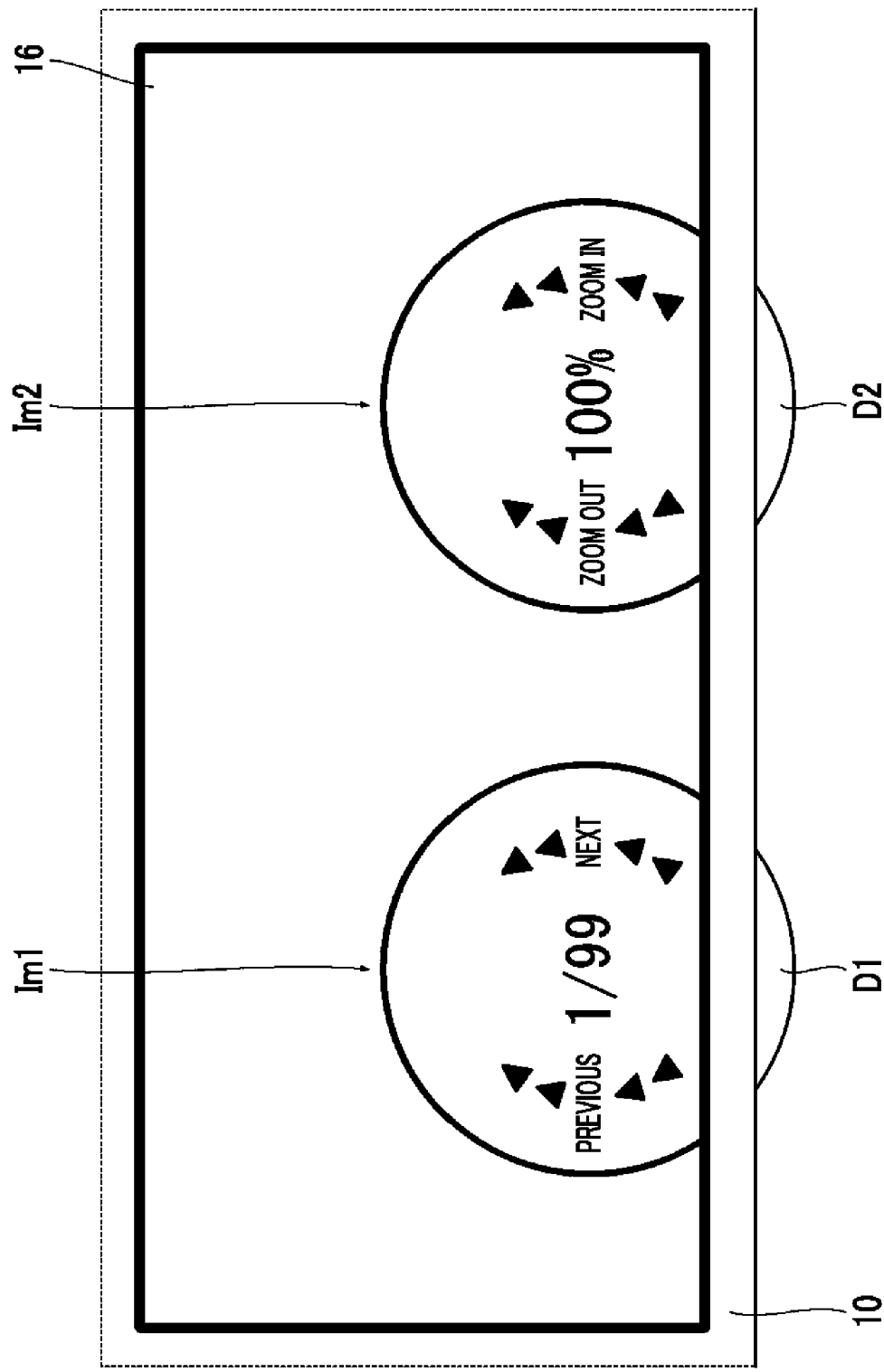
FIG. 21 is a plan view illustrating an example of display on the sub-display in a case where a reproduction mode is set.

FIG. 21 is a plan view illustrating an example of display on the sub-display in a case where the reproduction mode is set.

As illustrated in FIG. 21, in a case where the function of giving an instruction for frame feed is allocated to the first rear command dial D1, an image picture for frame feed is displayed in the image picture Im1 of the first rear command dial D1. In a case where the function of giving an instruction for reproduction zoom is allocated to the second rear command dial D2, an image picture for reproduction zoom is displayed in the image picture Im2 of the second rear command dial D2.

<During Operation>

Next, a description will be made of display on the sub-display 16 in a case where the first rear command dial D1 and the second rear command dial D2 are operated.

As described above, in a case where the first rear command dial D1 and the second rear command dial D2 are rotationally operated, image pictures of the rotationally operated dials are enlarged, and display thereof is rotated in conjunction with the operations.

(1) Operation Method

First, a description will be made of operations (setting methods) using the first rear command dial D1 and the second rear command dial D2.

As described above, exposure correction, setting of a shutter speed, setting of an F number, setting of a sensitivity, program shift, selection of an imaging mode, an instruction for frame feed, an instruction for reproduction zoom may be performed or given by using the first rear command dial D1 and the second rear command dial D2. Hereinafter, each function operation method will be described separately.

(a) Exposure Correction

The exposure correction is performed by rotationally operating an operation dial to which the function of setting an exposure correction value is allocated. For example, in a case where an imaging mode is set to the shutter speed priority, the function of setting an exposure correction value is allocated to the first rear command dial D1. In this case, therefore, in a case where the first rear command dial D1 is rotationally operated, an exposure correction value may be set.

An exposure correction value is changed by ⅓ step every click. In a case where the function of setting an exposure correction value is allocated to the first rear command dial D1, and the first rear command dial D1 is rotated clockwise by one click, an exposure correction value is moved down by ⅓ step so as to be set. On the other hand, in a case where the first rear command dial D1 is rotated counterclockwise by one click, an exposure correction value is moved up by ⅓ step so as to be set. For example, in a case where the current exposure correction value is ±0, and the first rear command dial D1 is rotated clockwise by one click, an exposure correction value is set to −⅓. In a case where the first rear command dial D1 is rotated counterclockwise by one click, an exposure correction value is set to +⅓.

The display on the sub-display 16 is switched in conjunction with the rotational operation on the dial. This display form will be described later.

(b) Setting of Shutter Speed

A shutter speed is set by rotationally operating an operation dial to which the function of setting a shutter speed is allocated. For example, in a case where an imaging mode is set to the shutter speed priority, the function of setting a shutter speed is allocated to the second rear command dial D2. In this case, therefore, in a case where the second rear command dial D2 is rotationally operated, a shutter speed may be set.

A shutter speed is changed by one step every click. In a case where the function of setting a shutter speed is allocated to the second rear command dial D2, and the second rear command dial D2 is rotated clockwise by one click, a shutter speed is moved down by one step so as to be set. On the other hand, in a case where the second rear command dial D2 is rotated counterclockwise by one click, a shutter speed is moved up by one step so as to be set. For example, in a case where the current shutter speed is ⅟60 seconds, and the second rear command dial D2 is rotated clockwise by one click, a shutter speed is set to ⅟30 seconds. In a case where the second rear command dial D2 is rotated counterclockwise by one click, a shutter speed is set to ⅟125 seconds.

The display on the sub-display 16 is switched in conjunction with the rotational operation on the dial. This display form will be described later.

(c) Setting of F Number

An F number is set by rotationally operating an operation dial to which the function of setting an F number is allocated. For example, in a case where an imaging mode is set to the stop priority, the function of setting an F number is allocated to the second rear command dial D2. In this case, therefore, in a case where the second rear command dial D2 is rotationally operated, an F number may be set.

An F number is changed by one step every click. In a case where the function of setting an F number is allocated to the second rear command dial D2, and the second rear command dial D2 is rotated clockwise by one click, an F number is moved down by one step so as to be set. On the other hand, in a case where the second rear command dial D2 is rotated counterclockwise by one click, an F number is moved up by one step so as to be set. For example, in a case where the current F number is F2, and the second rear command dial D2 is rotated clockwise by one click, an F number is set to F1.4. In a case where the second rear command dial D2 is rotated counterclockwise by one click, an F number is set to F2.8.

The display on the sub-display 16 is switched in conjunction with the rotational operation on the dial. This display form will be described later.

(d) Program Shift

An instruction for program shift is given by rotationally operating an operation dial to which the program shift function is allocated. For example, in a case where an imaging mode is set to the program, the program shift function is allocated to the second rear command dial D2. In this case, therefore, in a case where the second rear command dial D2 is rotationally operated, an instruction for program shift may be given.

Program shift is changed by one step every click. In a case where the program shift function is allocated to the second rear command dial D2, and the second rear command dial D2 is rotated clockwise by one click, a shutter speed is moved up by one step so as to be set (an F number is moved down by one step so as to be set). On the other hand, in a case where the second rear command dial D2 is rotated counterclockwise by one click, a shutter speed is moved down by one step so as to be set (an F number is moved up by one step so as to be set). For example, in a case where the current shutter speed is ⅟60 seconds, and the second rear command dial D2 is rotated clockwise by one click, a shutter speed is set to ⅟30 seconds. In a case where the second rear command dial D2 is rotated counterclockwise by one click, a shutter speed is set to ⅟125 seconds.

The display on the sub-display 16 is switched in conjunction with the rotational operation on the dial. This display form will be described later.

(e) Setting of Sensitivity

A sensitivity is set by rotationally operating an operation dial to which the function of setting a sensitivity is allocated. For example, in a case where the shutter speed priority is set, and the second rear command dial D2 is subjected to a pushing operation, the function of setting a sensitivity is allocated to the second rear command dial D2. In this case, therefore, in a case where the second rear command dial D2 is rotationally operated, a sensitivity may be set.

A sensitivity is changed by one step every click. In a case where the function of setting a sensitivity is allocated to the second rear command dial D2, and the second rear command dial D2 is rotated clockwise by one click, a sensitivity is moved down by one step so as to be set. On the other hand, in a case where the second rear command dial D2 is rotated counterclockwise by one click, a sensitivity is moved up by one step so as to be set. For example, in a case where the current sensitivity is ISO400, and the second rear command dial D2 is rotated clockwise by one click, a sensitivity is set to ISO200. In a case where the second rear command dial D2 is rotated counterclockwise by one click, a sensitivity is set to ISO800.

The display on the sub-display 16 is switched in conjunction with the rotational operation on the dial. This display form will be described later.

In a case where the function of setting a sensitivity is allocated to the second rear command dial D2, and the second rear command dial D2 is subjected to a pushing operation, an original function returns. Therefore, in a case where the original function is the function of setting a shutter speed, and the second rear command dial D2 is subjected to a pushing operation, the function of setting a shutter speed returns.

(f) Setting of Imaging Mode

An imaging mode is set by rotationally operating an operation dial to which the function of setting an imaging mode is allocated. For example, in a case where the shutter speed priority is set, and the first rear command dial D1 is subjected to a pushing operation, the function of setting an imaging mode is allocated to the first rear command dial D1. In this case, therefore, in a case where the first rear command dial D1 is rotationally operated, an imaging mode may be set.

An imaging mode is switched in an order of the program (P), the shutter speed priority (S), the stop priority (A), and the manual (M), and is switched every click. In a case where the function of setting an imaging mode is allocated to the first rear command dial D1, and the first rear command dial D1 is rotated clockwise by one click, the previous imaging mode is set. On the other hand, in a case where the first rear command dial D1 is rotated counterclockwise by one click, the next imaging mode is set. For example, in a case where the current imaging mode is the shutter speed priority (S), and the first rear command dial D1 is rotated clockwise by one click, the program (P) is set. In a case where the first rear command dial D1 is rotated counterclockwise by one click, the stop priority (A) is set.

The display on the sub-display 16 is switched in conjunction with the rotational operation on the dial. This display form will be described later.

In a case where the function of selecting an imaging mode is allocated to the first rear command dial D1, and the first rear command dial D1 is subjected to a pushing operation, a switched imaging mode is determined. In this case, functions corresponding to the set new imaging mode are allocated to the first rear command dial D1 and the second rear command dial D2.

(g) Frame Feed

Frame feed is set by rotationally operating an operation dial to which the function of giving an instruction for frame feed is allocated. As described above, in a case where a reproduction mode is set, the function of giving an instruction for frame feed is allocated to the first rear command dial D1. In this case, therefore, in a case where the first rear command dial D1 is rotationally operated, an instruction for frame feed may be given. In a case where the first rear command dial D1 is rotated clockwise by one click, an image is returned to the previous frame. In a case where the first rear command dial D1 is rotated counterclockwise by one click, an image is fed to the next frame.

(h) Reproduction Zoom

Reproduction zoom is set by rotationally operating an operation dial to which the function of giving an instruction for reproduction zoom is allocated. As described above, in a case where a reproduction mode is set, the function of giving an instruction for reproduction zoom is allocated to the second rear command dial D2. In this case, therefore, in a case where the second rear command dial D2 is rotationally operated, an instruction for reproduction zoom may be given. In a case where the second rear command dial D2 is rotated clockwise, an instruction for zoom-out (reduction) is given, and, in a case where the second rear command dial D2 is rotated counterclockwise, an instruction for zoom-in (enlargement) is given. The zoom-in and the zoom-out are performed at a predetermined zoom magnification. An image which is being reproduced is zoomed in or zoomed out stepwise at a predetermined zoom magnification whenever the second rear command dial D2 is rotated by one click.

(2) Display in Conjunction with Operation

As described above, the image picture Im1 of the first rear command dial D1 and the image picture Im2 of the second rear command dial D2 are changed in conjunction with operations on the first rear command dial D1 and the second rear command dial D2. Specifically, an image picture of a rotationally operated dial is displayed to be enlarged, and display thereof is rotated in conjunction with the operation. For example, in a case where the first rear command dial D1 is rotationally operated, the image picture Im1 of the first rear command dial D1 is displayed to be enlarged, and display thereof is rotated in conjunction with the rotational operation. Similarly, in a case where the second rear command dial D2 is rotationally operated, the image picture Im2 of the second rear command dial D2 is displayed to be enlarged, and display thereof is rotated in conjunction with the rotational operation.

Figure 22:
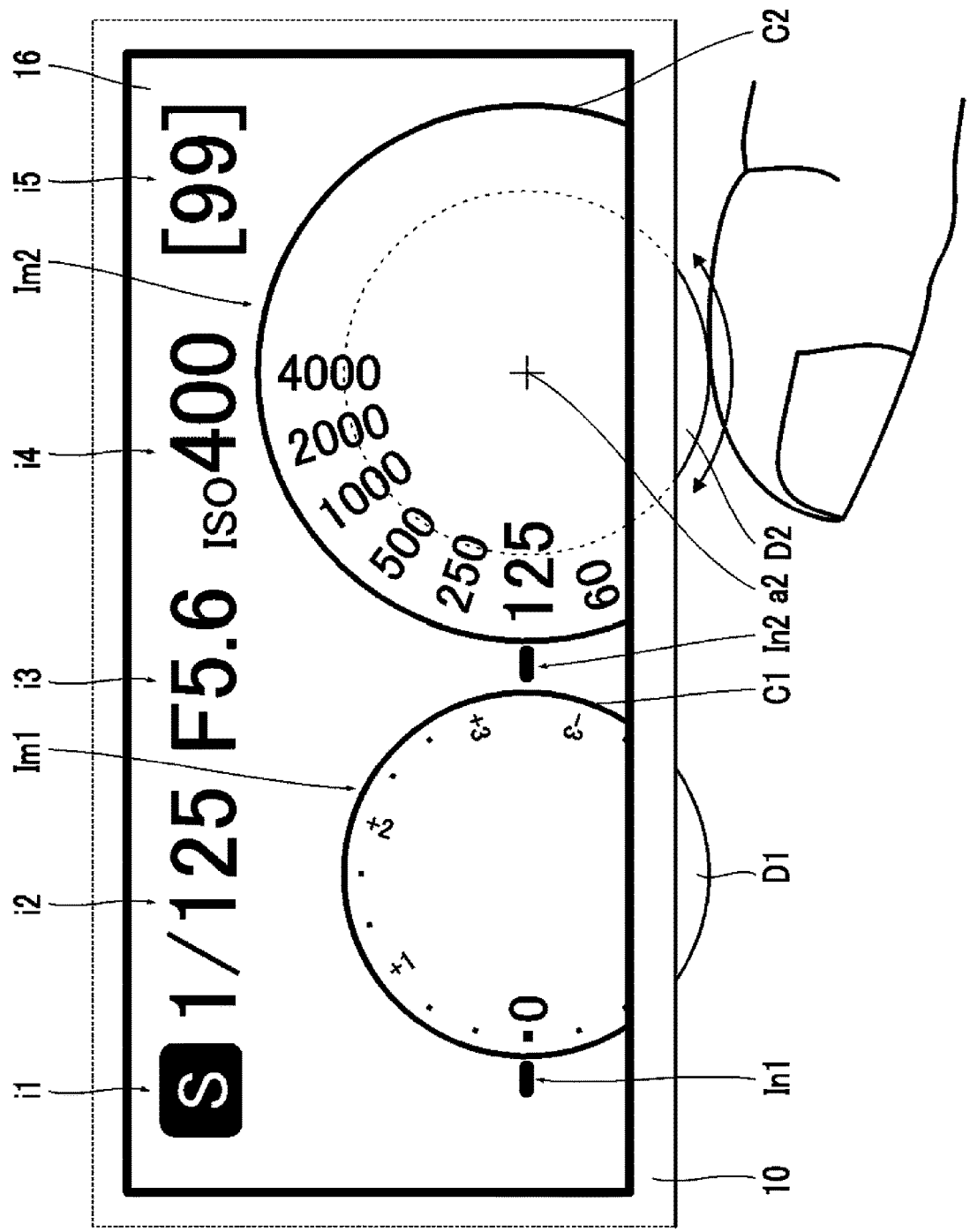
FIG. 22 is a plan view illustrating an example of display on the sub-display in a case where the second rear command dial is rotationally operated.

FIG. 22 is a plan view illustrating an example of display on the sub-display in a case where the second rear command dial is rotationally operated. Particularly, FIG. 22 illustrates a display state of the sub-display 16 in a case where the shutter speed priority is set, and the second rear command dial D2 is rotationally operated.

As illustrated in FIG. 22, in a case where the second rear command dial D2 is rotationally operated, the image picture Im2 of the second rear command dial D2 is displayed to be enlarged.

In this case, the image picture Im2 is enlarged centering on the rotation axis thereof. In other words, the image picture Im2 is enlarged in the outer diameter thereof with respect to the center. Here, since the image picture Im2 of the second rear command dial D2 is displayed coaxially with the actual second rear command dial D2, the image picture Im2 of the second rear command dial D2 is enlarged centering on the rotation axis a2 of the actual second rear command dial D2.

The image picture Im2 of the second rear command dial D2 is enlarged in a range not interfering with the image picture Im1 of the first rear command dial D1.

In a case where the second rear command dial D2 is rotationally operated, the image picture Im2 of the second rear command dial D2 is rotated in a rotational operation direction in conjunction with the rotational operation. For example, in a case where the second rear command dial D2 is rotationally operated clockwise, the image picture Im2 is rotated clockwise. In a case where the second rear command dial D2 is rotationally operated counterclockwise, the image picture Im2 is rotated counterclockwise.

The rotation is performed centering on the rotation axis. Since the image picture Im2 of the second rear command dial D2 is displayed coaxially with the actual second rear command dial D2, the image picture Im2 of the second rear command dial D2 is rotated centering on the rotation axis a2 of the actual second rear command dial D2.

In other words, in a case where the second rear command dial D2 is rotationally operated, the image picture Im2 of the second rear command dial D2 is enlarged centering on the rotation axis a2 of the actual second rear command dial D2, and is rotated centering on the rotation axis a2 of the actual second rear command dial D2 in the operation direction. In this case, the image picture Im2 is rotated in the same rotation amount as an actually operated rotation amount. Consequently, an operation matches display, and thus a favorable operation feeling can be provided.

This is also the same for a case where the first rear command dial D1 is rotationally operated. In other words, in a case where the first rear command dial D1 is rotationally operated, the image picture Im1 is enlarged centering on the rotation axis a1 of the actual first rear command dial D1, and is rotated centering on the rotation axis a1 of the actual first rear command dial D1 in the operation direction.

A selected item, that is, an item indicated by an indicator is displayed to be larger than other items, and an enlargement process for the selected item is performed in conjunction with the rotation. For example, in a case where an item is located at a position of an indicator, the item is displayed to be enlarged, and, in a case where the item is deviated from the position of the indicator, the item is reduced to a normal size. Alternatively, the item is displayed to be gradually enlarged as the item comes close to the position of the indicator, and is gradually reduced to an original size as the item becomes distant from the position of the indicator.

The sub-display display control unit 116 acquires rotational operation information of the first rear command dial D1 and the second rear command dial D2, and controls display on the sub-display 16.

An image picture is rotated only in cases where the function of setting a shutter speed, the function of setting an F number, the function of setting an exposure correction value, and the function of setting a sensitivity are allocated. In other words, an image picture is rotated only in a case where an item displayed in a dial plate is selected. In a case where functions of giving an instruction in response to an operation, such as the program shift function, the reproduction zoom function, and the frame feed function, are allocated, an image picture is not rotated even in a case where an operation is performed. In this case, only enlargement is performed.

Figure 23:
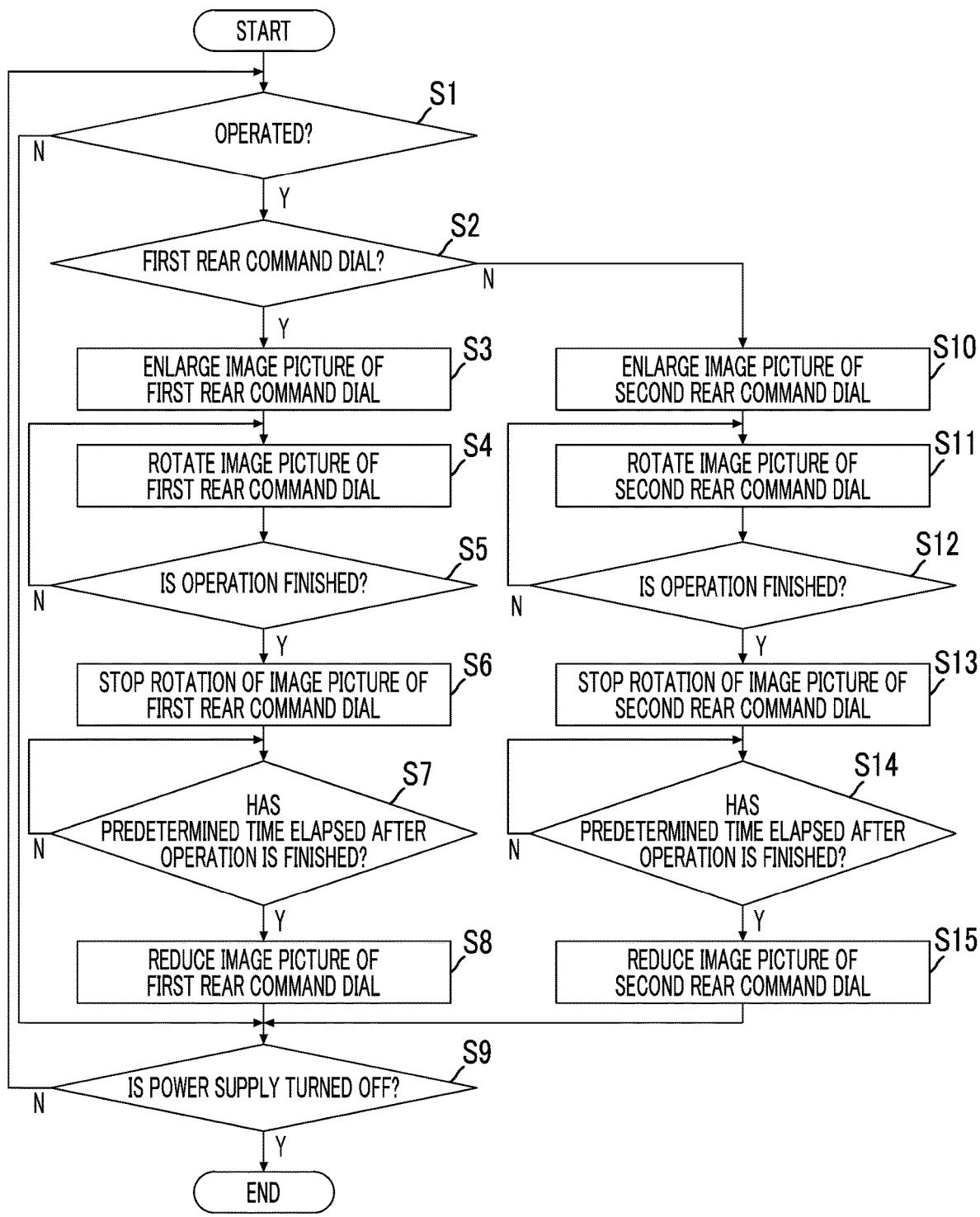
FIG. 23 is a flowchart illustrating process procedures for image picture display control in a case where the first rear command dial and the second rear command dial are operated.

(3) Display control on image pictures in case where first rear command dial and second rear command dial are operated FIG. 23 is a flowchart illustrating process procedures for image picture display control in a case where the first rear command dial and the second rear command dial are operated.

The sub-display display control unit 116 determines whether or not the first rear command dial D1 or the second rear command dial D2 is operated on the basis of outputs from the first rotational operation detection unit 124 and the second rotational operation detection unit 126 (step S1).

In a case where an operation is detected, it is determined whether or not the operation is an operation on the first rear command dial D1 (step S2).

In a case where the first rear command dial D1 is rotationally operated, the image picture Im1 of the first rear command dial D1 is enlarged (step S3). The image picture Im1 of the first rear command dial D1 is rotated in a direction in which the rotation is detected (step S4). This rotation is performed in conjunction with the operation.

Next, the sub-display display control unit 116 determines whether or not the rotational operation on the first rear command dial D1 is finished on the basis of an output from the first rotational operation detection unit 124 (step S5). In a case where the rotational operation is finished, the rotation of the image picture Im1 of the first rear command dial D1 is stopped (step S6). Thereafter, it is determined whether or not a predetermined time has elapsed from the operation finishing (step S7). In a case where it is determined that the predetermined time has elapsed from the operation finishing, the enlarged image picture Im1 of the first rear command dial D1 is reduced to an original size (step S8).

Thereafter, it is determined whether or not a power supply of the digital camera 1 is turned off (step S9). In a case where the power supply of the digital camera 1 is turned off, the process is finished. On the other hand, in a case where the power supply of the digital camera 1 is not turned off, the flow returns to step S1, and the process is continuously performed.

In a case where it is determined that the operation is not an operation on the first rear command dial D1 in step S2, the sub-display display control unit 116 enlarges the image picture Im2 of the second rear command dial D2 (step S10). The image picture Im2 of the second rear command dial D2 is rotated in a direction in which the rotation is detected (step S11). This rotation is performed in conjunction with the operation.

Next, the sub-display display control unit 116 determines whether or not the rotational operation on the second rear command dial D2 is finished on the basis of an output from the second rotational operation detection unit 126 (step S12). In a case where the rotational operation is finished, the rotation of the image picture Im2 of the second rear command dial D2 is stopped (step S13). Thereafter, it is determined whether or not a predetermined time has elapsed from the operation finishing (step S14). In a case where it is determined that the predetermined time has elapsed from the operation finishing, the enlarged image picture Im2 of the second rear command dial D2 is reduced to an original size (step S15).

Thereafter, it is determined whether or not a power supply of the digital camera 1 is turned off (step S9). In a case where the power supply of the digital camera 1 is turned off, the process is finished. On the other hand, in a case where the power supply of the digital camera 1 is not turned off, the flow returns to step S1, and the process is continuously performed.

[Operation and Effect of Digital Camera]

As described above, according to the digital camera 1 of the present embodiment, the set contents of the camera, the image picture Im1 of the first rear command dial D1, and the image picture Im2 of the second rear command dial D2 are displayed on the sub-display 16 provided on the top surface of the camera body 10. Consequently, an operation dial can be made to appear to be actually provided on the top surface of the camera body 10. The operation system using an operation dial can realize an intuitive and visual operation, and thus it is possible to provide a simple operation system.

According to the digital camera 1 of the present embodiment, in a case where the first rear command dial D1 and the second rear command dial D2 are rotationally operated, image pictures of the rotationally operated dials are displayed to be enlarged, and are displayed to be rotated in operation directions. Consequently, it is possible to provide the same operation feeling as in a case where an actual operation is performed. Since an operated dial is displayed to be enlarged, a relationship between display on the sub-display 16 and an actual operation dial can be clarified, and thus it is possible to provide an operation system which can be more easily understood. Since display is enlarged, a numerical value or the like of a dial plate can be easily viewed. Since an actual operation dial having a small size can be used, an installation space can be saved even in a case where a plurality of operation dials are used. Consequently, the whole camera can be made compact.

Particularly, according to the digital camera 1 of the present embodiment, an image picture of an actual operation dial is displayed on the display unit, and, by using a visual effect, the relevance between both of the two is shown, an operation state is shown, or easiness of viewing is devised. Consequently, an advantage of a dial operation that it becomes easier to intuitively understand a change content and a change method and an advantage of an operation using the display unit that display of a set value is enlarged, and thus the set value is easily viewed are compatible, and thus it is possible to realize a more favorable operability than in the related art. In a case where both of an operation dial and a display unit are merely provided, a positional relationship between display and the dial is hard to understand, and a visibility and easiness of understanding are not compatible unless a size or a position of the display is not devised.

[Modification Examples]

<<Modification Example of Display Form During Operation>>

In the above-described embodiment, in a case where an image picture of an operated dial is enlarged, the image picture is enlarged not to interfere with an image picture of a non-operated dial, but a display form of enlarging an image picture of an operated dial is not limited thereto. Hereinafter, modification examples of a display aspect during enlargement will be described.

(1) Aspect of Overlapping Display

Figure 24:
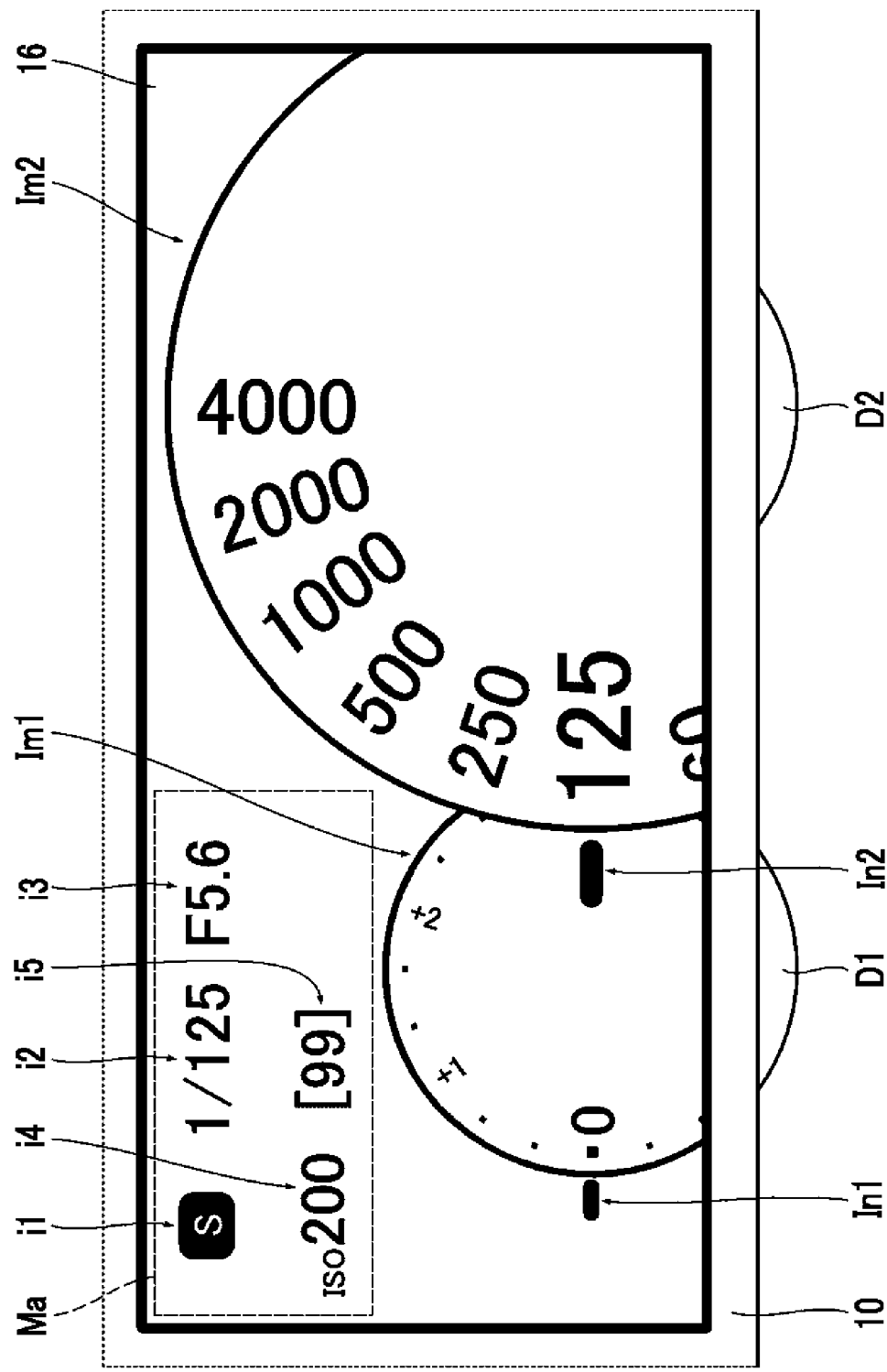
FIG. 24 is a plan view illustrating a modification example of display on the sub-display in a case where an image picture is enlarged.

FIG. 24 is a plan view illustrating a modification example of display on the sub-display in a case where an image picture is enlarged. Particularly, FIG. 24 illustrates a display state of the sub-display 16 in a case where the shutter speed priority is set, and the second rear command dial D2 is rotationally operated.

As illustrated in FIG. 24, in a case where an image picture of an operated dial is enlarged, the image picture may be displayed to overlap an image picture of a non-operated dial. In the example illustrated in FIG. 24, the image picture Im2 of the second rear command dial D2 is displayed to overlap the image picture Im1 of the first rear command dial D1 which is a non-operated dial.

As mentioned above, in a case where an image picture of an operated dial is enlarged, the image picture is displayed to overlap an image picture of a non-operated dial, and can thus be displayed to be as large as possible. Consequently, an image of a dial plate can be more easily viewed.

(2) Aspect of Notch Display

Figure 25:
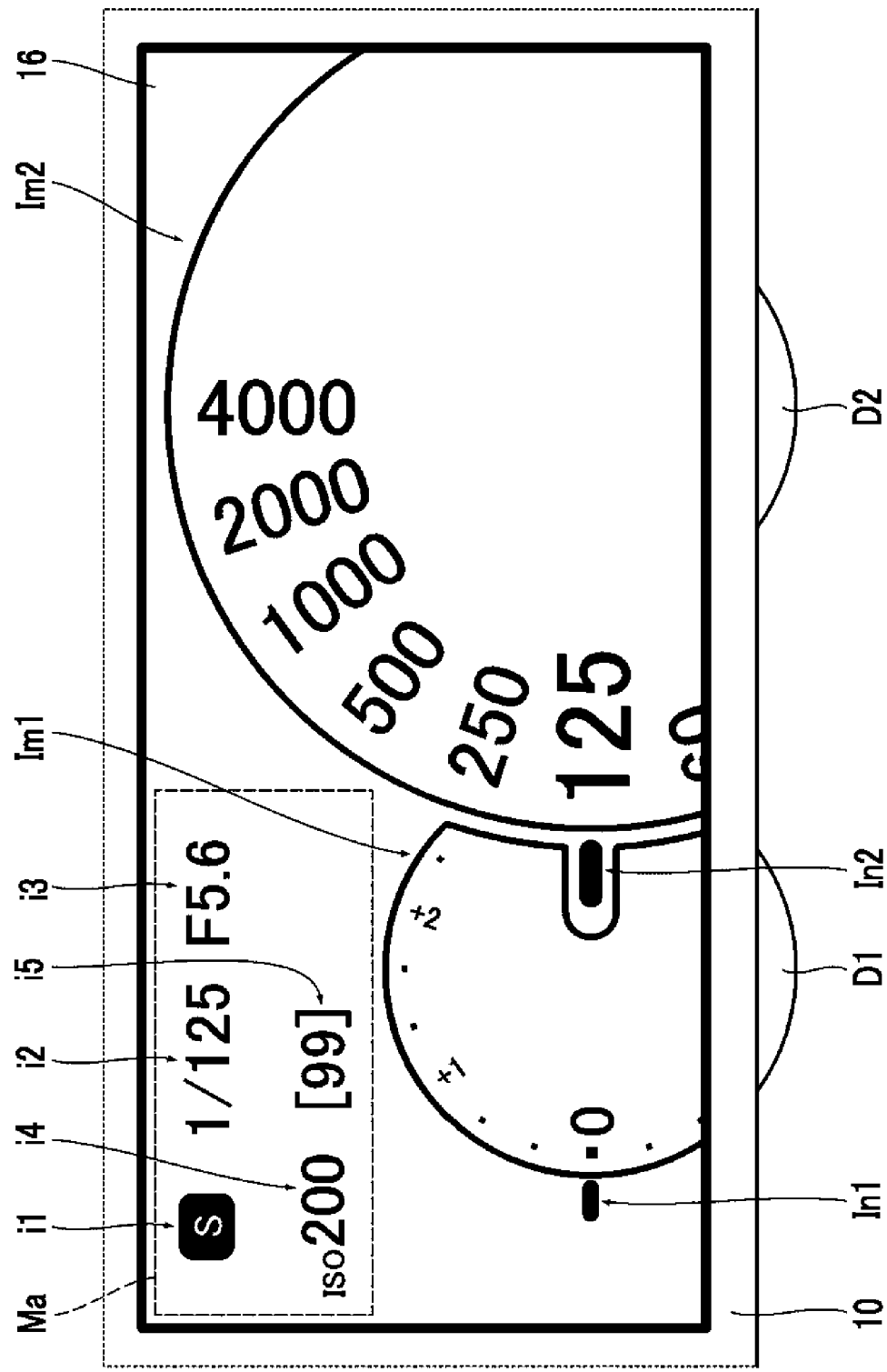
FIG. 25 is a plan view illustrating a modification example of display on the sub-display in a case where an image picture is enlarged.

FIG. 25 is a plan view illustrating a modification example of display on the sub-display in a case where an image picture is enlarged. Particularly, FIG. 25 illustrates a display state of the sub-display 16 in a case where the shutter speed priority is set, and the second rear command dial D2 is rotationally operated.

As illustrated in FIG. 25, in a case where an image picture of an operated dial is enlarged, an image picture of a non-operated dial may be displayed to be partially notched. In the example illustrated in FIG. 25, the image picture Im2 of the second rear command dial D2 is displayed such that a part of the image picture Im1 of the first rear command dial D1 which is a non-operated dial is notched. A notched portion is a portion overlapping display of the image picture Im2 of the second rear command dial D2.

The example illustrated in FIG. 25 is an example of a notch, and an aspect of a notch is not limited thereto.

(3) Aspect in Which Image Picture of Non-operated Dial is Retreated

Figure 26:
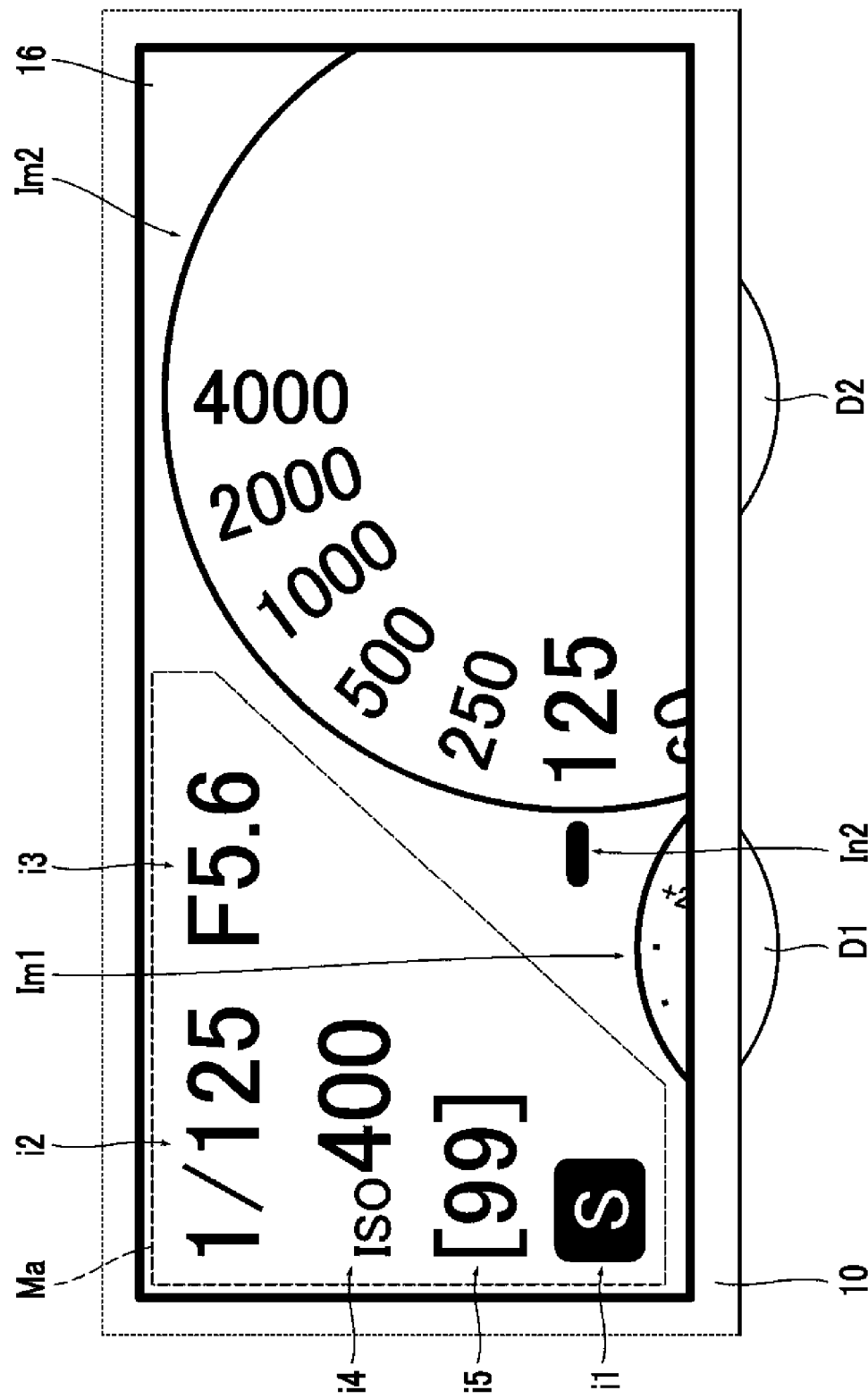
FIG. 26 is a plan view illustrating a modification example of display on the sub-display in a case where an image picture is enlarged.

FIG. 26 is a plan view illustrating a modification example of display on the sub-display in a case where an image picture is enlarged. Particularly, FIG. 26 illustrates a display state of the sub-display 16 in a case where the shutter speed priority is set, and the second rear command dial D2 is rotationally operated.

As illustrated in FIG. 26, in a case where an image picture of an operated dial is enlarged, an image picture of a non-operated dial may be displayed to be retreated to a position not overlapping the image picture. In the example illustrated in FIG. 26, the image picture Im2 of the second rear command dial D2 is displayed such that the image picture Im1 of the first rear command dial D1 which is a non-operated dial is retreated. Particularly, FIG. 26 illustrates an example of a case where the image picture Im1 is retreated in the direction of the first rear command dial D1 exposed from the camera body 10. The direction is a direction opposite to an operation direction in which the first rear command dial D1 is subjected to a pushing operation. In other words, an image picture of a non-operated dial is retreated in a direction opposite to a pushing direction.

As illustrated in FIG. 26, only a part of the image picture is displayed to be left, and thus a user can recognize the presence of the first rear command dial D1, and can thus easily understand the operation system.

In a case where an image picture of an operation dial is retreated, since the image picture is retreated in a direction of the actual operation dial, the relevance between the operation dial and the image picture of the dial can be clarified, and thus it is possible to further improve an operability.

Figure 27:
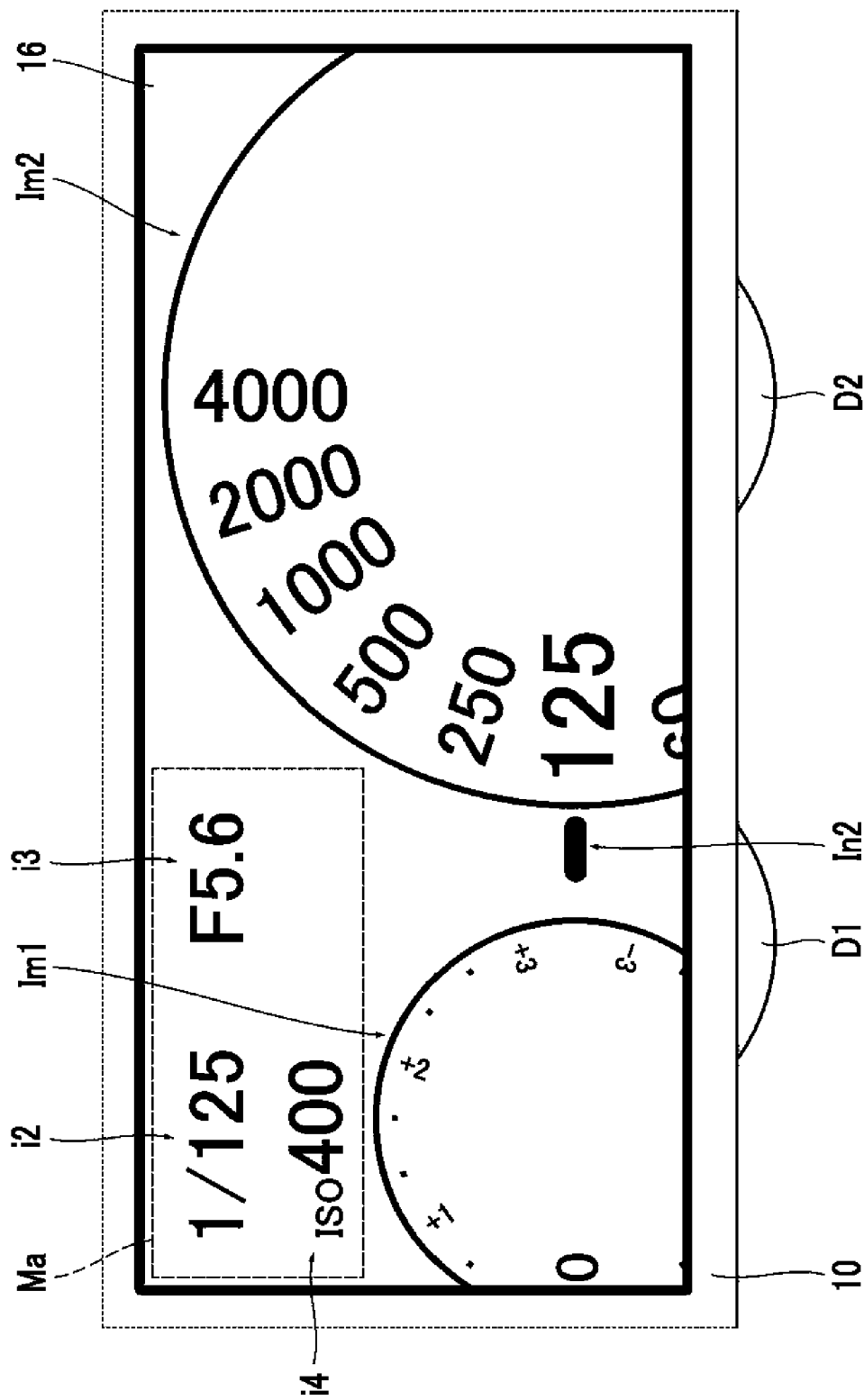
FIG. 27 is a plan view illustrating another example of display on the sub-display in a case where an image picture of a non-operated dial is retreated.

FIG. 27 is a plan view illustrating another example of display on the sub-display in a case where an image picture of a non-operated dial is retreated.

FIG. 27 illustrates an example of a case where an image picture of a non-operated dial is slid horizontally to be retreated.

(4) Aspect in Which Current Set Value is Displayed Inside Image Picture

Figure 28:
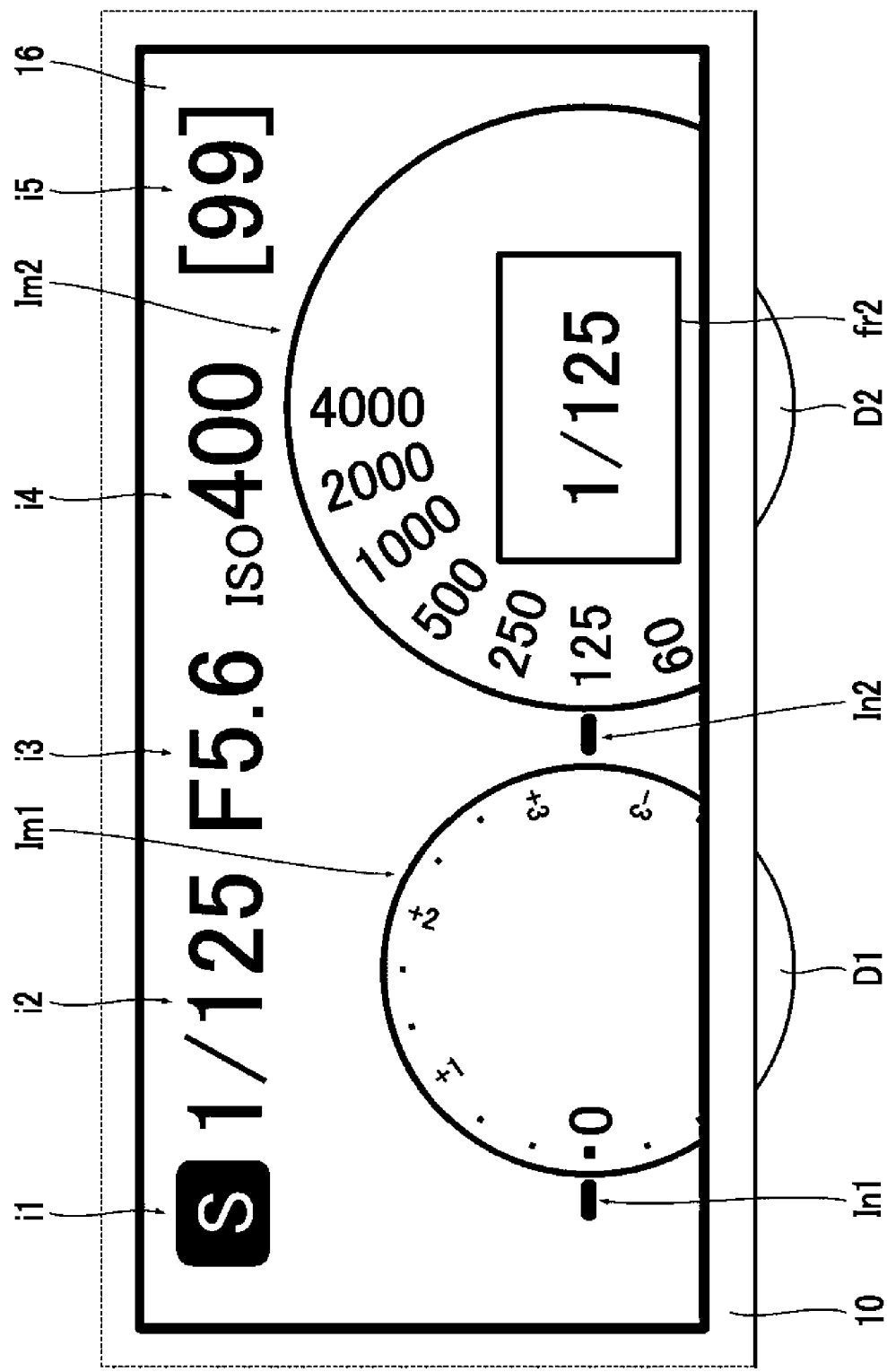
FIG. 28 is a plan view illustrating a modification example of display on the sub-display in a case where an image picture is enlarged.

FIG. 28 is a plan view illustrating a modification example of display on the sub-display in a case where an image picture is enlarged. Particularly, FIG. 28 illustrates a display state of the sub-display 16 in a case where the shutter speed priority is set, and the second rear command dial D2 is rotationally operated.

As illustrated in FIG. 28, in a case where an image picture of an operated dial is enlarged, the current set value may be displayed inside the image picture. In other words, in a case where the image picture of the operated dial is enlarged, the set value corresponding to a position of an indicator may be displayed inside the image picture. FIG. 28 illustrates an example of a case where a shutter speed is set to 1/250 seconds. Particularly, in the example illustrated in FIG. 28, a frame fr2 is displayed inside the image picture Im2 displayed on the sub-display 16, and the current set value is displayed to be enlarged inside the frame fr2. Consequently, it is possible to effectively use the margin region, and thus to realize display which is more easily viewed.

In a case of this example, even in a case where the dial is rotationally operated, the frame and the display of the set value within the frame are not rotated.

(5) Aspect of Displaying Current Set Value in Dial Plate

Figure 29:
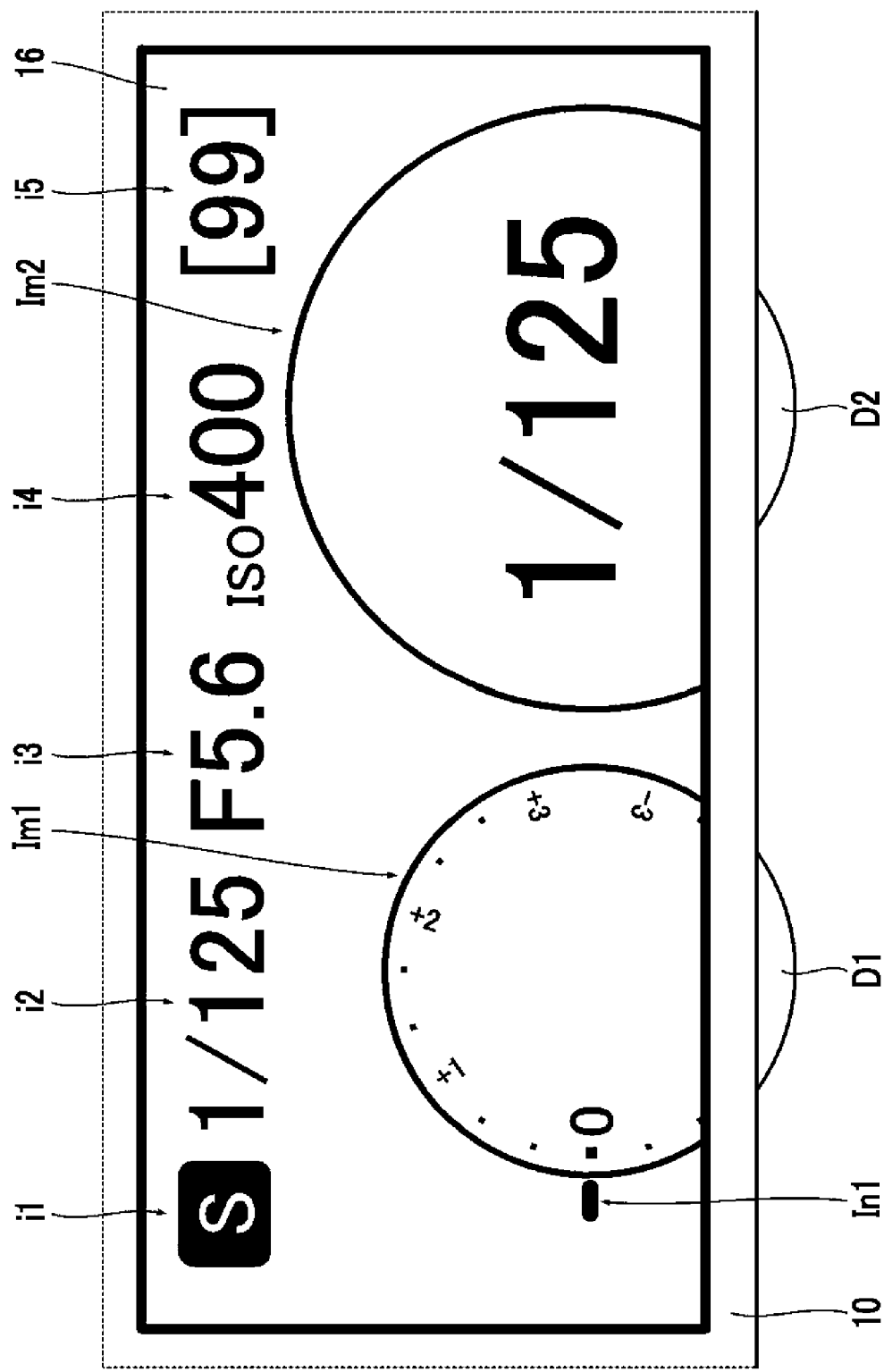
FIG. 29 is a plan view illustrating a modification example of display on the sub-display in a case where an image picture is enlarged.

FIG. 29 is a plan view illustrating a modification example of display on the sub-display in a case where an image picture is enlarged. Particularly, FIG. 29 illustrates a display state of the sub-display 16 in a case where the shutter speed priority is set, and the second rear command dial D2 is rotationally operated.

As illustrated in FIG. 29, in a case where an image picture of an operated dial is enlarged, only the current set value may be displayed inside the image picture. In other words, display of the dial plate may be switched to display of the current set value. FIG. 29 illustrates an example of a case where the current shutter speed is set to 1/250 seconds.

In a case of this example, even in a case where the dial is rotationally operated, the display of the set value is not rotated. In the case of this example, the image picture of the indicator of the operated dial is erased.

(6) Display Aspect in Which Rotation Clarified

Figure 30:
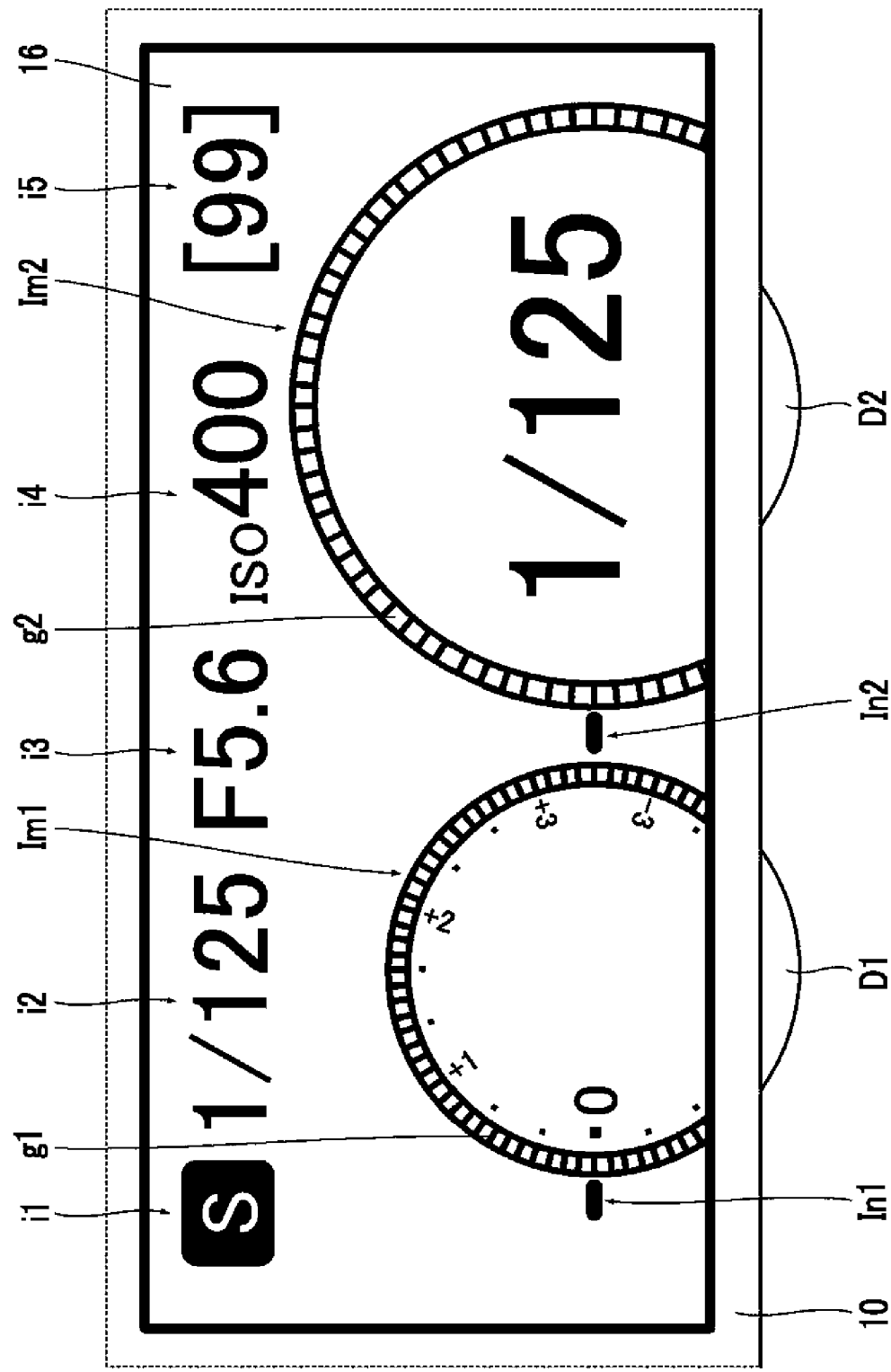
FIG. 30 is a plan view illustrating a modification example of display on the sub-display in a case where an image picture is enlarged.

FIG. 30 is a plan view illustrating a modification example of display on the sub-display in a case where an image picture is enlarged.

Particularly, FIG. 30 illustrates a display state of the sub-display 16 in a case where the shutter speed priority is set, and the second rear command dial D2 is rotationally operated.

As illustrated in FIG. 30, patterns g1 and g2 shaping grooves provided on outer circumference surfaces of the actual dials are displayed in outer circumferential portions of the image pictures Im1 and Im2 of the respective dials. Particularly, in the example illustrated in FIG. 30, lines indicating the grooves are displayed at a predetermined pitch in the outer circumferential portion.

Since the pattern g1 and g2 are displayed in the outer circumferential portions, in a case where the image picture Im1 or Im2 of the dial is rotated, motion thereof can be clarified. In other words, in a case where image picture Im2 is rotated, the pattern g2 of the outer circumferential portion is moved as animation, and thus rotation of the image picture can be clarified. Consequently, it is possible to improve a visibility and thus to ensure a more favorable operability. Particularly, as in the example illustrated in FIG. 30, this is effective in a case where only the current set value is displayed in the dial plate portion of the image picture Im2.

A display aspect in which rotation of an image picture is clarified is not limited thereto. For example, in a case where a pattern having consecutive uneven shapes is displayed in an outer circumferential portion of an image picture of a dial, or dots are displayed at a predetermined pitch, rotational motion can also be clarified.

(7) Other Display Aspects

The brightness or a color of an image picture of an operated operation dial may be changed. Consequently, it is possible to clarify the relevance between display on the display unit and an actually operated operation dial. In this case, the image picture is not necessarily required to be enlarged.

<<Modification Example of Display Form of Set Content>>

With respect to the set contents of the digital camera 1, preferably, as necessary, a display size is reduced, a display position is deviated, a display layout is changed, or a content to be displayed is changed.

For example, in the examples illustrated in FIGS. 24 and 25, display sizes, positions, and a layout of the set contents of the digital camera 1 are changed in conjunction with the process of enlarging the image picture. In other words, the display sizes of the set contents are reduced to be displayed at positions not interfering with display of the image picture.

In the example illustrated in FIG. 26, display positions and a layout of the set contents of the digital camera 1 are changed in conjunction with the process of enlarging the image picture. In other words, display positions of the set contents of the digital camera 1 are deviated to positions not interfering with display of the image picture in conjunction with the process of enlarging the image picture.

In the example illustrated in FIG. 27, display contents, display positions, and a layout of the set contents of the digital camera 1 are changed in conjunction with the process of enlarging the image picture. In other words, in conjunction with the process of enlarging the image picture, the number of displayed items is reduced, and display positions thereof are deviated to positions not interfering with display of the image picture.

With respect to the set contents of the digital camera 1, as necessary, a display size is reduced, a display position is deviated, a display layout is changed, or a content to be displayed is changed, and thus it is possible to prevent interference with an image picture.

With respect to the image pictures Im1 and Im2 of dials, a set value can be preferably checked. Therefore, in a case where settings can be checked, the image picture Im1 or Im2 of the dial and the set contents of the digital camera 1 may be displayed to overlap each other.

Figure 31:
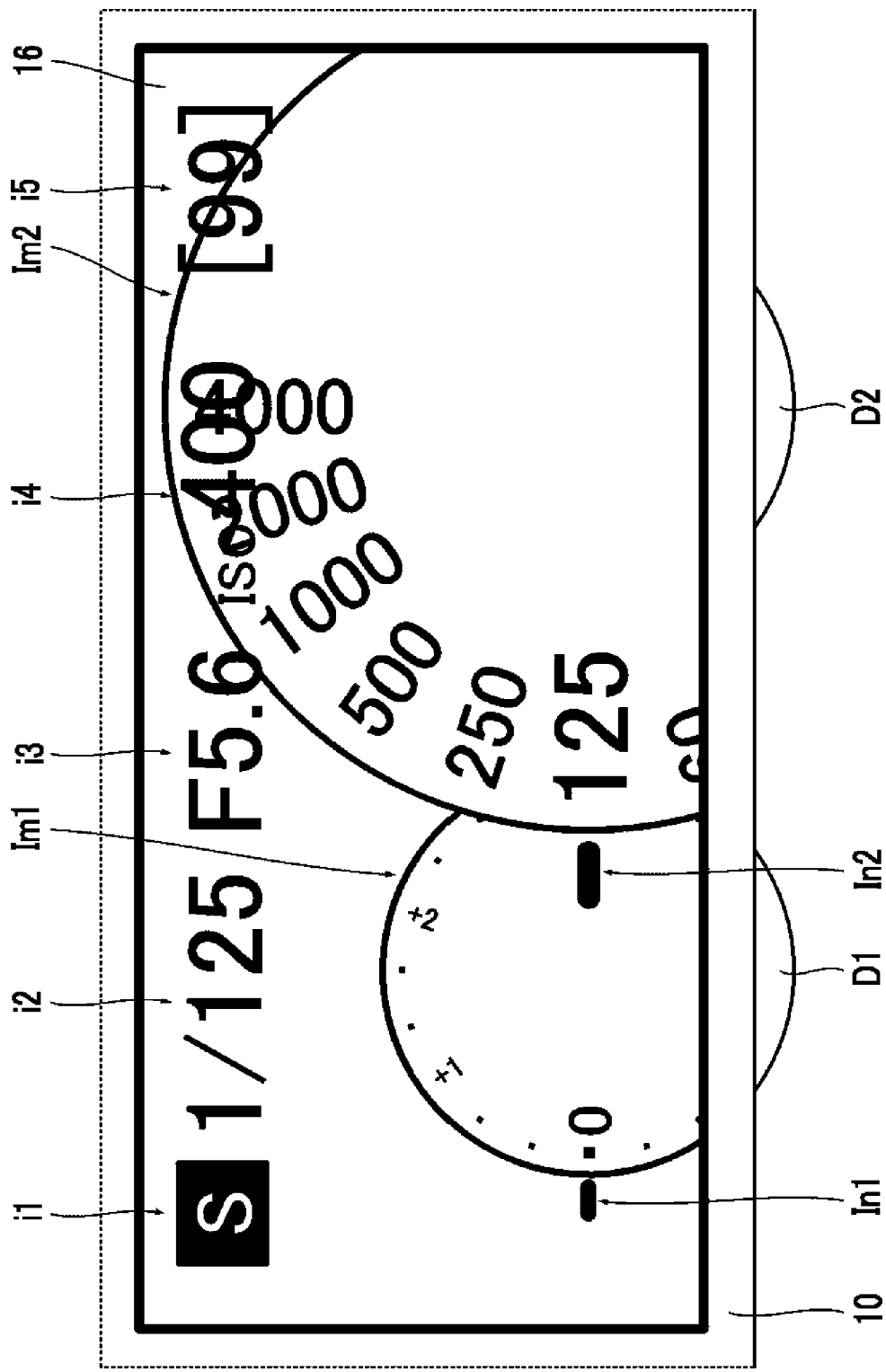
FIG. 31 is a plan view illustrating an example of display on the sub-display in a case where set contents of the digital camera are displayed to overlap an image picture of a dial.

FIG. 31 is a plan view illustrating an example of display on the sub-display in a case where the set contents of the digital camera are displayed to overlap an image picture of a dial.

As illustrated in FIG. 31, in a case where an image picture of a dial is enlarged, but a set value can be checked on a screen, the set contents of the digital camera 1 may be displayed to overlap the image picture Im2. Whether or not a set value can be checked on the screen is determined depending on a relationship with an image picture of an indicator. The set value of the dial can be checked on the screen as long as the set contents of the digital camera do not overlap a numerical value indicated by the image picture of the indicator.

In a case where an image picture of a dial is enlarged, and overlaps the set contents of the digital camera 1, mutual display colors may be changed. In other words, the image picture of the dial and the set contents are displayed in different colors.

Figure 32:
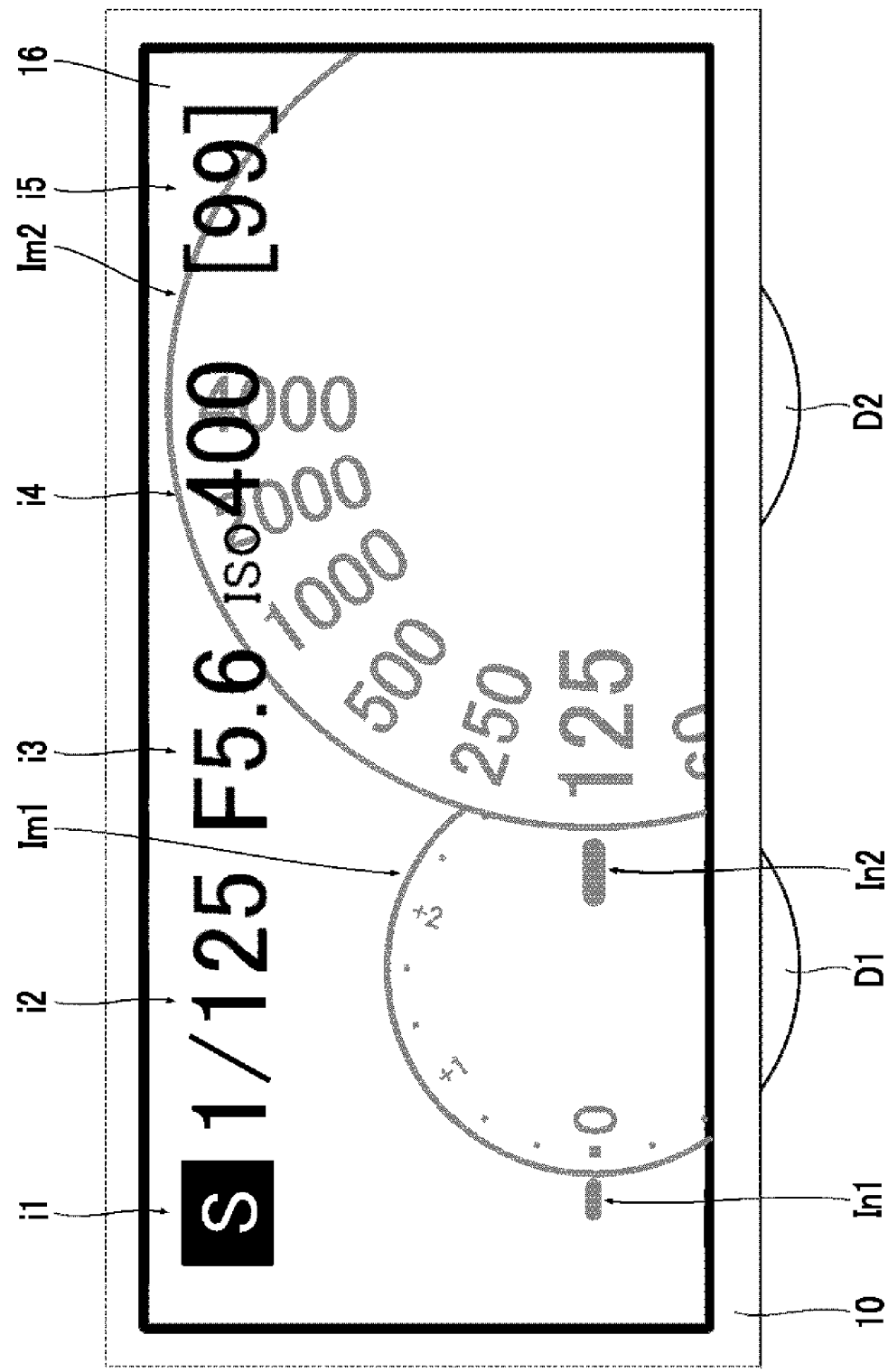
FIG. 32 is a plan view illustrating an example of display on the sub-display in a case where the set contents of the digital camera and image pictures of dials are displayed in different colors.

FIG. 32 is a plan view illustrating an example of display on the sub-display in a case where the set contents of the digital camera and image pictures of dials are displayed in different colors.

As illustrated in FIG. 32, the image picture Im1 of the first rear command dial D1 and the image picture Im2 of the second rear command dial D2, and the information i1 to i5 regarding the set contents of the digital camera 1 are displayed in different colors. Consequently, even in a case where the image picture of the dial and the information i1 to i5 regarding the set contents of the digital camera are displayed to overlap each other, display can be easily viewed.

A color may be changed only in a case where an image picture of a dial is enlarged.

In a case where the image picture of the dial and the set contents of the digital camera are displayed to overlap each other, and a set value of the dial can be checked on a screen, the set contents are preferably displayed to overlap the image picture. In this case, preferably, the background is set in a display region of the set contents, and the set contents are displayed.

Figure 33:
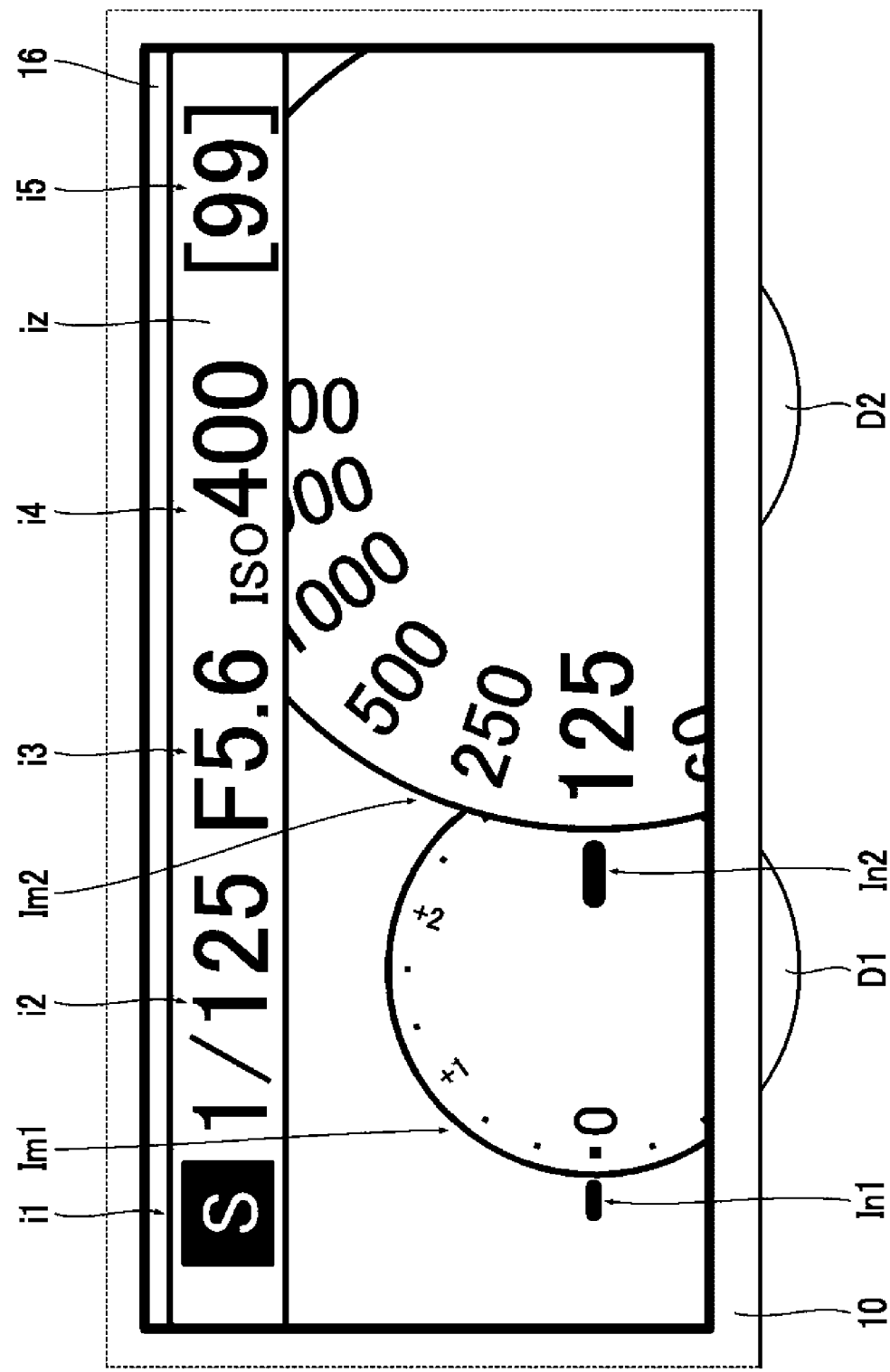
FIG. 33 is a plan view illustrating an example of display on the sub-display in a case where the background is set in a display region of the set contents of the digital camera, and the set contents are displayed.

FIG. 33 is a plan view illustrating an example of display on the sub-display in a case where the background is set in a display region of the set contents of the digital camera, and the set contents are displayed.

In the example illustrated in FIG. 33, a plain background is set in a strip-shaped region iz in which the information i1 to i5 regarding the set contents of the digital camera is displayed, and the set contents are displayed to overlap the image picture Im1 or Im2 of the dial (so-called layer display). Consequently, settings of the digital camera can be easily viewed.

In a case where an image picture of a dial is enlarged to overlap the set contents of the digital camera, and thus display of the set contents is hardly viewed, only a display position of information which is hardly viewed due to overlapping may be changed.

Figure 34:
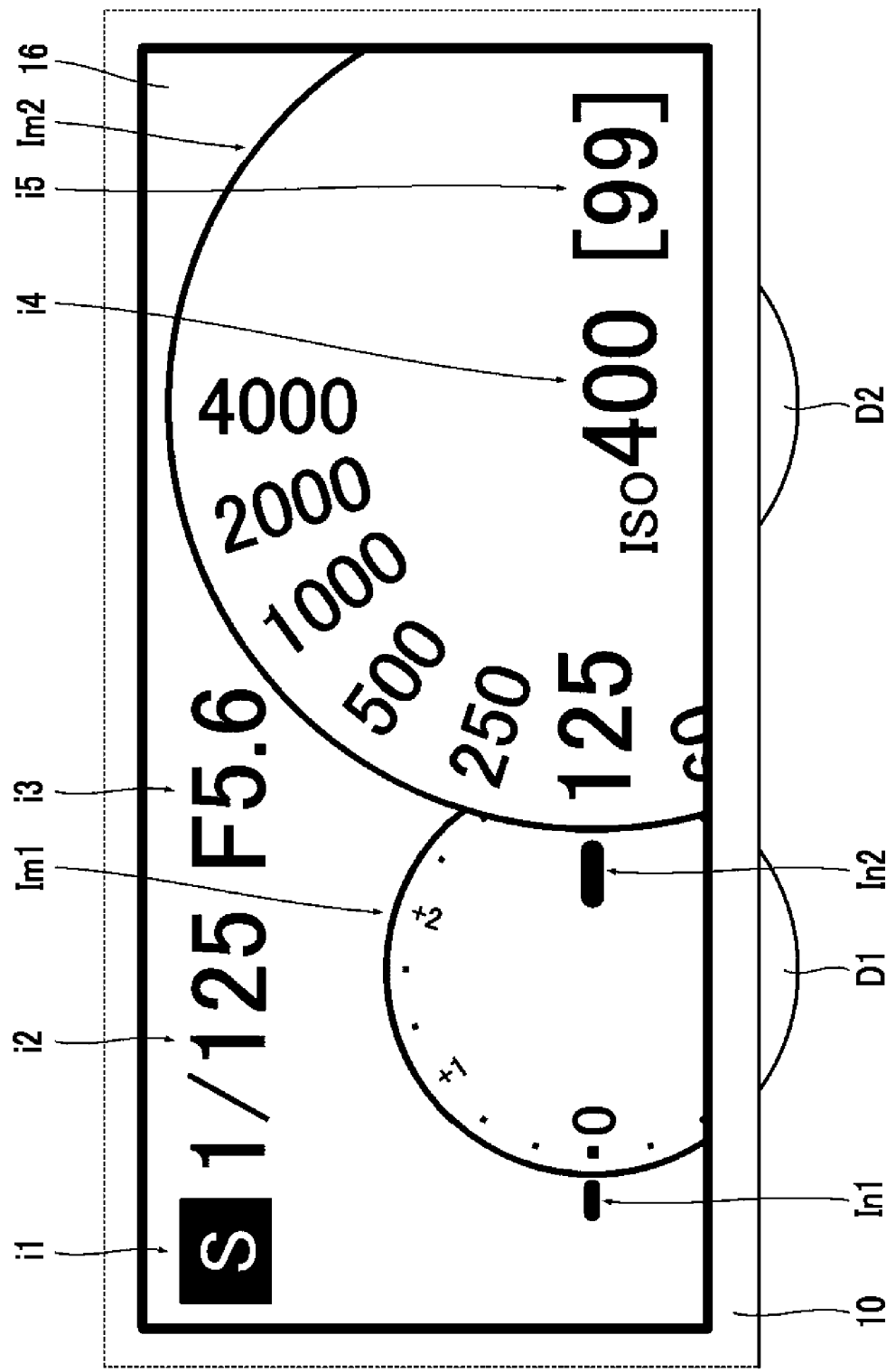
FIG. 34 is a plan view illustrating an example of display on the sub-display in a case where the image picture of the dial is enlarged, and a display layout of the set contents of the digital camera is changed.

FIG. 34 is a plan view illustrating an example of display on the sub-display in a case where the image picture of the dial is enlarged, and a display layout of the set contents of the digital camera is changed. FIG. 34 illustrates an example of a case where display positions of the information i4 regarding a sensitivity and the information i5 regarding the number of images which can be captured are changed.

In a case where the image picture Im2 of the second rear command dial D2 is enlarged, a part of the line drawing portion overlaps the information i4 regarding a sensitivity and the information i5 regarding the number of images, and thus the information i4 regarding a sensitivity and the information i5 regarding the number of images are hardly viewed (refer to FIG. 31).

Therefore, the information i4 regarding a sensitivity and the information i5 regarding the number of images are displayed to be deviated to positions not overlapping display of the line drawing portions of the image pictures Im1 and Im2. Particularly, in the example illustrated in FIG. 34, the information i4 regarding a sensitivity and the information i5 regarding the number of images are displayed inside the enlarged image picture Im2 of the second rear command dial D2.

As mentioned above, even in a case where the set contents of the digital camera are displayed to overlap the image picture Im1 or Im2 of the dial, the set contents are displayed not to overlap the line drawing portion of the image picture of the dial, and thus both of the two can be displayed to be easily viewed.

In a case where the set contents of the digital camera and the image picture of the dial are displayed to overlap each other, the set contents may be displayed to be translucent and may be displayed to overlap the image picture.

Figure 35:
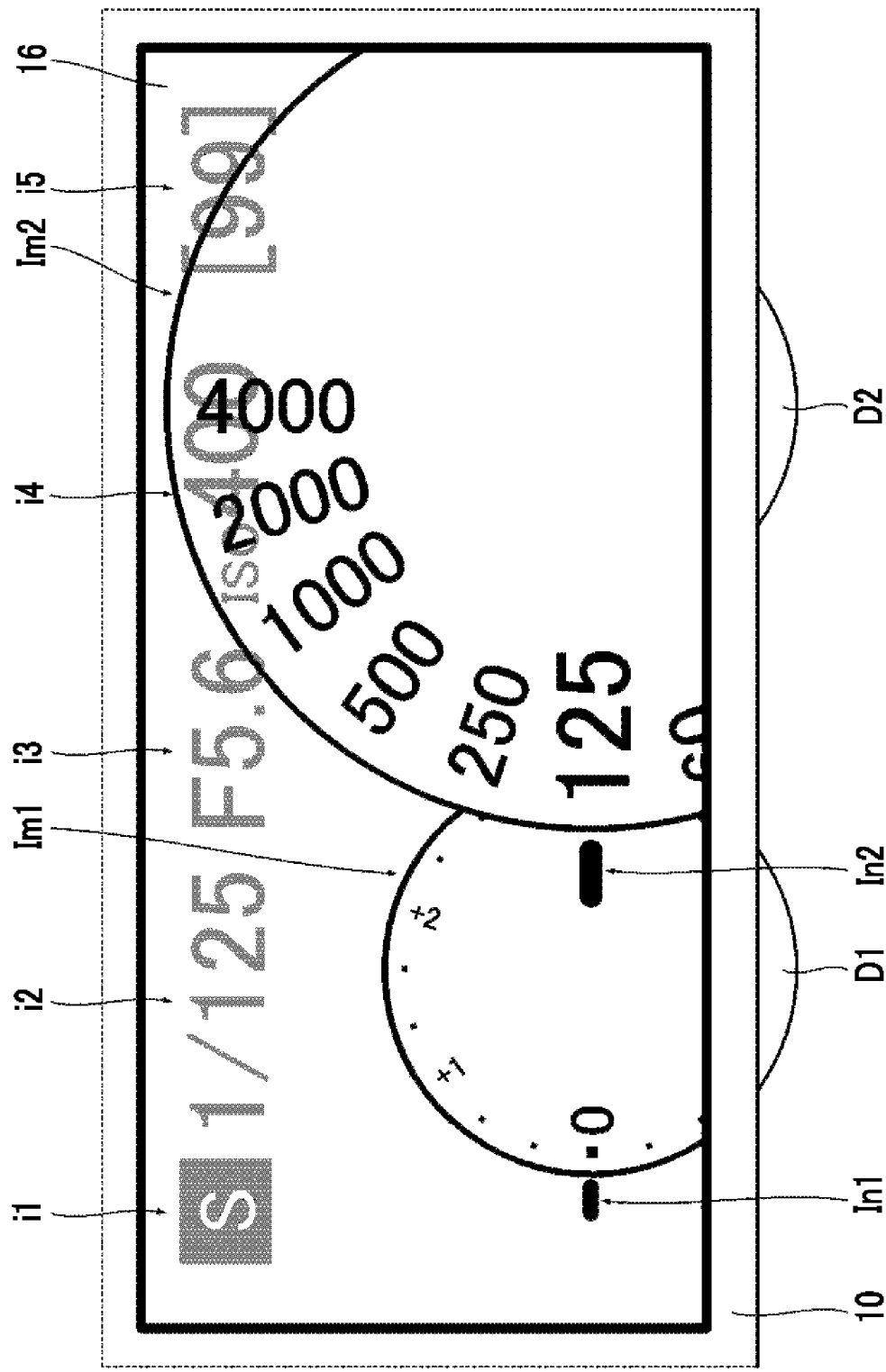
FIG. 35 is a plan view illustrating an example of display on the sub-display in a case where the set contents of the digital camera are made translucent and are displayed to overlap the image picture.

FIG. 35 is a plan view illustrating an example of display on the sub-display in a case where the set contents of the digital camera are made translucent and are displayed to overlap the image picture.

As illustrated in FIG. 35, the set contents of the digital camera may be displayed to be translucent, and the enlarged image picture may be displayed to overlap thereon.

In a case where an image picture of an operation dial is enlarged, display of the set contents of the digital camera may be erased.

In a case where an image picture of an operation dial is enlarged, display items of the set contents may be changed. For example, the number of items to be displayed may be reduced, and only information regarding a specific item may be displayed. In this case, for example, display of an item which is set by using an operation dial may be erased. Particularly, display of an item which is set by using an operation dial of which an image picture is enlarged may be erased.

<<Modification Example of Display Form During Non-operation>>

In the above-described embodiment, the image picture Im1 of the first rear command dial D1 and the image picture Im2 of the second rear command dial D2 are displayed with the same sizes and at the same positions as those of the actual first rear command dial D1 and second rear command dial D2.

However, a display aspect of the image picture Im1 of the first rear command dial D1 and the image picture Im2 of the second rear command dial D2 during a non-operation is not limited thereto.

Hereinafter, a description will be made of modification examples of a display aspect of the image picture Im1 of the first rear command dial D1 and the image picture Im2 of the second rear command dial D2 during a non-operation.

(1) Aspect of Display Through Change of Display Position and Display Size

Figure 36:
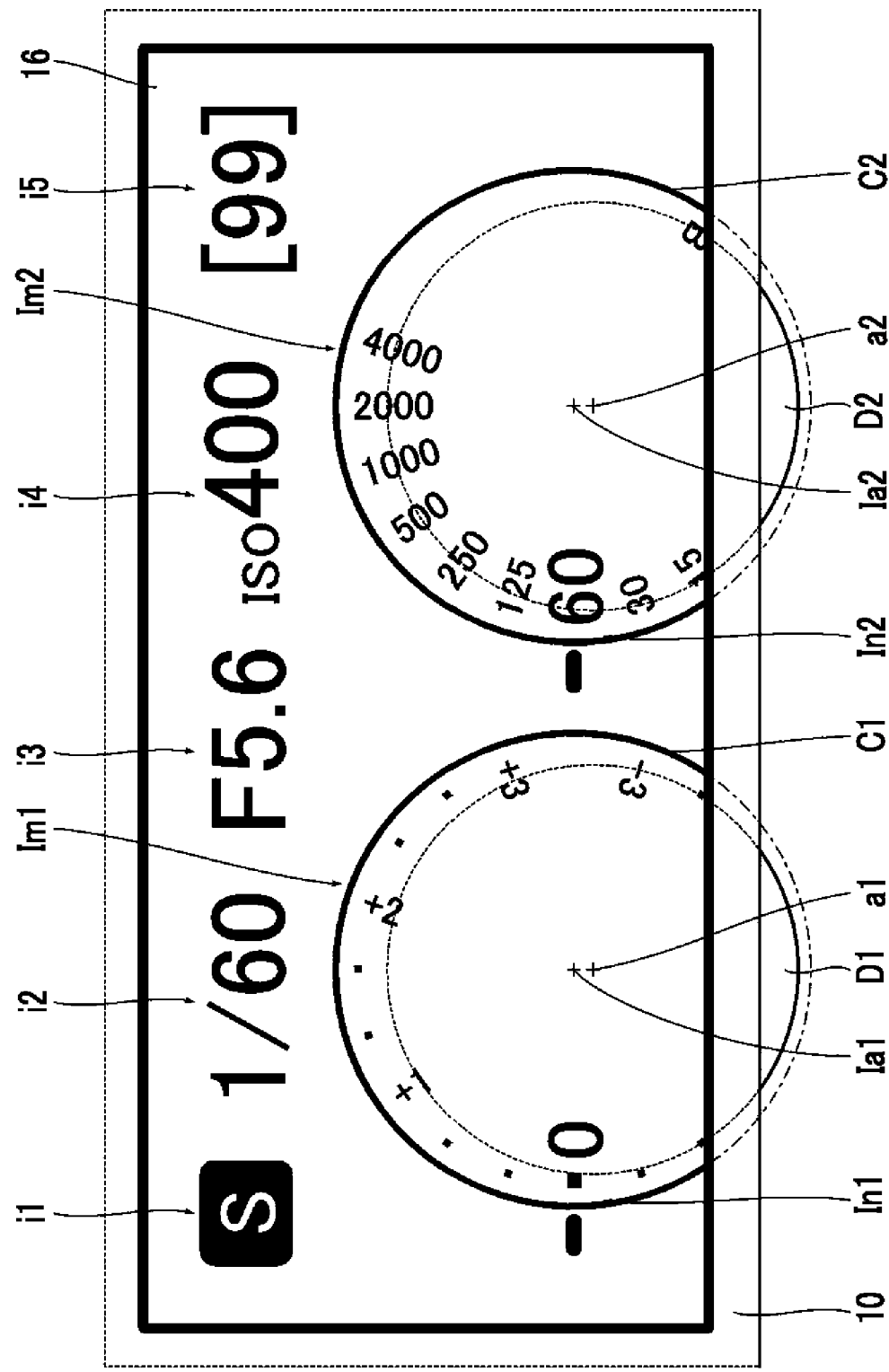
FIG. 36 is a plan view illustrating an example of display on the sub-display in a case where an image picture is displayed at a position and with a size which are different from those of an actual dial.

FIG. 36 is a plan view illustrating an example of display on the sub-display in a case where an image picture is displayed at a position and with a size which are different from those of an actual dial.

In the example illustrated in FIG. 36, the image pictures Im1 and Im2 are displayed with sizes larger than sizes of the actual first rear command dial D1 and second rear command dial D2.

In the example illustrated in FIG. 36, positions of rotation axes Ia1 and Ia2 of the respective image pictures Im1 and Im2 are displayed to be deviated relative to the positions of the rotation axis a1 of the actual first rear command dial D1 and the rotation axis a2 of the actual second rear command dial D2. Specifically, the positions of the rotation axes Ia1 and Ia2 are displayed to be deviated in the front direction (the direction in which the first rear command dial D1 and the second rear command dial D2 are pushed) along the optical axis.

As mentioned above, an image picture may be displayed at a position and with a size which are different from those of an actual operation dial. Therefore, the image picture may be displayed with a size smaller than a size of the actual operation dial.

However, regarding a position where an image picture is displayed on a screen, the image picture is preferably displayed near an actual operation dial. Consequently, it is possible to easily intuitively understand a relationship between the actual operation dial and the image picture displayed on the display unit. Here, the term "near" indicates a position where a correspondence relationship between the actual operation dial and the image picture displayed on the display unit can be understood.

More preferably, an image picture of each operation dial is displayed on a screen in a layout corresponding to a layout of each operation dial for the camera body. The layout in this case is a layout in a case where the plane on which the sub-display as a display unit is disposed is viewed from the top. In other words, in a case where the plane on which the sub-display is disposed is viewed from the top, the image picture is preferably displayed on the screen at the substantially same disposition as the disposition of an actual operation dial.

In the above-described embodiment, the sub-display 16 is disposed on the top surface of the camera body 10, and the first rear command dial D1 and the second rear command dial D2 are disposed in parallel on the rear surface of the camera body 10. Therefore, in this case, the image picture Im1 of the first rear command dial D1 and the image picture Im2 of the second rear command dial D2 are disposed in parallel at a position on the rear surface side of the camera body 10.

As mentioned above, since image pictures are displayed in layouts corresponding to layouts of respective operation dials for the camera body 10, it is possible to intuitively understand a relationship between the actual operation dials and the image pictures thereof, and thus to provide a favorable operability.

Since image pictures are displayed on a screen in layouts corresponding to layouts of respective operation dials for the camera body, it is possible to display the image pictures of the respective operation dials near the actual operation dials.

Since image pictures are displayed on a screen in layouts corresponding to layouts of respective operation dials for the camera body, an image picture of an operation dial displayed nearest an actual operation dial is displayed to be enlarged in a case where the actual operation dial is operated. Consequently, it is possible to further clarify the relevance between an actual dial and an image picture of the operation dial displayed on the display unit.

Figure 37:
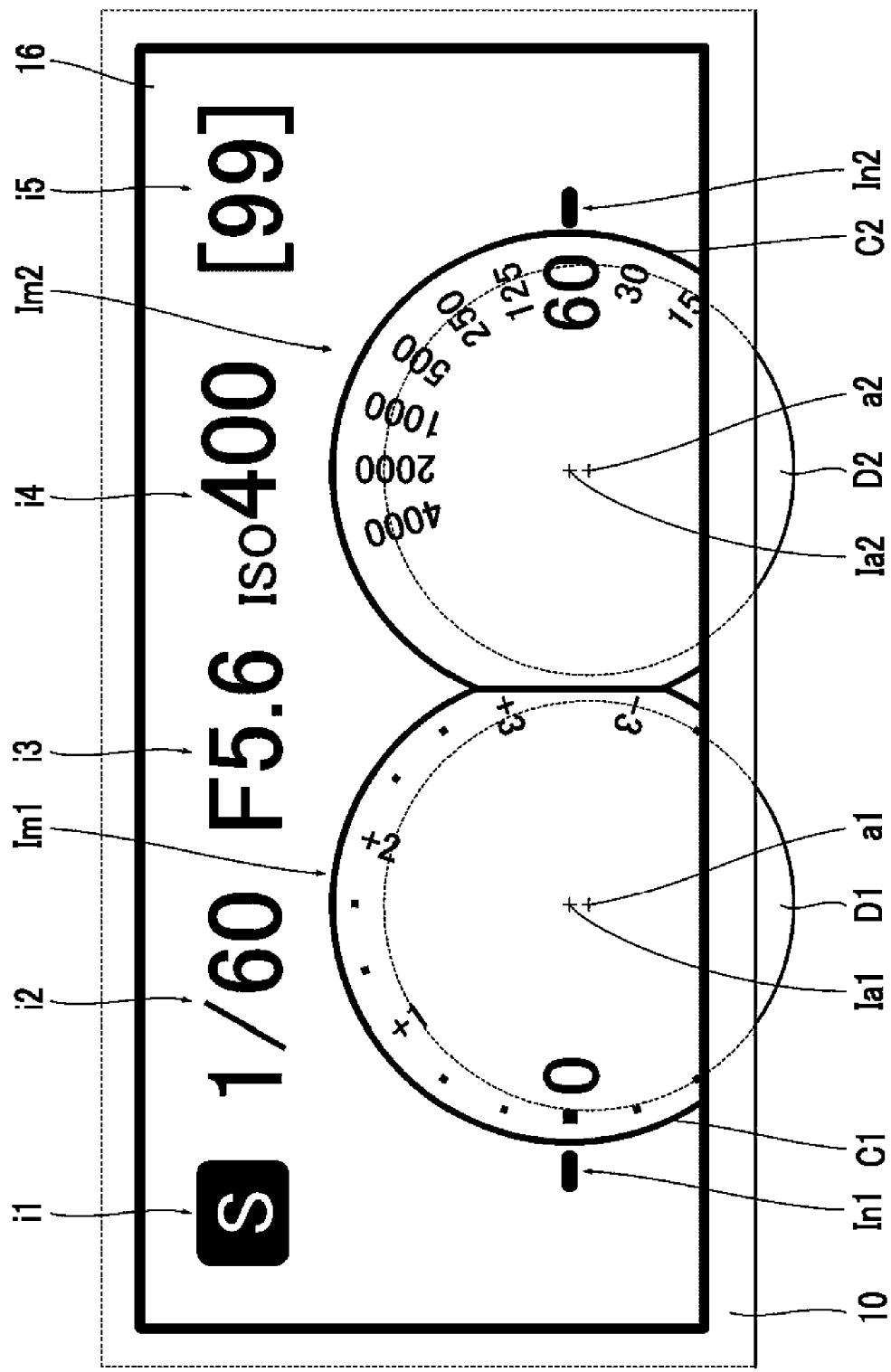
FIG. 37 is a plan view illustrating an example of display on the sub-display in a case where operation dials are disposed close to each other.

FIG. 37 is a plan view illustrating an example of display on the sub-display in a case where a plurality of operation dials are disposed close to each other.

In a case where a plurality of operation dials are disposed close to each other, and image pictures thereof are displayed with sizes larger than sizes of the actual operation dials, mutual displays thereof may interfere with each other. In this case, as illustrated in FIG. 37, portions of a plurality of operation dials interfering with each other, that is, portions overlapping each other are displayed to be notched.

There may be an aspect in which an image picture of an operation dial operated last is preferentially displayed. In other words, image pictures may be displayed in a state in which an image picture of an operation dial operated last is located at an upper position.

As illustrated in FIG. 37, in a case where the image pictures Im1 and Im2 are displayed to overlap each other, an indicator is disposed to avoid portions overlapping each other.

(2) Aspect of Display Through Retreat During Non-operation

Figure 38:
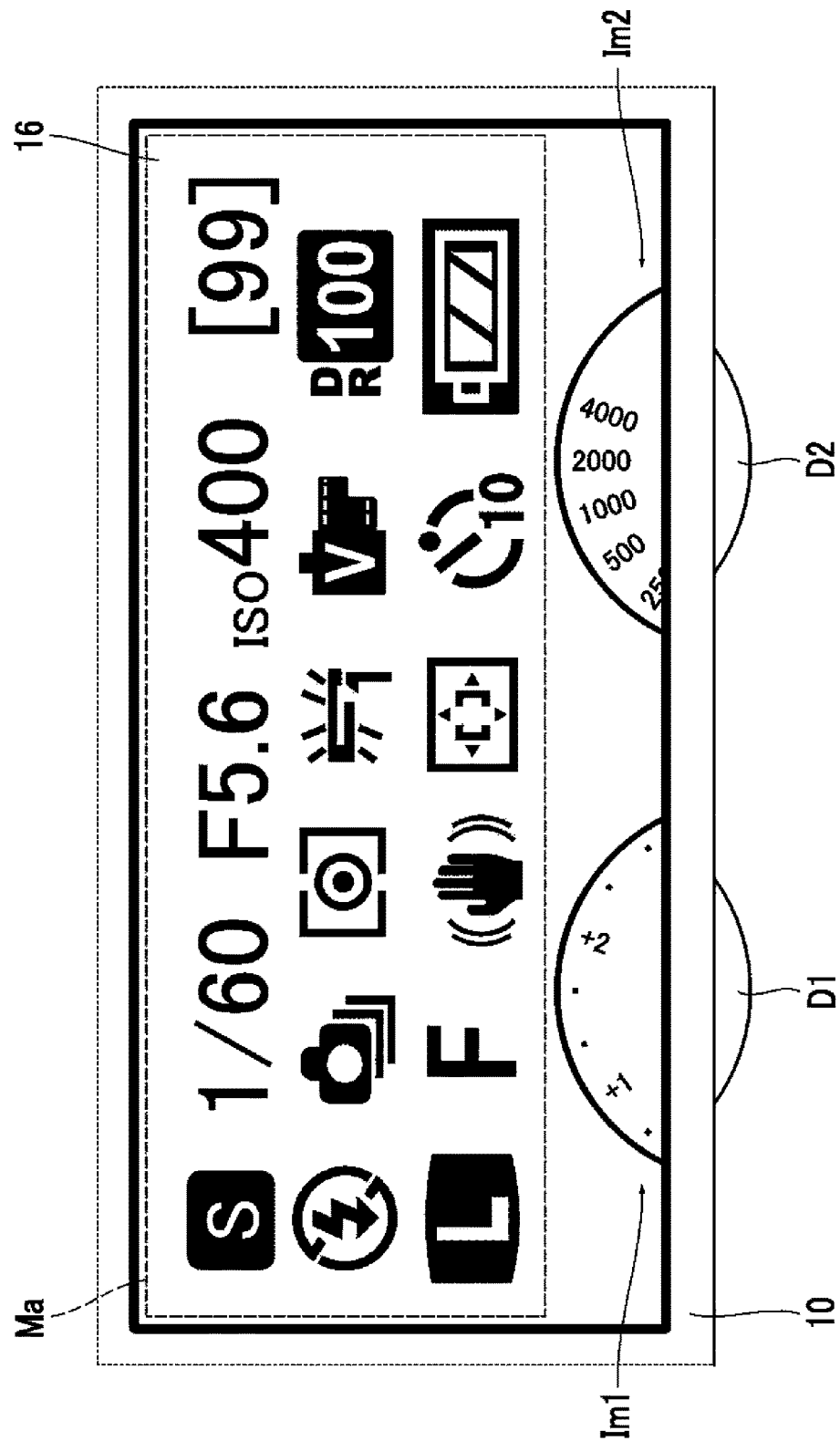
FIG. 38 is a plan view illustrating an example of display on the sub-display in a case where the image picture is displayed to be retreated during a non-operation.

FIG. 38 is a plan view illustrating an example of display on the sub-display in a case where the image picture is displayed to be retreated during a non-operation.

As illustrated in FIG. 38, the whole image picture Im1 of the first rear command dial D1 and the whole image picture Im2 of the second rear command dial D2 may be displayed to be retreated to predetermined positions such that only parts of the image picture Im1 of the first rear command dial D1 and the image picture Im2 of the second rear command dial D2 are displayed. FIG. 38 illustrates an example of a case where the image picture Im1 of the first rear command dial D1 and the image picture Im2 of the second rear command dial D2 are retreated in the direction of the first rear command dial D1 and the second rear command dial D2 exposed from the camera body 10. This direction is a direction opposite to an operation direction in a case where the first rear command dial D1 and the second rear command dial D2 are subjected to a pushing operation. In other words, the image picture Im1 of the first rear command dial D1 and the image picture Im2 of the second rear command dial D2 are retreated in the direction opposite to the direction in which the first rear command dial D1 and the second rear command dial D2 are pushed.

Since only parts of the image picture Im1 of the first rear command dial D1 and the image picture Im2 of the second rear command dial D2 are displayed, the user can recognize the presence of the operation dials, and thus it is possible to provide a favorable operability.

Since the image picture Im1 of the first rear command dial D1 and the image picture Im2 of the second rear command dial D2 are retreated in the direction of the first rear command dial D1 and the second rear command dial D2 exposed from the camera body 10, it is possible to clarify the relevance between the image pictures of which only parts are displayed and the actual operation dials, and thus to provide a favorable operability.

As mentioned above, an image picture of each operation dial is retreated during a non-operation, and thus it is possible to enlarge the margin region Ma. Consequently, as illustrated in FIG. 38, the number of pieces of information which are allowed to be displayed on the sub-display 16 can be increased.

In a case where an image picture of each operation dial is retreated during a non-operation as in this example, the image picture of each operation dial may be displayed on the sub-display 16 as necessary. For example, in a case where an operation dial is subjected to a pushing operation, an image picture of the operation dial subjected to the pushing operation is configured to be displayed on the sub-display 16. In this case, the image picture may be displayed to be enlarged.

(3) Aspect of Display Through Simplification During Non-operation

In the above-described embodiment, in a case where an image picture is enlarged during an operation, an image picture during a non-operation is displayed to be enlarged without being changed. An image picture is displayed to be smaller during a non-operation than during an operation, and the image picture may be displayed to be simplified. In other words, during a non-operation, an image of a dial plate portion may be displayed to be simplified. For example, in a case of an image picture in the form in which selectable items are displayed at a predetermined pitch on an identical circumference in a dial plate portion, display items may be thinned out and displayed during a non-operation.

Figure 39:
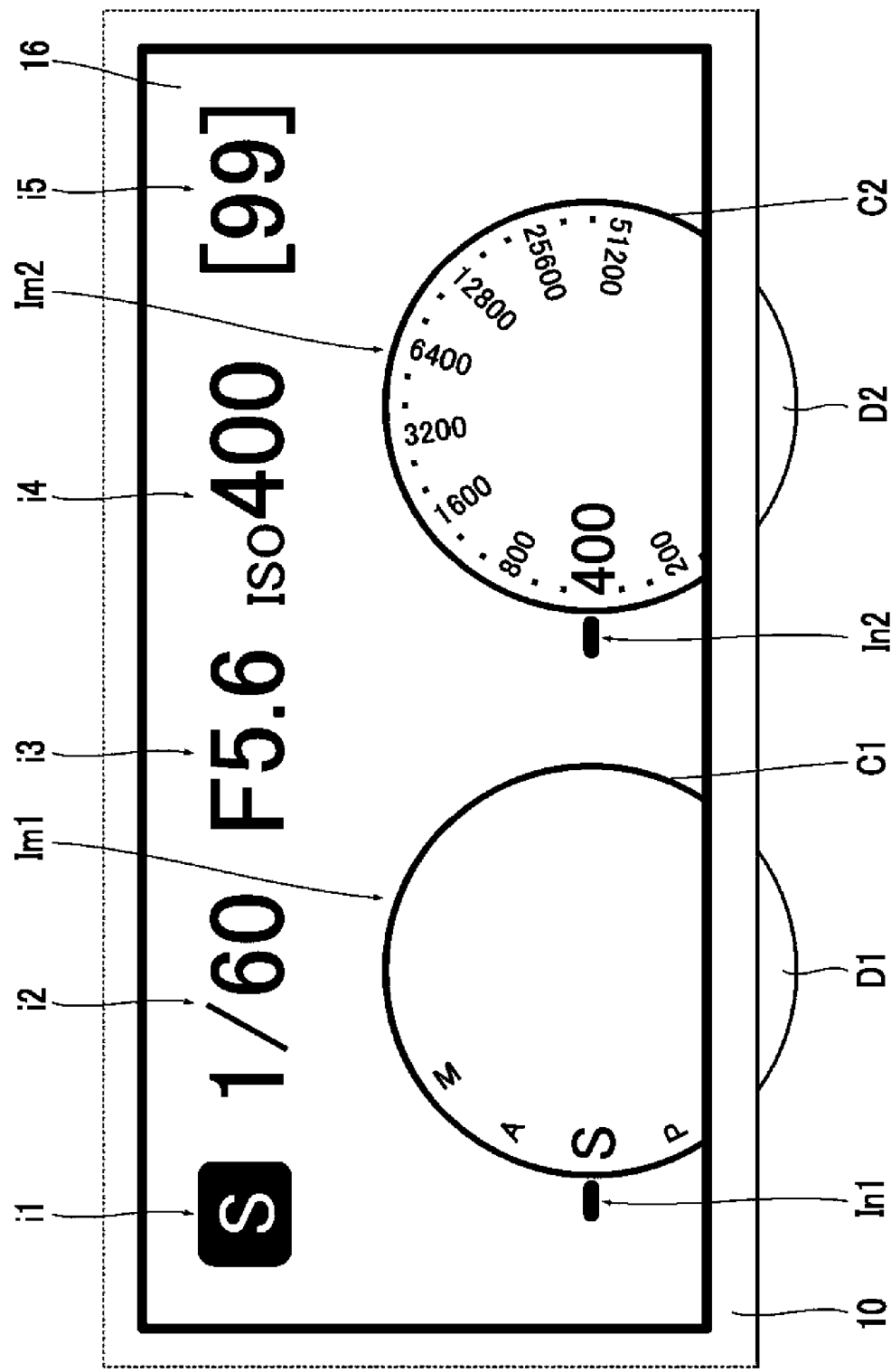
FIG. 39 is a plan view illustrating an example of display on the sub-display in a case where an image picture is displayed to be simplified during a non-operation.
Figure 40:
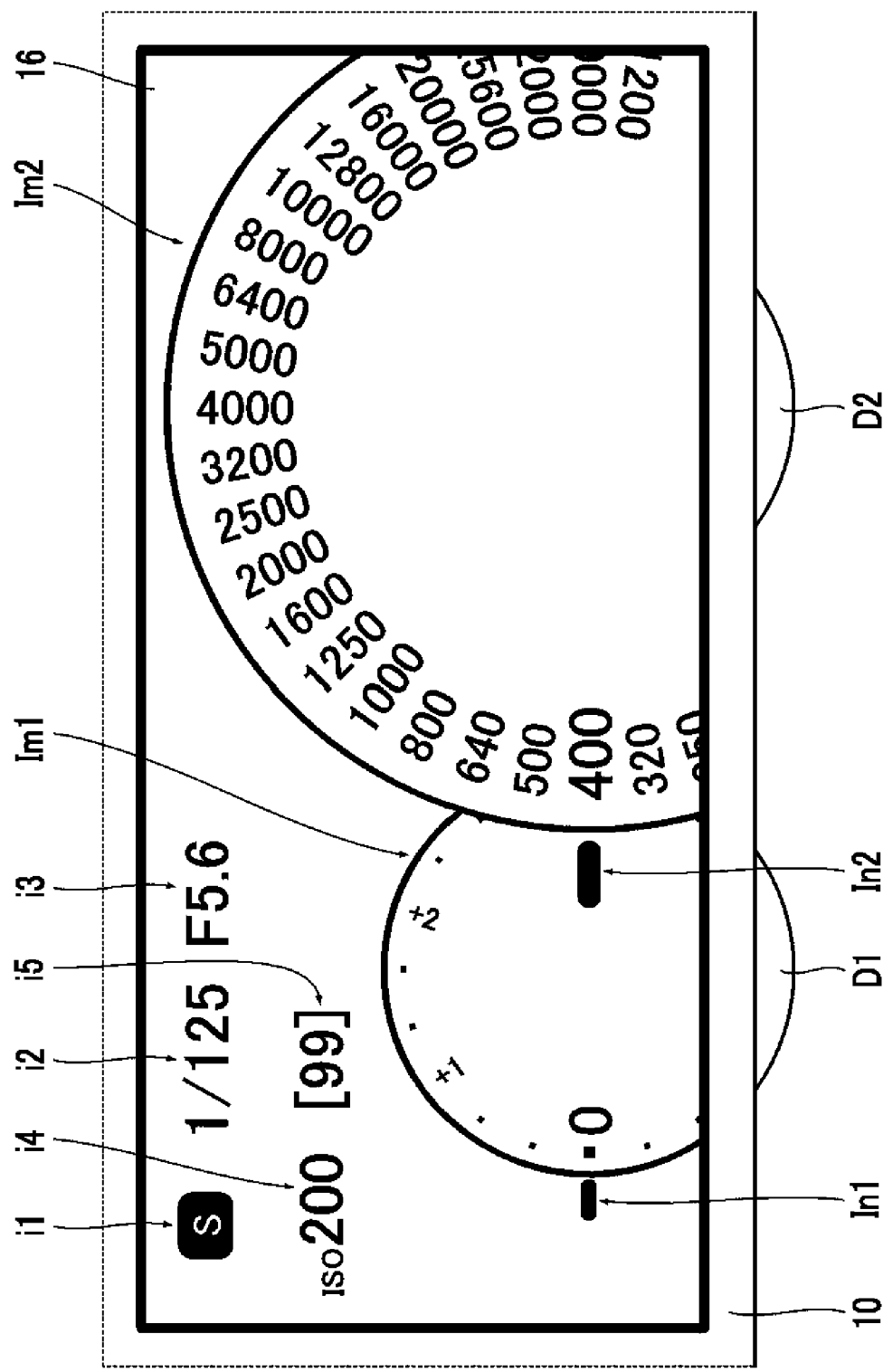
FIG. 40 is a plan view illustrating an example of display on the sub-display in a case where an image picture is displayed to be enlarged during an operation.

FIG. 39 is a plan view illustrating an example of display on the sub-display in a case where an image picture is displayed to be simplified during a non-operation. FIG. 40 is a plan view illustrating an example of display on the sub-display in a case where an image picture is displayed to be enlarged during an operation.

FIGS. 39 and 40 illustrate an example of a case where the function of setting a sensitivity is allocated to the second rear command dial D2, and the image picture Im2 of the second rear command dial D2 is displayed to be simplified. In the example illustrated in FIGS. 39 and 40, sensitivities displayed in the dial plate portion of the image picture Im2 of the second rear command dial D2 are displayed to be thinned out. In other words, only representative values are displayed in the dial plate portion of the image picture Im2 of the second rear command dial D2. More specifically, only the representative values are displayed in a case where a sensitivity is settable with a step width of ⅓ step between ISO100 and ISO51200. The representative values are values of sensitivities in a case where the sensitivity is changed with a step width of one step from ISO100. In other words, only ISP100, ISO200, ISO400, ISO800, ISO1600, ISO3200, ISO6400, ISO12800, and ISO51200 are displayed (display of ISO100 is hidden, and thus is not displayed). Intermediate values are displayed by dots "•", and thus display is simplified.

In a case where the image picture Im2 of the second rear command dial D2 is enlarged, as illustrated in FIG. 40, all settable sensitivity values are displayed. In other words, the display simplified by the dots is displayed as actual numerical values.

In a case where there are a large number of settable items with an operation dial, display of an image picture during a non-operation is preferably simplified as in this example. Consequently, it is possible to ensure a favorable visibility.

Figure 41:
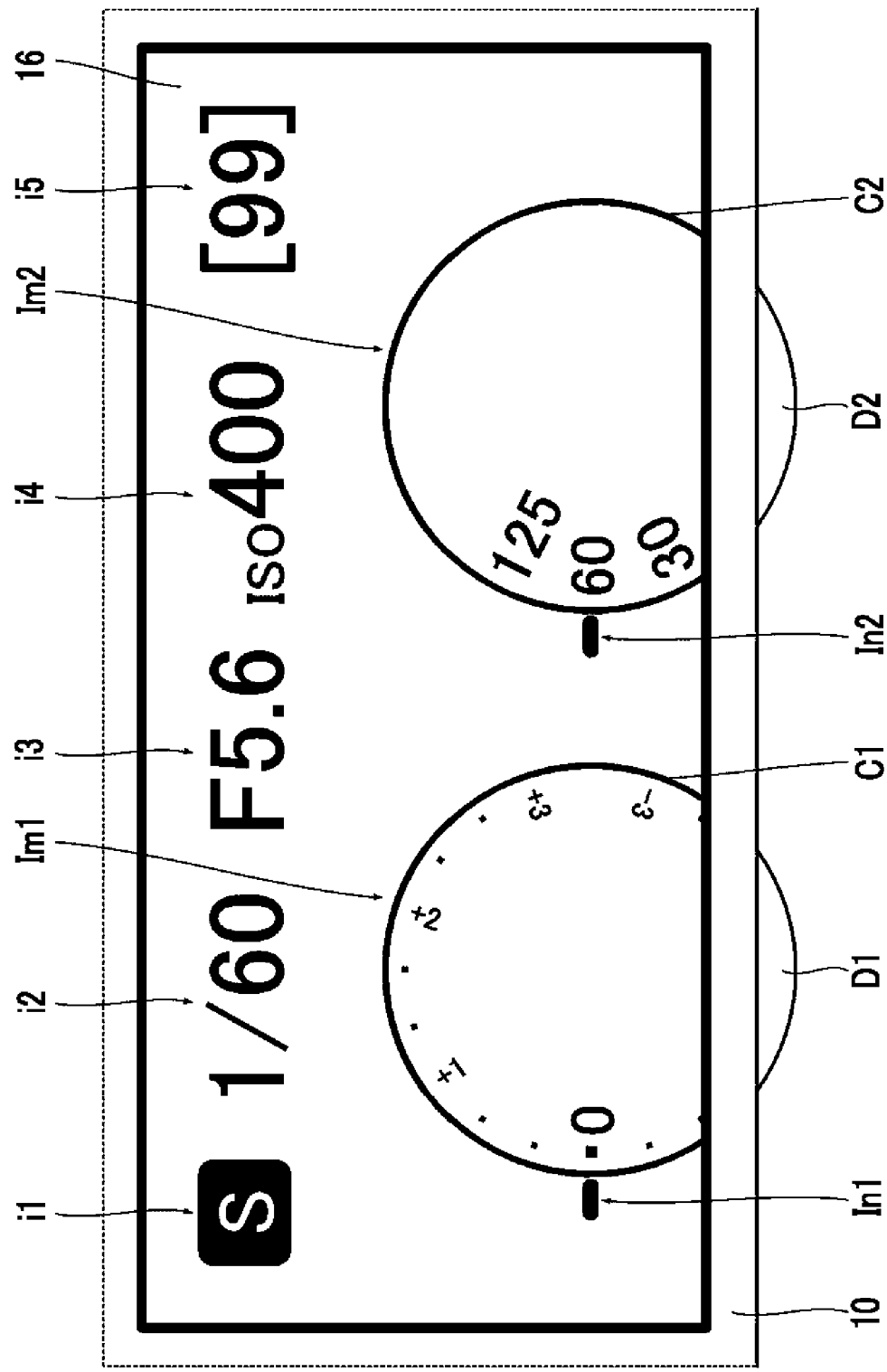
FIG. 41 is a plan view illustrating another example of display on the sub-display in a case where an image picture is displayed to be simplified during a non-operation.

FIG. 41 is a plan view illustrating another example of display on the sub-display in a case where an image picture is displayed to be simplified during a non-operation.

FIG. 41 illustrates an example of a case where the function of setting a shutter speed is allocated to the second rear command dial D2, and the image picture Im2 of the second rear command dial D2 is displayed to be simplified. In the example illustrated in FIG. 41, only the currently set shutter speed and shutter speeds before and after the currently set shutter speed are displayed in the dial plate portion of the image picture Im2 of the second rear command dial D2.

As mentioned above, the display can be simplified by displaying only some of the selection items.

<<Modification Example of Number and Layout of Operation Dials>>

In the above-described embodiment, the first rear command dial D1 and the second rear command dial D2 which are operation dials are disposed in parallel on the rear surface of the camera body 10, but the number and a layout of operation dials are not limited thereto.

Figure 42:
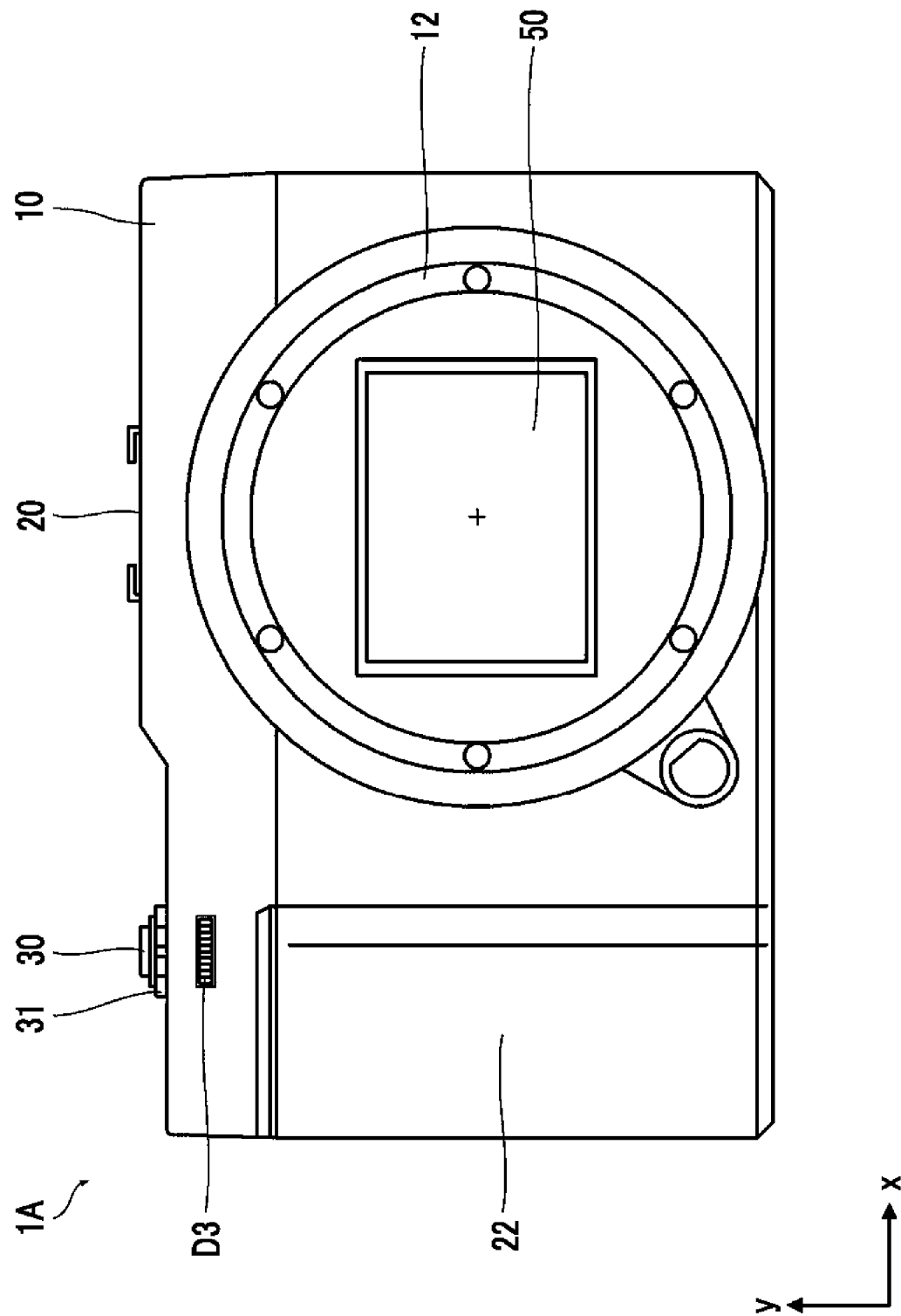
FIG. 42 is a front view illustrating an example of a digital camera comprising three operation dials.
Figure 43:
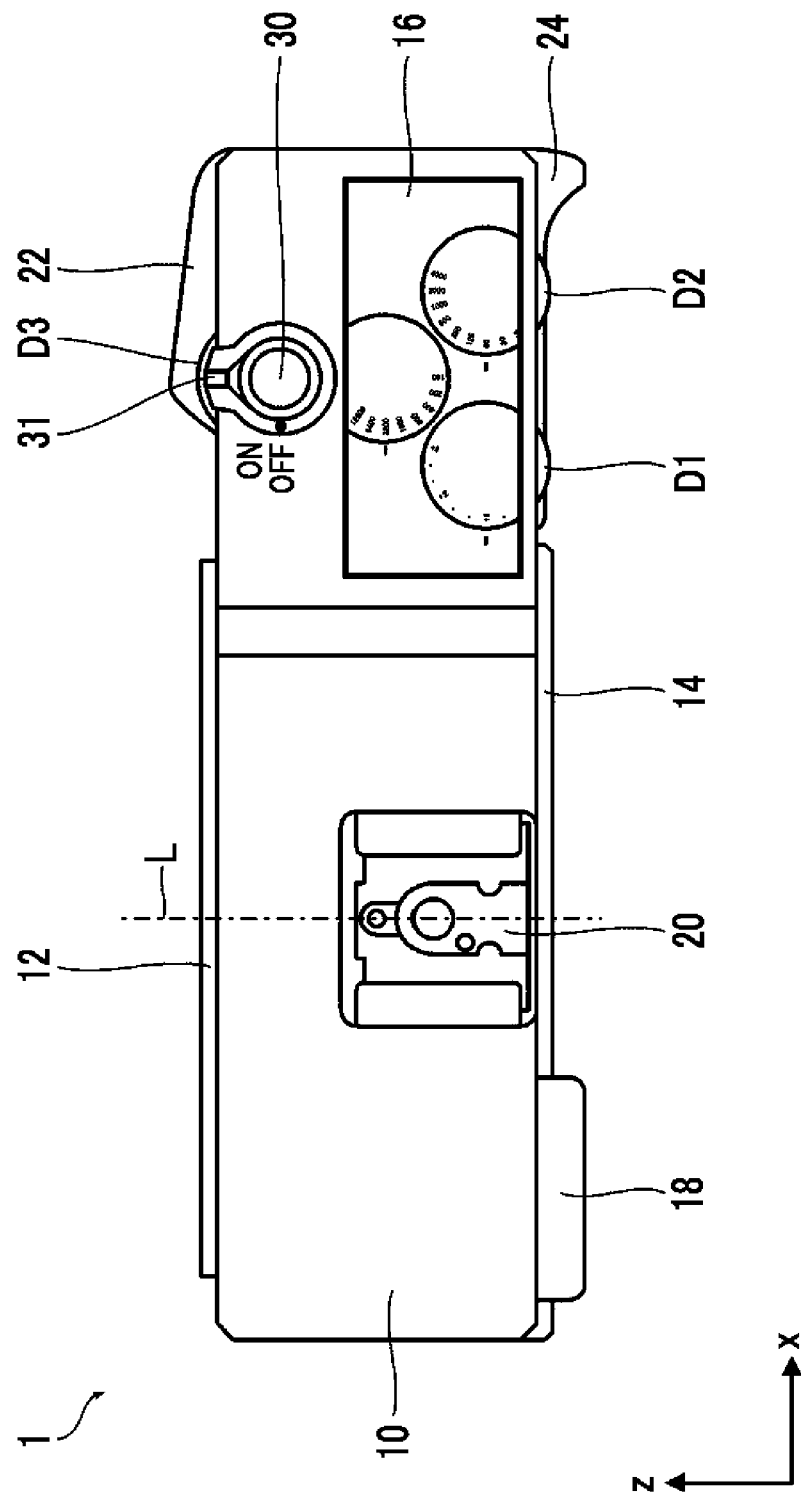
FIG. 43 is a plan view illustrating an example of the digital camera comprising three operation dials.

FIG. 42 is a front view illustrating an example of a digital camera comprising three operation dials. FIG. 43 is a plan view thereof.

As illustrated in FIG. 42, a digital camera 1A of this example comprises a front command dial D3 which is a third operation dial on the front surface side of the camera body 10. The digital camera 1A is the same as the digital camera 1 of the above-described embodiment except that the front command dial D3 is provided.

The front command dial D3 is provided at the grip portion, and is disposed at a position where the front command dial D3 is operable with the index finger of the hand holding the grip portion. Particularly, the front command dial D3 in the example illustrated in FIG. 42 is disposed at a position between the grip 22 and the shutter button 30. The position is a substantially intermediate position between the first rear command dial D1 and the second rear command dial D2 in a case where the top surface of the digital camera 1 is viewed from the top. In other words, a rotation axis of the front command dial D3 is disposed at a substantially intermediate position between the first rear command dial D1 and the second rear command dial D2.

Figure 44:
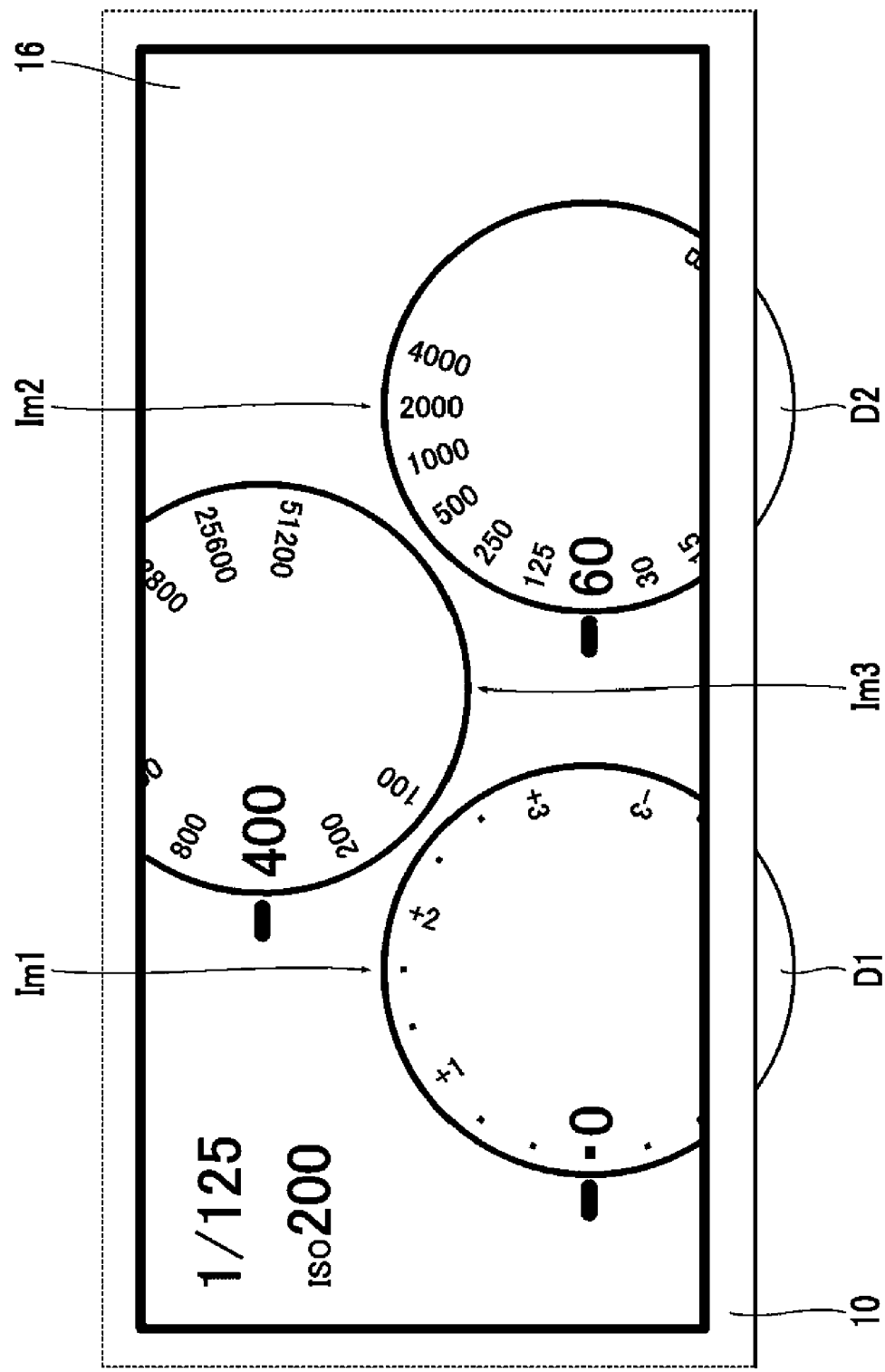
FIG. 44 is a plan view illustrating an example of display on the sub-display during a non-operation.

FIG. 44 is a plan view illustrating an example of display on the sub-display during a non-operation.

FIG. 44 illustrates an example of the case where the function of setting an exposure correction value is allocated to the first rear command dial D1, the function of setting a shutter speed is allocated to the second rear command dial D2, and the function of setting a sensitivity is allocated to the front command dial D3.

An image picture of each dial is displayed with the same size as an outer diameter of an actual dial. The image picture of each dial is displayed in a layout corresponding to a layout of each dial for the camera body 10. Particularly, the image picture Im1 of the first rear command dial D1 and the image picture Im2 of the second rear command dial D2 are disposed at the same positions as those of the actual first rear command dial D1 and second rear command dial D2. On the other hand, an image picture Im3 of the front command dial D3 is disposed at a position which is shifted backward along the optical axis from the position of the actual front command dial D3. Consequently, the image picture of each dial is displayed on the sub-display 16 in the layout corresponding to the actual layout. In other words, the image picture Im1 of the first rear command dial D1 and the image picture Im2 of the second rear command dial D2 are disposed in parallel on the rear side in the camera body 10 on the display surface of the sub-display 16. The image picture Im3 of the front command dial D3 is disposed on the front side in the camera body 10 and at the intermediate position between the first rear command dial D1 and the second rear command dial D2 on the display surface of the sub-display 16.

As mentioned above, an image picture of each dial is displayed in a layout corresponding to an actual layout, and thus it is possible to clarify the relevance between the actual operation dial and the image picture of each dial. Since an image picture of each dial is displayed in a layout corresponding to an actual layout, in a case where an actual dial is operated, an image picture of the dial displayed nearest the actual dial is displayed to be enlarged. Consequently, it is possible to further clarify the relevance between the actual dial and the image picture of the dial displayed on the display unit.

Figure 45:
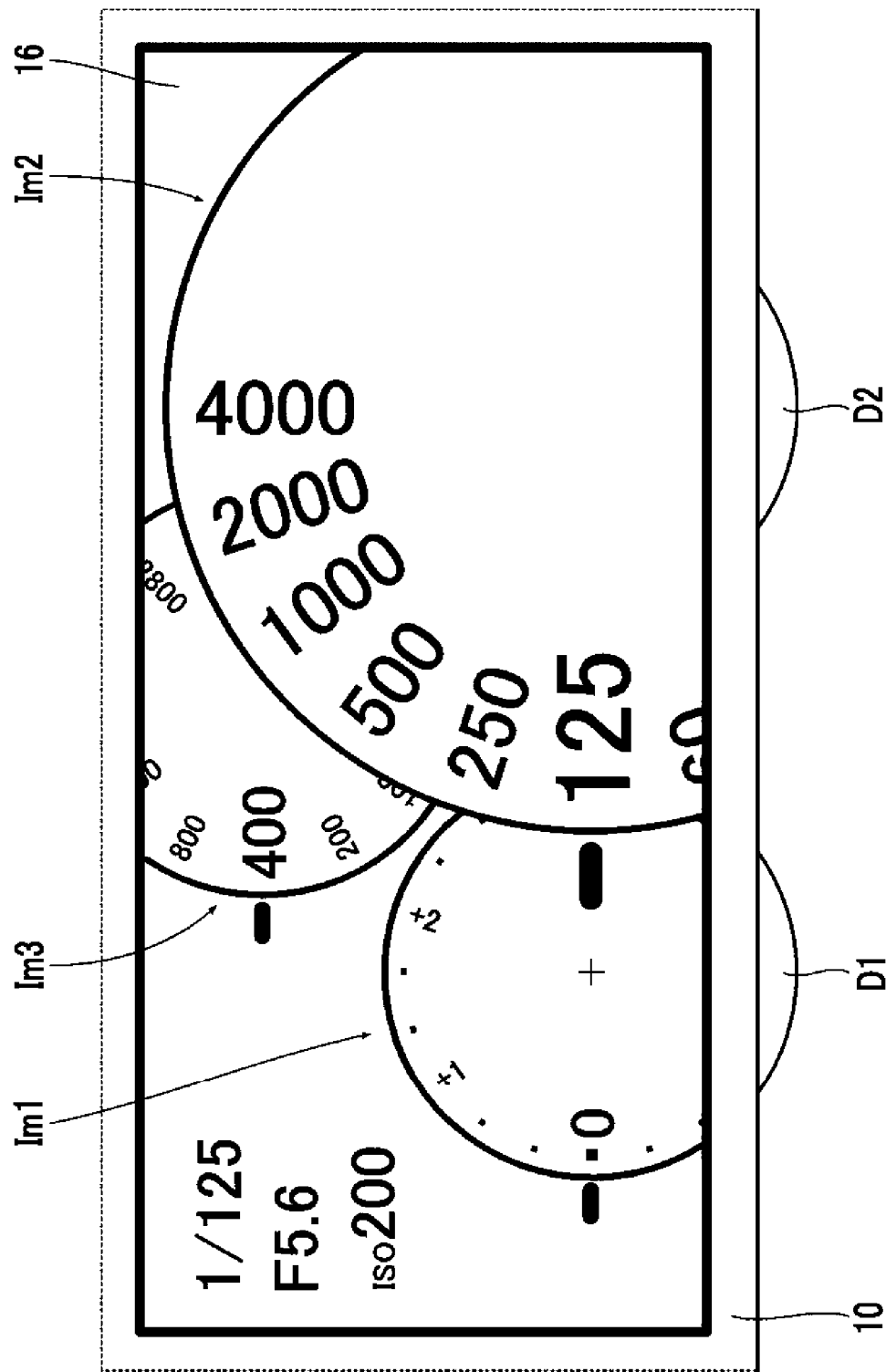
FIG. 45 is a plan view illustrating an example of display on the sub-display during an operation.

FIG. 45 is a plan view illustrating an example of display on the sub-display during an operation.

FIG. 45 illustrates a display state of the sub-display 16 in a case where the second rear command dial D2 is rotationally operated, and illustrates an example of a case where an image picture of an operated dial is displayed to overlap an image picture of a non-operated dial.

An image picture of a non-operated dial may be displayed to be notched, or may be displayed to be deviated.

Second Embodiment

In a camera of the present embodiment, contact of the finger with an operation dial is detected, and a display form of a display unit is switched.

A fundamental configuration of the camera is the same as that in the first embodiment. Therefore, herein, only a difference will be described.

Figure 46:
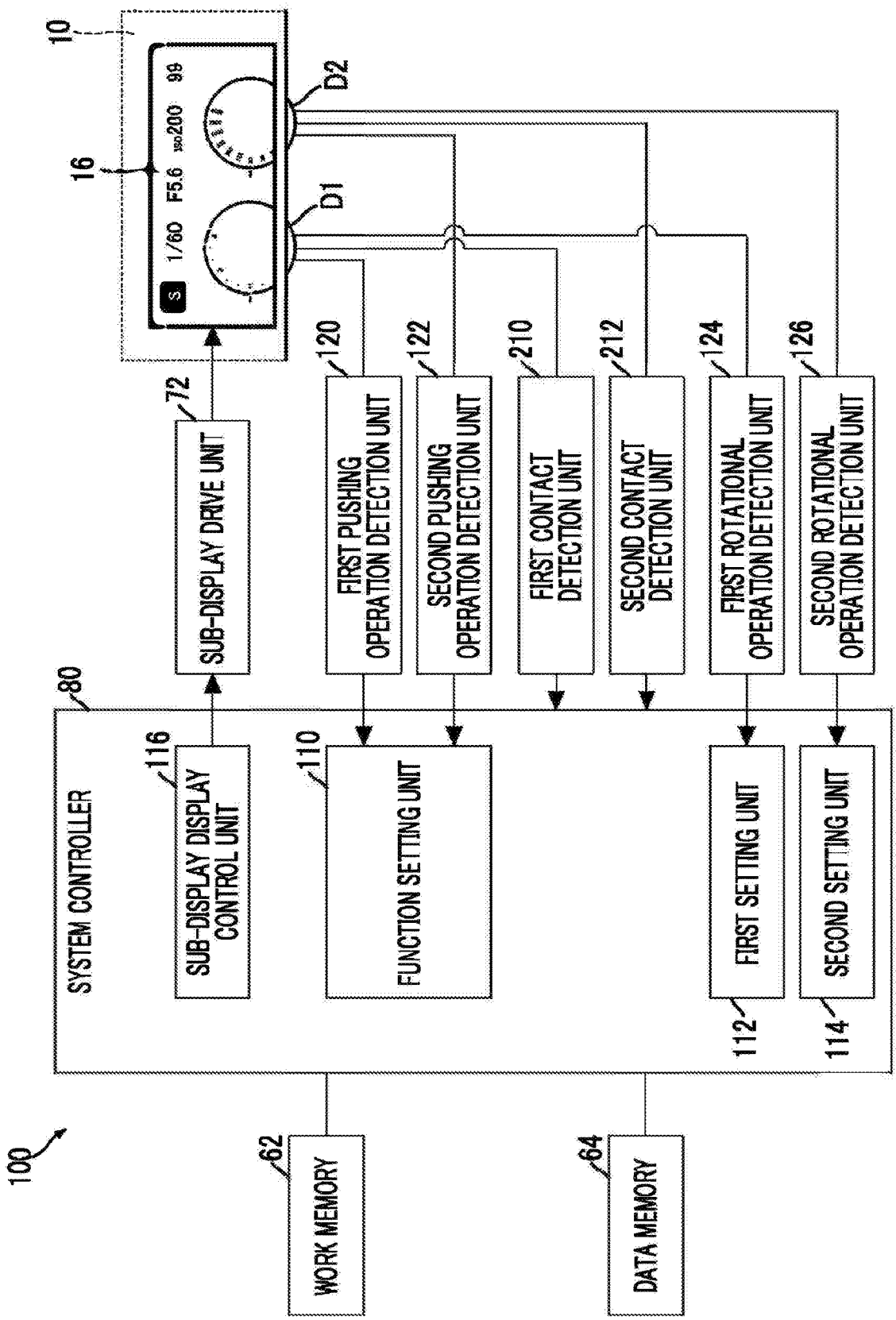
FIG. 46 is a functional block diagram of an operation system using the first rear command dial and the second rear command dial in the digital camera of the present embodiment.

FIG. 46 is a functional block diagram of an operation system using the first rear command dial and the second rear command dial in the digital camera of the present embodiment.

As illustrated in FIG. 46, the digital camera of the present embodiment comprises a first contact detection unit 210 which detects contact with the first rear command dial D1, and a second contact detection unit 212 which detects contact with the second rear command dial D2.

The first contact detection unit 210 is configured with a touch sensor, and detects contact of the finger with the first rear command dial D1. In a case where contact of the finger with the first rear command dial D1 is detected, the first contact detection unit 210 outputs ON information to the system controller 80. The system controller 80 determines the presence or absence of contact of the finger with the first rear command dial D1 on the basis of the information from the first contact detection unit 210.

The second contact detection unit 212 is configured with a touch sensor, and detects contact of the finger with the second rear command dial D2. In a case where contact of the finger with the second rear command dial D2 is detected, the second contact detection unit 212 outputs ON information to the system controller 80. The system controller 80 determines the presence or absence of contact of the finger with the second rear command dial D2 on the basis of the information from the second contact detection unit 212.

The sub-display display control unit 116 displays the image picture Im1 of the first rear command dial D1 and the image picture Im2 of the second rear command dial D2 on the sub-display 16. In a case where contact with the first rear command dial D1 or the second rear command dial D2 is detected, a display form of an image picture of the dial with which the contact is detected is changed. In the digital camera of the present embodiment, in a case where contact with the first rear command dial D1 or the second rear command dial D2 is detected, an image picture of the dial with which the contact is detected is enlarged. In a case where the dial with which the contact is detected is further rotationally operated, the image picture is rotated.

Figure 47:
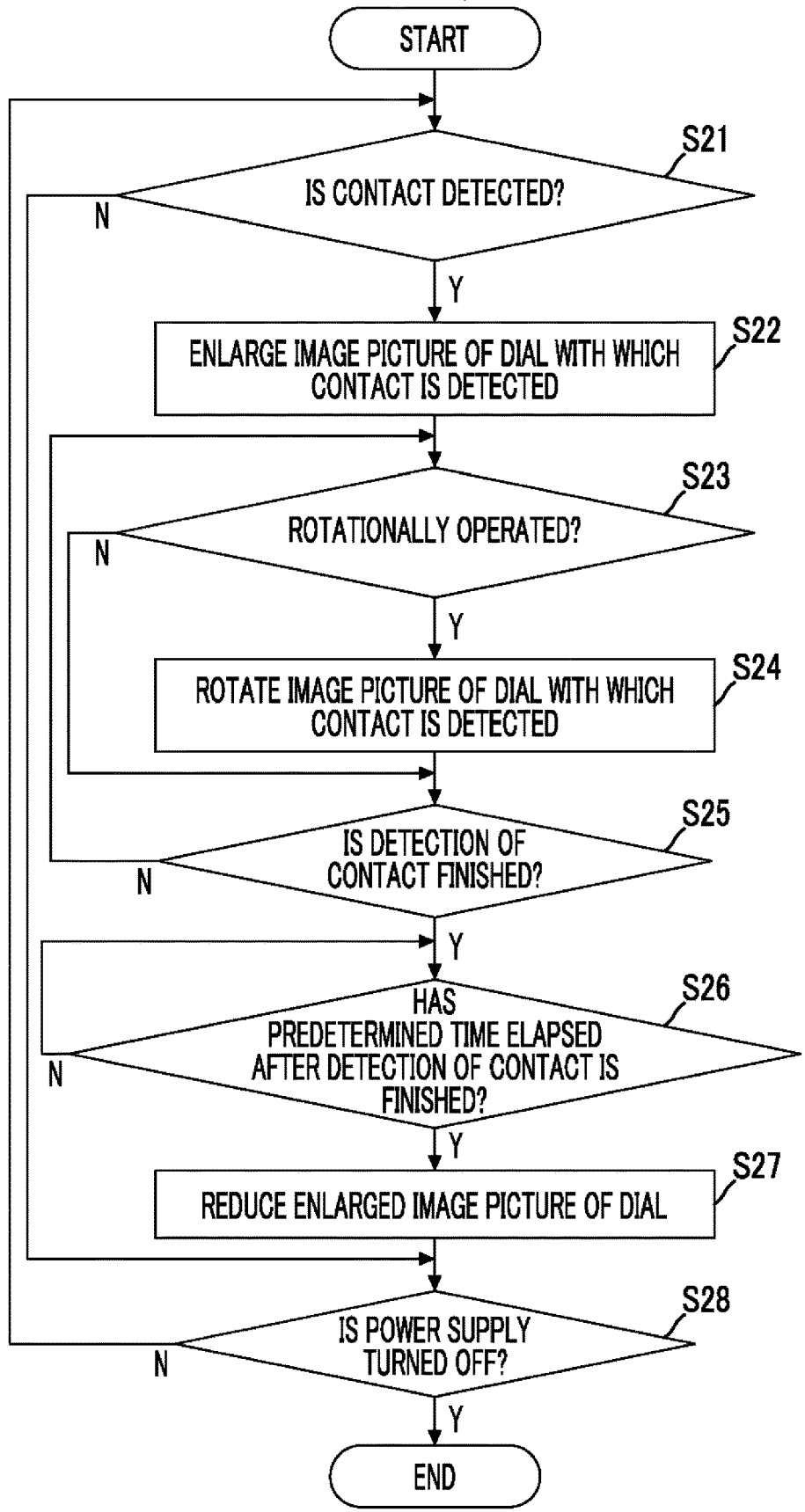
FIG. 47 is a flowchart illustrating process procedures for display control on a sub-display in a digital camera of a second embodiment.

FIG. 47 is a flowchart illustrating process procedures for display control on the sub-display in the digital camera of the second embodiment.

First, it is determined whether or not contact with the first rear command dial D1 or the second rear command dial D2 is detected (step S21). The sub-display display control unit 116 determines whether or not contact with the first rear command dial D1 or the second rear command dial D2 is detected on the basis of outputs from the first contact detection unit 210 and the second contact detection unit 212.

In a case where the contact is detected, the sub-display display control unit 116 enlarges an image picture of the dial with which the contact is detected (step S22).

Figure 48:
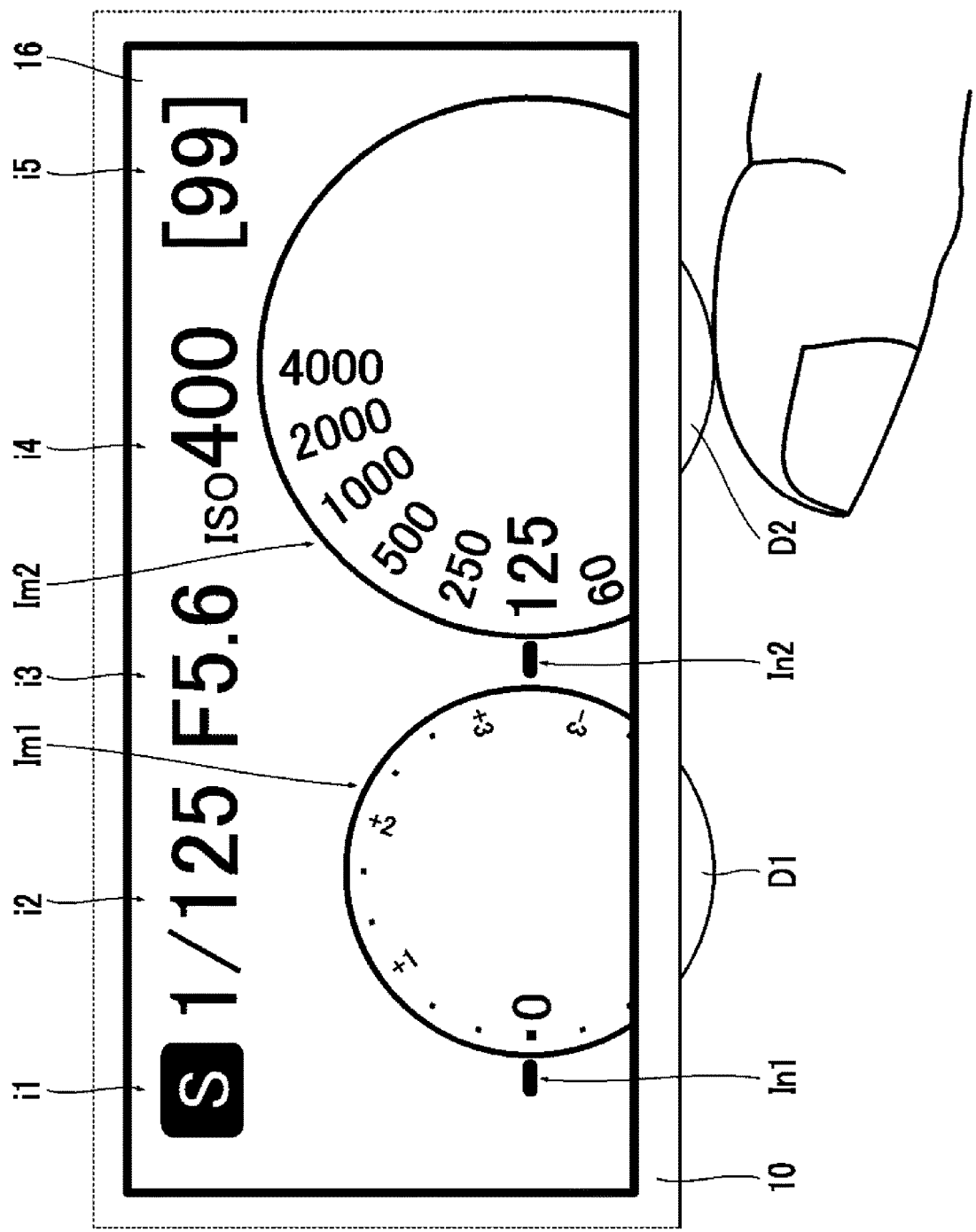
FIG. 48 is a plan view illustrating an example of display on the sub-display in a case where contact with a dial is detected.

FIG. 48 is a plan view illustrating an example of display on the sub-display in a case where contact with a dial is detected. FIG. 48 illustrates an example of a case where contact of the finger with the second rear command dial D2 is detected. In this case, the image picture Im2 of the second rear command dial D2 is displayed to be enlarged.

Next, it is determined whether or not the dial with which the contact is detected is rotationally operated (step S23). The sub-display display control unit 116 determines whether or not the first rear command dial D1 or the second rear command dial D2 is rotationally operated on the basis of outputs from the first rotational operation detection unit 124 and the second rotational operation detection unit 126.

In a case where the dial with which the contact is detected is rotationally operated, the sub-display display control unit 116 rotates the image picture of the dial (step S24). For example, in a case where contact with the second rear command dial D2 is detected, and the second rear command dial D2 is rotationally operated, the image picture Im2 of the second rear command dial D2 is rotated. The image picture is rotated in conjunction with the operation. In other words, the image picture is rotated in the same rotation amount as a rotation amount of the second rear command dial D2.

Thereafter, the sub-display display control unit 116 determines whether or not detection of contact is finished (step S25). In other words, it is determined whether or not the finger is released from the dial.

In a case where it is determined that detection of contact is finished, the sub-display display control unit 116 determines whether or not a predetermined time has elapsed from the detection finishing (step S26). In a case where it is determined that the predetermined time has elapsed from the detection finishing, the enlarged image picture of the dial is reduced to an original size (step S27).

Thereafter, it is determined whether or not a power supply of the digital camera 1 is turned off (step S28). In a case where the power supply of the digital camera 1 is turned off, the process is finished. On the other hand, in a case where the power supply of the digital camera 1 is not turned off, the flow returns to step S21, and the process is continuously performed.

As mentioned above, in the digital camera of the present embodiment, in a case where the finger comes into contact with a dial, a display form of an image picture of the dial with which the finger comes into contact is switched. Consequently, it is possible to clarify the relevance between an operation target dial and an image picture of the dial displayed on the display unit, and thus to provide a higher operability.

In the present embodiment, in a case where a dial is rotationally operated, an image picture of the dial is only rotated, but the image picture of the rotationally operated dial may be rotated while changing the brightness or a color thereof.

Modification Examples

In the above-described embodiment, there is a configuration in which, in a case where contact is detected, an image picture of a dial with which the contact is detected is enlarged, but a display aspect of the display unit in a case where contact is detected is not limited thereto. For example, the brightness or a color of an image picture of a dial with which contact is detected may be changed to be identified from other image pictures.

Figure 49:
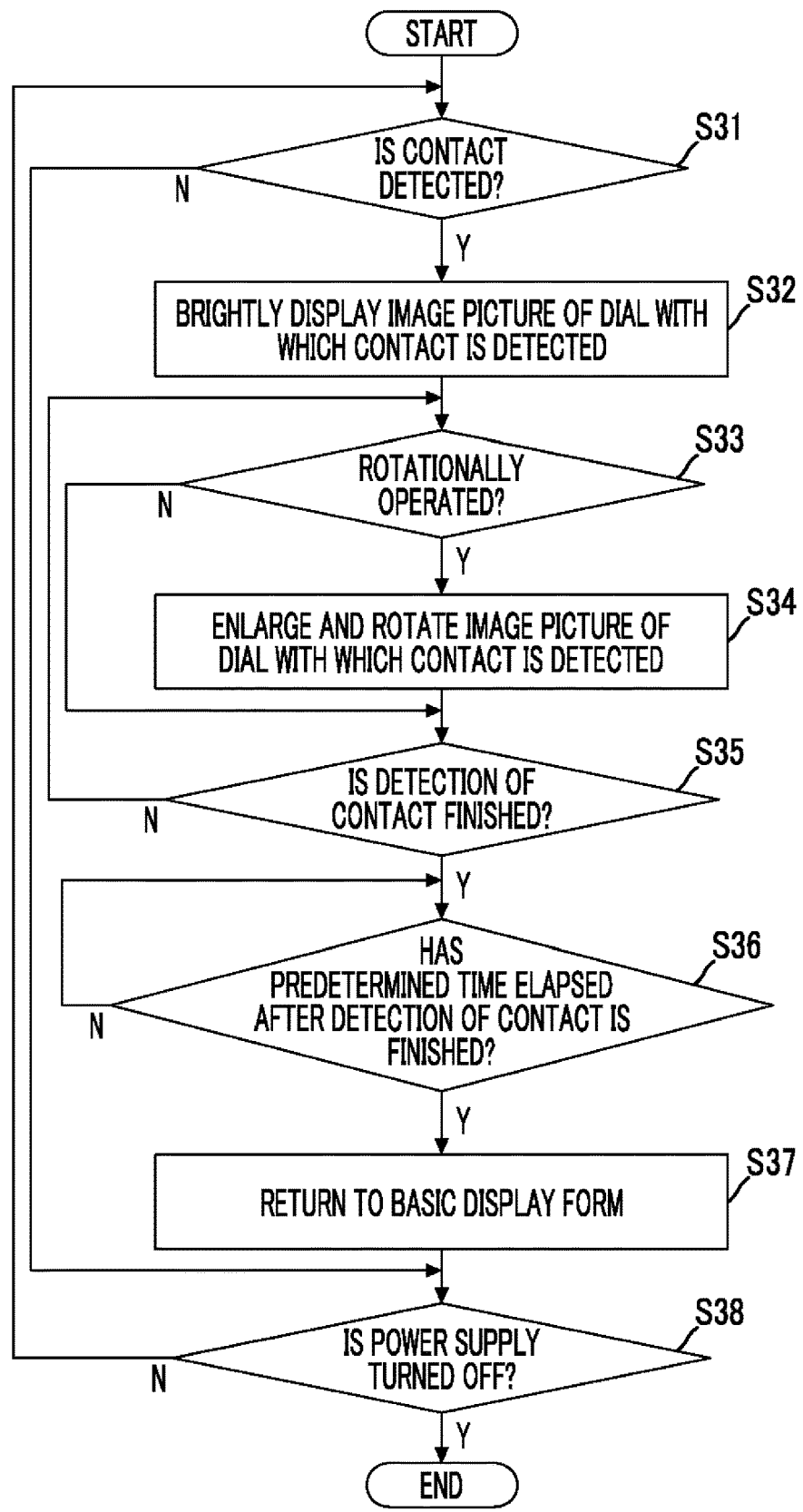
FIG. 49 is a flowchart illustrating process procedures in a case where contact is detected, and the brightness of an image picture of a dial is changed.

FIG. 49 is a flowchart illustrating process procedures in a case where contact is detected, and the brightness of an image picture of a dial is changed.

First, it is determined whether or not contact with the first rear command dial D1 or the second rear command dial D2 is detected (step S31).

In a case where the contact is detected, the sub-display display control unit 116 brightly displays an image picture of the dial with which the contact is detected (step S32).

Figure 50:
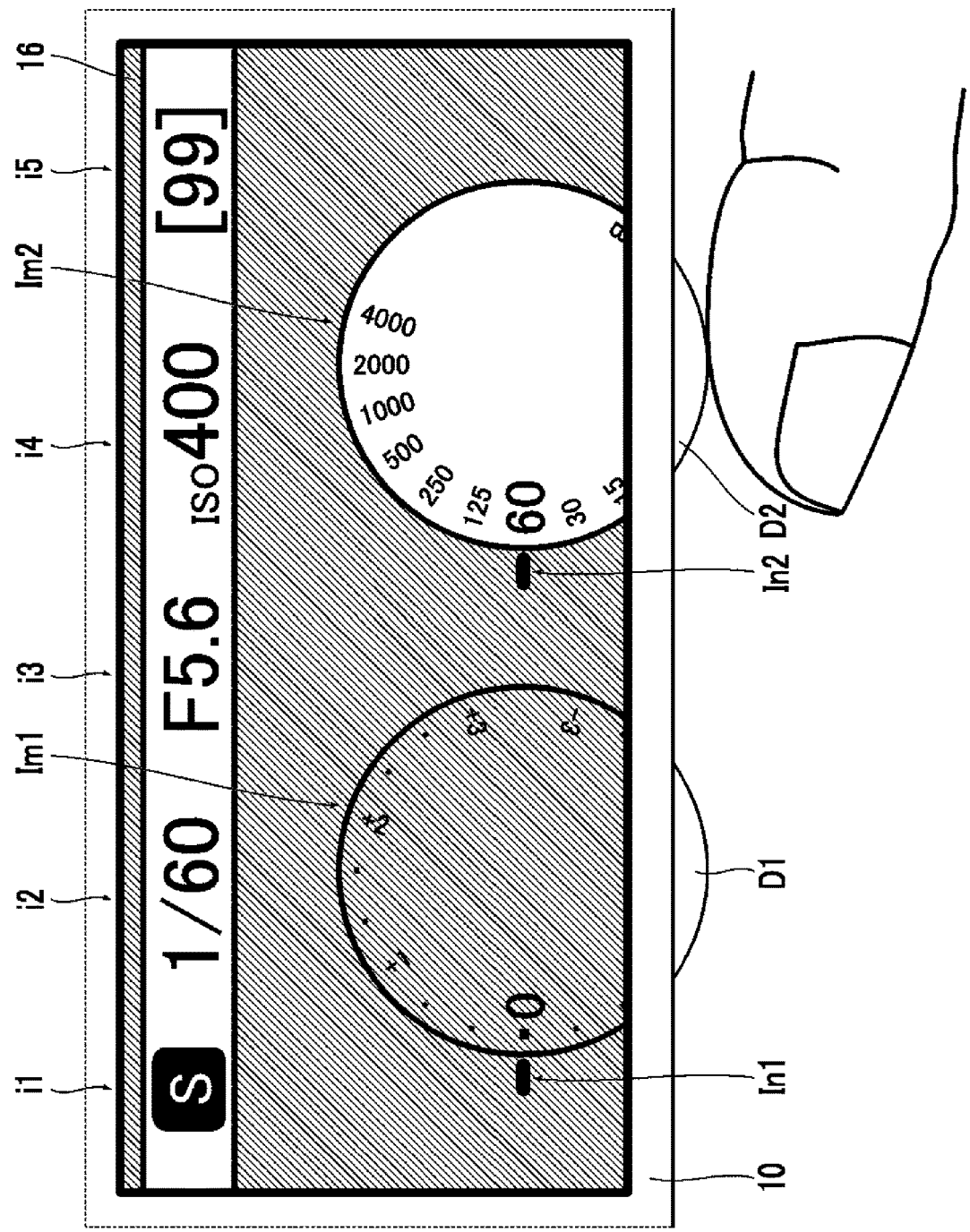
FIG. 50 is a plan view illustrating an example of display on the sub-display in a case where contact with the dial is detected.

FIG. 50 is a plan view illustrating an example of display on the sub-display in a case where contact with the dial is detected. In FIG. 50, a region indicated by diagonal lines is a region displayed to be dark.

FIG. 50 illustrates an example of a case where contact of the finger with the second rear command dial D2 is detected. In this case, the image picture Im2 of the second rear command dial D2 is displayed to be bright.

In the example illustrated in FIG. 50, a region except for the image picture of the dial with which the contact is detected and the display region of the set contents is made dark.

Next, it is determined whether or not the dial with which the contact is detected is rotationally operated (step S33).

In a case where the dial with which the contact is detected is rotationally operated, the sub-display display control unit 116 enlarges and rotates the image picture of the dial (step S34).

Figure 51:
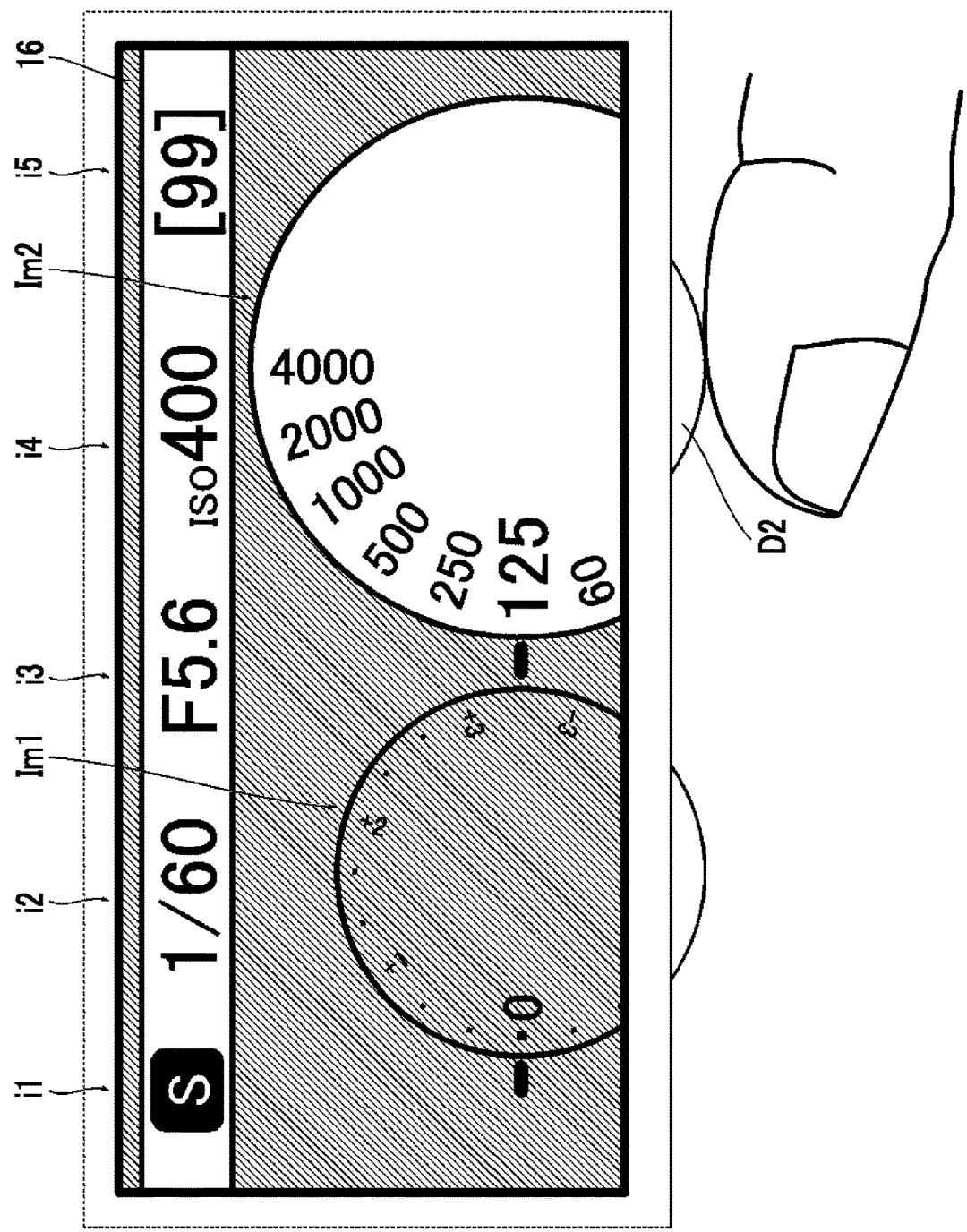
FIG. 51 is a plan view illustrating an example of display on the sub-display in a case where a rotational operation is performed.

FIG. 51 is a plan view illustrating an example of display on the sub-display in a case where a rotational operation is performed. FIG. 51 illustrates an example of a case where the second rear command dial D2 is rotationally operated. In this case, the image picture Im2 of the second rear command dial D2 is enlarged. The image picture Im2 of the second rear command dial D2 is rotated in response to the operation. The image picture of the dial is enlarged, and display can be easily viewed.

Thereafter, the sub-display display control unit 116 determines whether or not detection of contact is finished (step S35).

In a case where it is determined that detection of contact is finished, the sub-display display control unit 116 determines whether or not a predetermined time has elapsed from the detection finishing (step S36). In a case where it is determined that the predetermined time has elapsed from the detection finishing, the image picture of the dial is returned to a basic display form (step S37). Here, the basic display form is a display form in a case where contact is not detected, that is, the finger does not come into contact (refer to FIG. 8).

Thereafter, it is determined whether or not a power supply of the digital camera 1 is turned off (step S38). In a case where the power supply of the digital camera 1 is turned off, the process is finished. On the other hand, in a case where the power supply of the digital camera 1 is not turned off, the flow returns to step S31, and the process is continuously performed.

Also in a case of this example, it is possible to clarify the relevance between an operation target dial and an image picture of the dial displayed on the display unit. The same effect can also be achieved by changing a color of an image picture of a dial with which contact is detected.

In this example, in a case where a dial is rotationally operated, an image picture of the dial is enlarged and rotated, but may be rotated without being enlarged. In a case where the image picture of the dial is enlarged, display which is more easily viewed can be realized.

[Other Examples of Contact Detection Unit]

In the above-described embodiment, the contact detection unit is configured with a touch sensor, but means for detecting contact with an operation dial is not limited thereto. The contact detection unit may be configured with a sensor or the like optically detecting contact. For example, the contact detection unit may be configured to detect that the finger comes close to an installation portion of an operation dial by a predetermined distance, and detect that the finger comes into contact with the operation dial.

Third Embodiment

In a camera of the present embodiment, a pushing operation on an operation dial is detected, and a display form of a display unit is switched.

A fundamental configuration of the camera is the same as that in the first embodiment. Therefore, herein, only a difference will be described.

The first rear command dial D1 and the second rear command dial D2 switch between a lock state and an unlock state whenever a pushing operation is performed. The lock state is a state in which a dial is electronically locked. In the lock state, even if a dial is rotationally operated, the operation is invalidated, and thus a setting is not changed.

A pushing operation on the first rear command dial D1 is detected by the first pushing operation detection unit 120 provided in the first rear command dial D1. A detection result in the first pushing operation detection unit 120 is output to the system controller 80. A pushing operation on the second rear command dial D2 is detected by the second pushing operation detection unit 122 provided in the second rear command dial D2. A detection result in the second pushing operation detection unit 122 is output to the system controller 80.

The sub-display display control unit 116 controls display on the sub-display 16 during a pushing operation on the basis of detection results in the first pushing operation detection unit 120 and the second pushing operation detection unit 122.

Figure 52:
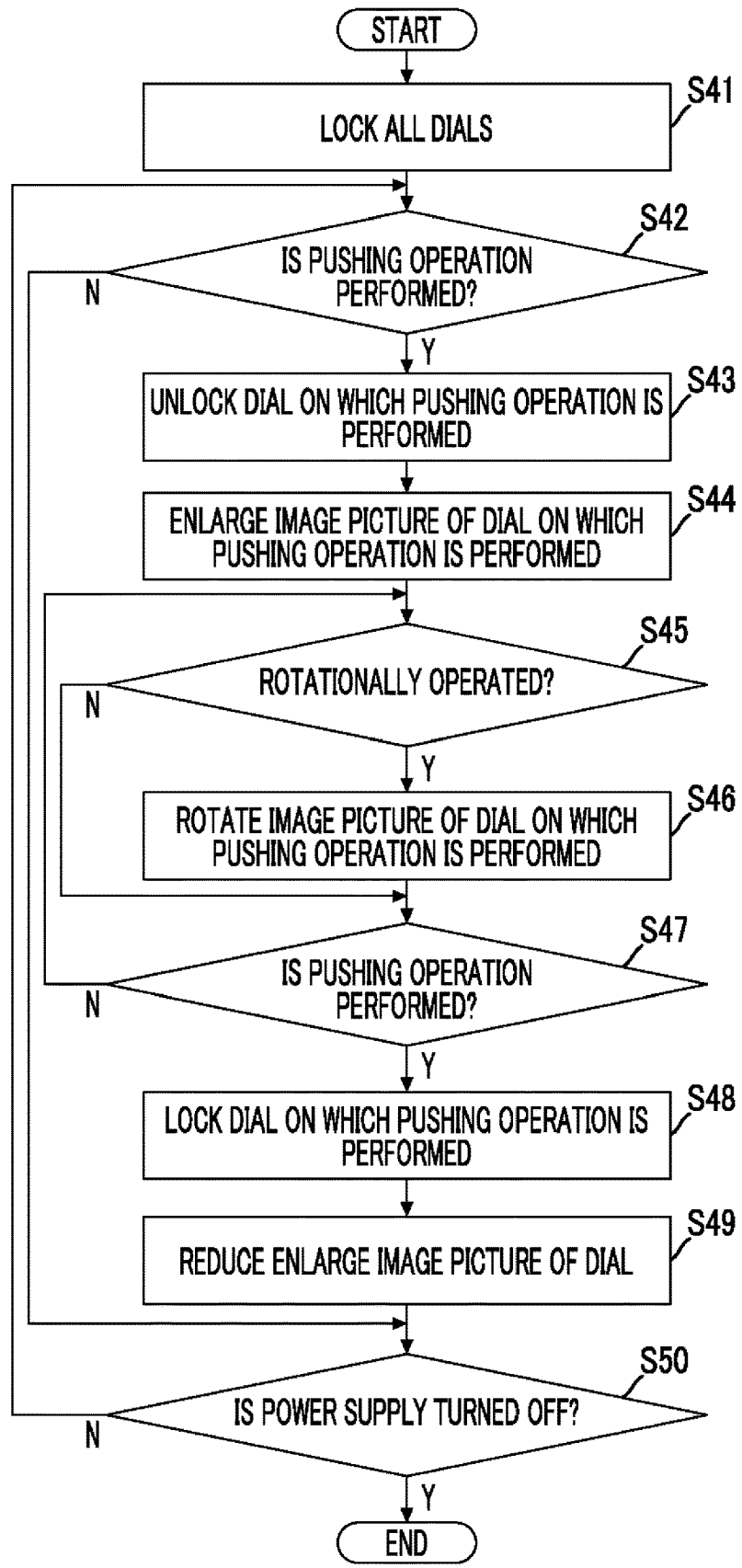
FIG. 52 is a flowchart illustrating process procedures for control of an operation system in a digital camera of a third embodiment.

FIG. 52 is a flowchart illustrating process procedures for control of an operation system in the digital camera of the third embodiment.

All dials are set in a lock state in an initial state, that is, in a case where a power supply is turned on (step S41). Therefore, even if the first rear command dial D1 and the second rear command dial D2 are rotationally operated, the operation is invalidated.

First, it is determined whether or not a pushing operation is performed on the first rear command dial D1 or the second rear command dial D2 (step S42).

In a case where the pushing operation is performed on the first rear command dial D1 or the second rear command dial D2, the system controller 80 unlocks the dial on which the pushing operation is performed (step S43). In a case where the dial is unlocked, a rotational operation on the unlocked dial is valid.

In a case where the pushing operation is performed on the first rear command dial D1 or the second rear command dial D2, the sub-display display control unit 116 enlarges an image picture of the dial on which the pushing operation is performed (step S44).

For example, it is assumed that a pushing operation is performed on the second rear command dial D2. In this case, a rotational operation on the second rear command dial D2 is valid. The image picture Im2 of the second rear command dial D2 is displayed to be enlarged (refer to FIG. 48).

Next, it is determined whether or not the dial on which the pushing operation is performed is rotationally operated (step S45). The sub-display display control unit 116 determines whether or not the first rear command dial D1 or the second rear command dial D2 is rotationally operated on the basis of outputs from the first rotational operation detection unit 124 and the second rotational operation detection unit 126.

In a case where the dial on which the pushing operation is performed is rotationally operated, the sub-display display control unit 116 rotates the image picture of the dial (step S46). For example, in a case where the second rear command dial D2 is subjected to a pushing operation, and is further rotationally operated, the image picture Im2 of the second rear command dial D2 is rotated. The image picture is rotated in conjunction with the operation.

Next, the sub-display display control unit 116 determines whether or not a pushing operation is performed (step S47).

In a case where it is determined that the pushing operation is performed, the system controller 80 locks a dial on which the pushing operation is performed (step S48). Consequently, a subsequent rotational operation is invalidated. In other words, even if the dial is rotationally operated, a set value is not changed.

In a case where it is determined that the pushing operation is performed, the sub-display display control unit 116 reduces the enlarged image picture of the dial to an original size (step S49).

Thereafter, it is determined whether or not a power supply of the digital camera 1 is turned off (step S50). In a case where the power supply of the digital camera 1 is turned off, the process is finished. On the other hand, in a case where the power supply of the digital camera 1 is not turned off, the flow returns to step S41, and the process is continuously performed.

As mentioned above, in the digital camera of the present embodiment, in a case where a pushing operation is performed on a dial, a display form of an image picture of the dial on which the pushing operation is performed is switched. Consequently, it is possible to clarify the relevance between an operation target dial and an image picture of the dial displayed on the display unit, and thus to provide a higher operability.

In the present embodiment, in a case where a dial is subjected to a pushing operation, an image picture of the dial is only rotated, but the image picture of the rotationally operated dial may be rotated while changing the brightness or a color thereof.

[Modification Examples]

In the above-described embodiment, there is a configuration in which, in a case where a pushing operation is performed, an image picture of a dial with which the pushing operation is performed is enlarged, but a display aspect of the display unit in a case where the pushing operation is performed is not limited thereto. For example, in the same manner as in the modification example of the second embodiment, the brightness or a color of an image picture of a dial on which a pushing operation is performed may be changed.

In the above-described embodiment, an operation dial is electronically locked or unlocked through a pushing operation the dial, but this process may not be separately performed.

Other Embodiments

<<Function allocated to Operation Dial>>

In the above-described embodiment, a description will be made of an example of a case where the function of setting a shutter speed, the function of setting a sensitivity, and the like are allocated to an operation dial, but a function allocated to the operation dial is not limited thereto. A function allocated to the operation dial may be set as appropriate according to a function provided in the camera. For example, in addition to the functions, various functions such as a function of setting a volume and a function of setting the brightness of the main display may be allocated.

<<Other Examples of Display Unit>>

In the above-described embodiment, the sub-display configuring the display unit is configured with a reflective LCD, but a display configuring the display unit is not limited thereto. For example, the display may be configured with, for example, a self-light emitting display such as an electronic paper, a memory liquid crystal display, or an organic electroluminescent (EL) display.

The electronic paper is a thin display which has a thickness in the same level as paper, and visibility, and in which a display content is rewritten. The memory liquid crystal display is a liquid crystal display having a function in which a content displayed on a screen can be maintained even if a power supply is turned off. Both of the displays can ensure a favorable visibility even in an environment in which surroundings are bright. Display on a display unit can be recognized even in a case where a power supply of a camera is turned off.

In a case where the sub-display is configured with an LCD, the sub-display is configured with a reflective LCD, and thus a favorable visibility can be ensured even in a bright environment. In a case where a display is configured with a reflective LCD, an illumination lamp is preferably provided.

<<Other Modification Examples>>

In the above-described embodiment, rotation of an operation dial is detected by a rotary encoder, but means for detecting rotation of an operation dial is not limited thereto. Well-known rotation detection means using a rotary brush may be used.

A case where the present invention is applied to a digital camera has been described by way of example in the above-described embodiment, but the application of the present invention is not limited thereto. The present invention can be applied to a camera using a silver halide film likewise. The present invention may also be applied to an electronic device in which a rotary operation dial is built.

A case where the present invention is applied to a lens-interchangeable camera has been described by way of example in the above-described embodiment, but the present invention may also be applied to a camera, which is integrated with a lens, likewise.

A case where the present invention is applied to a non-reflex camera has been described by way of example in the above-described embodiment, but the present invention may also be applied to a reflex camera likewise.

EXPLANATION OF REFERENCES

1: digital camera
1A: digital camera
2: lens
2a: lens drive unit
10: camera body
12: lens mount
14: main display
16: sub-display
18: electronic view finder
20: hot shoe
22: grip
24: thumb rest
30: shutter button
31: power supply lever
32: reproduction button
33: imaging setting button
34: menu button
35: selector button
36: display button
37: erase button
50: image sensor
52: image sensor drive unit
54: shutter
56: shutter drive unit
58: analog signal processing section
60: image data input unit
62: work memory
64: data memory
66: digital signal processing section
68: recording control unit
70: main display drive unit
72: sub-display drive unit
74: operation unit
78: memory card
80: system controller
100: operation system
110: function setting unit
112: first setting unit
114: second setting unit
116: sub-display display control unit
120: first pushing operation detection unit
122: second pushing operation detection unit
124: first rotational operation detection unit
126: second rotational operation detection unit
210: first contact detection unit 212: second contact detection unit
C1: circular arc determining outer shape of image picture of first rear command dial
C2: circular arc determining outer shape of image picture of second rear command dial
D1: first rear command dial
D2: second rear command dial
D3: front command dial
Ia1: rotation axis of image picture of first rear command dial
Ia2: rotation axis of image picture of second rear command dial
Im1: image picture of first rear command dial
Im2: image picture of second rear command dial
Im3: image picture of front command dial
In1: first indicator image picture
In2: second indicator image picture
L: optical axis
Ma: margin region
a1: rotation axis of first rear command dial
a2: rotation axis of second rear command dial
fr2: frame displayed inside image picture
g1: pattern displayed in image picture of first rear command dial
g2: pattern displayed in image picture of second rear command dial
i1 to i5: information regarding set contents of digital camera displayed on sub-display
iz: strip-shaped region in which information regarding set contents of digital camera is displayed
S1 to S15: process procedures for display control of image pictures in case where first rear command dial and second rear command dial are operated
S21 to S28: flowchart illustrating process procedures for display control on sub-display in digital camera of second embodiment
S31 to S38: flowchart illustrating process procedures in case where contact is detected, and brightness of image picture of dial is changed
S41 to S50: flowchart illustrating process procedures for control of operation system in digital camera of third embodiment

What is claimed is:

1. A camera comprising:
a display unit that is disposed on a top surface of a camera body;
a plurality of rotary operation dials that are disposed such that parts of outer circumferences of the plurality of the rotary operation dials are exposed to an outer surface of the camera body; and
a display control unit that controls display on the display unit,
wherein the display control unit displays an image picture of each of the plurality of the rotary operation dials on the display unit, and enlarges an image picture of a rotationally operated rotary operation dial in a case where one of the plurality of the rotary operation dials is rotationally operated.

2. The camera according to claim 1,
wherein, in a case where one of the plurality of the rotary operation dials is rotationally operated, the display control unit changes brightness or a color of an image picture of the rotationally operated rotary operation dial.

3. The camera according to claim 1,
wherein, in a case where one of the plurality of the rotary operation dials is rotationally operated, the display control unit rotates an image picture of the rotationally operated rotary operation dial.

4. The camera according to claim 3,
wherein the display control unit rotates the image picture of the rotationally operated rotary operation dial in the same rotation amount as an operated rotation amount.

5. The camera according to claim 1,
wherein the display control unit displays the image picture of each of the plurality of the rotary operation dials on the display unit in a layout corresponding to a layout of the rotary operation dial for the camera body.

6. The camera according to claim 1,
wherein the display control unit displays the image picture of each of the plurality of the rotary operation dials near the plurality of the rotary operation dials.

7. The camera according to claim 1,
wherein, in a case where one of the plurality of the rotary operation dials is rotationally operated, the display control unit changes a display form of an image picture of the rotationally operated rotary operation dial displayed nearest the rotationally operated rotary operation dial.

8. The camera according to claim 1,
wherein the display control unit displays the image picture of each of the plurality of the rotary operation dials, corresponding to a function allocated to each of the plurality of the rotary operation dials, on the display unit.

9. The camera according to claim 1, further comprising:
a function setting unit that sets a function to be allocated to each of the plurality of the rotary operation dials.

10. The camera according to claim 1,
wherein the display control unit further displays set contents of the camera on the display unit.

11. A camera comprising:
a display unit that is disposed on a top surface of a camera body;
a plurality of rotary operation dials that are disposed such that parts of outer circumferences of the plurality of the rotary operation dials are exposed to an outer surface of the camera body; and
a display control unit that controls display on the display unit,
wherein the display control unit displays an image picture of each of the plurality of the rotary operation dials on the display unit, and changes a display form of an image picture of a rotationally operated rotary operation dial in a case where one of the plurality of the rotary operation dials is rotationally operated, and
the display control unit displays an image having a circular arc outer shape to which a part of the plurality of the rotary operation dials exposed from the camera body extends on the display unit as the image picture of the plurality of the rotary operation dials.

12. A camera comprising:
a display unit that is disposed on a top surface of a camera body;
a plurality of rotary operation dials that are disposed such that parts of outer circumferences of the plurality of the rotary operation dials are exposed to an outer surface of the camera body; and
a display control unit that controls display on the display unit,
wherein the display control unit displays an image picture of each of the plurality of the rotary operation dials on the display unit, and changes a display form of an image picture of a rotationally operated rotary operation dial in a case where one of the plurality of the rotary operation dials is rotationally operated, the display control unit further displays set contents of the camera on the display unit, and the display control unit displays the set contents to be reduced in a case where the image picture is enlarged.

13. A camera comprising:

a display unit that is disposed on a top surface of a camera body;

a plurality of rotary operation dials that are disposed such that parts of outer circumferences of the plurality of the rotary operation dials are exposed to an outer surface of the camera body; and a display control unit that controls display on the display unit, wherein the display control unit displays an image picture of each of the plurality of the rotary operation dials on the display unit, and changes a display form of an image picture of a rotationally operated rotary operation dial in a case where one of the plurality of the rotary operation dials is rotationally operated, the display control unit further displays set contents of the camera on the display unit, and the display control unit displays the set contents to be deviated to positions not overlapping the image picture in a case where the image picture is enlarged.

14. A camera comprising:

a display unit that is disposed on a top surface of a camera body;

a plurality of rotary operation dials that are disposed such that parts of outer circumferences of the plurality of the rotary operation dials are exposed to an outer surface of the camera body; and a display control unit that controls display on the display unit, wherein the display control unit displays an image picture of each of the plurality of the rotary operation dials on the display unit, and changes a display form of an image picture of a rotationally operated rotary operation dial in a case where one of the plurality of the rotary operation dials is rotationally operated, the display control unit further displays set contents of the camera on the display unit, and the display control unit displays the set contents to overlap the image picture in a case where the image picture is enlarged.

15. A camera comprising:

a display unit that is disposed on a top surface of a camera body;

a plurality of rotary operation dials that are disposed such that parts of outer circumferences of the plurality of the rotary operation dials are exposed to an outer surface of the camera body; and a display control unit that controls display on the display unit, wherein the display control unit displays an image picture of each of the plurality of the rotary operation dials on the display unit, and changes a display form of an image picture of a rotationally operated rotary operation dial in a case where one of the plurality of the rotary operation dials is rotationally operated, the display control unit further displays set contents of the camera on the display unit, and the display control unit changes display items of the set contents in a case where the image picture is enlarged.

16. A setting method for a camera which comprises a plurality of rotary operation dials that are disposed such that parts of outer circumferences of the plurality of the rotary operation dials are exposed to an outer surface of a camera body and performs various settings by using the plurality of the rotary operation dials, the setting method comprising:

displaying an image picture of each of the plurality of the rotary operation dials on a display unit disposed on a top surface of the camera body; and enlarging an image picture of a rotationally operated rotary operation dial in a case where one of the plurality of the rotary operation dials is rotationally operated.

* * * * *